(12) United States Patent
Ishihara et al.

(10) Patent No.: US 10,427,573 B2
(45) Date of Patent: Oct. 1, 2019

(54) HEADREST HAVING ENGAGING MEMBERS AND LOCKING MECHANISM WITH ENGAGING PORTIONS

(71) Applicant: TS TECH CO., LTD., Asaka-shi, Saitama (JP)

(72) Inventors: Kazunori Ishihara, Shioya-gun (JP); Kazuhiro Mishiba, Shioya-gun (JP); Yuji Nakano, Shioya-gun (JP); Hiroshi Izawa, Shioya-gun (JP)

(73) Assignee: TS TECH CO., LTD., Asaka-shi (JP)

( * ) Notice: Subject to any disclaimer, the term of this patent is extended or adjusted under 35 U.S.C. 154(b) by 444 days.

(21) Appl. No.: 15/105,382

(22) PCT Filed: Dec. 17, 2014

(86) PCT No.: PCT/JP2014/083410
§ 371 (c)(1),
(2) Date: Jun. 16, 2016

(87) PCT Pub. No.: WO2015/093529
PCT Pub. Date: Jun. 25, 2015

(65) Prior Publication Data
US 2016/0325652 A1 Nov. 10, 2016

(30) Foreign Application Priority Data

Dec. 18, 2013 (JP) .................................. 2013-260945
Dec. 18, 2013 (JP) .................................. 2013-260970
(Continued)

(51) Int. Cl.
*B60N 2/865* (2018.01)
*B60N 2/829* (2018.01)

(52) U.S. Cl.
CPC ............. *B60N 2/865* (2018.02); *B60N 2/829* (2018.02)

(58) Field of Classification Search
CPC ................................ B60N 2/865; B60N 2/829
(Continued)

(56) References Cited

U.S. PATENT DOCUMENTS 4,278,291 A * 7/1981 Asai ..................... B60N 2/865
297/391
7,455,363 B2 * 11/2008 Chung ................... B60N 2/809
297/407
(Continued)

FOREIGN PATENT DOCUMENTS

CN 104995058 A 10/2015
DE 102009038631 A1 5/2010
(Continued)

OTHER PUBLICATIONS

Aug. 22, 2017 Office Action issued in Japanese Patent Application No. 2013-260945.
(Continued)

*Primary Examiner* — Milton Nelson, Jr.
(74) *Attorney, Agent, or Firm* — Oliff PLC

(57) ABSTRACT

A headrest includes a right headrest pillar and a left headrest pillar apart from the right headrest pillar, a fixed frame disposed on the headrest pillars, a movable frame coupled to the fixed frame with a movable mechanism, and a front-back locking mechanism locking and unlocking a front-back movement of the movable frame relative to the fixed frame. The movable frame is movable in the front-back direction relative to the fixed frame. The front-back locking mechanism includes a plurality of engaged members disposed outside the right and left headrest pillars in a width direction thereof and a locking member having a plurality of engaging portions to be respectively engaged with the engaged members to lock the movement of the movable frame.

18 Claims, 25 Drawing Sheets

(30) Foreign Application Priority Data

May 16, 2014 (JP) .................................. 2014-102854
May 16, 2014 (JP) .................................. 2014-102856
May 16, 2014 (JP) .................................. 2014-102858

(58) Field of Classification Search
USPC ....................................................... 297/391
See application file for complete search history.

(56) References Cited

U.S. PATENT DOCUMENTS

| | | | |
|---|---|---|---|
| 7,517,015 B2* | 4/2009 | Terada | B60N 2/888 297/216.12 |
| 9,457,700 B2* | 10/2016 | Ishihara | B60N 2/4228 |
| 2003/0015897 A1 | 1/2003 | Humer et al. | |
| 2005/0280304 A1 | 12/2005 | Akaike et al. | |
| 2010/0127541 A1 | 5/2010 | Kotz | |
| 2013/0229043 A1 | 9/2013 | Radhakrishnan | |
| 2014/0001811 A1* | 1/2014 | Haeske | B60N 2/809 297/409 |
| 2015/0239378 A1* | 8/2015 | Ishihara | B60N 2/4864 297/391 |
| 2015/0352989 A1* | 12/2015 | Ishihara | B60N 2/4817 297/406 |

FOREIGN PATENT DOCUMENTS

| | | | | |
|---|---|---|---|---|
| DE | 102009040069 A1 | 3/2011 | | |
| DE | 102010044448 A1 | 3/2012 | | |
| GB | 2230695 A | 10/1990 | | |
| JP | S58-191854 U | 12/1983 | | |
| JP | S59-62016 A | 4/1984 | | |
| JP | 2671134 B2 * | 10/1997 | ............. | B60N 2/865 |
| JP | 2006-027593 A | 2/2006 | | |
| JP | 2012-250646 A | 12/2012 | | |

OTHER PUBLICATIONS

Feb. 17, 2015 Search Report issued in International Patent Application No. PCT/JP2014/083410.
Jun. 23, 2017 Extended Search Report issued in European Patent Application No. 14872960.1.
Jun. 1, 2017 Office Action issued in Chinese Patent Application No. 201480075864.8.
Jun. 21, 2016 International Preliminary Report on Patentability issued in International Patent Application No. PCT/JP2014/083410.
May 3, 2018 Office Action issued in Chinese Patent Application No. 201480075864.8.
Jan. 9, 2018 Office Action issued in Japanese Patent Application No. 2014-102854.
Jan. 9, 2018 Office Action issued in Japanese Patent Application No. 2014-102856.

\* cited by examiner

HEADREST HAVING ENGAGING MEMBERS AND LOCKING MECHANISM WITH ENGAGING PORTIONS

TECHNICAL FIELD

The present invention relates to a headrest.

BACKGROUND ART

The comfort and safety provided by a headrest of a seat is largely achieved by a proper position of the headrest relative to the head of a user of the seat. Techniques have been developed for adjusting not only the height but also the front-back position of the headrest with headrest pillars (see, for example, Patent Documents 1 and 2).

The headrest disclosed in Patent Document 1 includes a ratchet. The ratchet has gear teeth and works as an engaged member. A locking member is engaged stepwise with any of the gear teeth. These structures enable the front-back position of the headrest to be gradually adjusted to enhance the comfort and safety of the seat user.

The headrest disclosed in Patent Document 2 includes right and left pairs of X-links. These links are pivotally coupled about a link shaft (shaft) to adjust the front-back position of the headrest.

PRIOR ART DOCUMENT

Patent Document

Patent Document 1: JP 2012-250646 A
Patent Document 2: JP 2006-027593 A

SUMMARY OF INVENTION

Problem to be Solved by the Invention

The headrest disclosed in Patent Document 1 has an engaged member at the center between the right and left headrest pillars. The engaged member is engaged with the locking member. There is a demand for engaging the engaged member with the locking member more stably to facilitate the operation of the headrest.

An object of the present invention is to provide a headrest that can achieve a more stable engagement of the engaged member with the locking member.

Means for Solving the Problem

To solve the object descried above, the invention according to claim is a headrest including:
a right headrest pillar and a left headrest pillar apart from the right headrest pillar;
a fixed frame disposed on the headrest pillars;
a movable frame coupled to the fixed frame with a movable mechanism, the movable frame being movable in the front-back direction relative to the fixed frame; and
a front-back locking mechanism locking and unlocking a front-back movement of the movable frame relative to the fixed frame,
wherein the front-back locking mechanism includes:
a plurality of engaged members disposed outside the right and left headrest pillars in a width direction thereof; and
a locking member having a plurality of engaging portions to be respectively engaged with the engaged members to lock the movement of the movable frame.

The invention according to claim 2 is the headrest according to claim 1, wherein
the movable frame includes a front cover and a rear cover constituting a case having an internal cavity when assembled,
at least tops of the right and left headrest pillars, the fixed frame, the movable mechanism, and the front-back locking mechanism are disposed in the internal cavity defined by the front cover and the rear cover, and
the engaged members are disposed in the front-back direction and carried by the front cover and the rear cover.

The invention according to claim 3 is the headrest according to claim 1 or 2, wherein
the locking member is composed of metal and disposed in the vicinity of the fixed frame,
a bumper is disposed between the locking member and the fixed frame, and
the bumper comes into contact with the fixed frame in cooperation with the movement of the locking member toward the fixed frame.

The invention according to claim 4 is the headrest according to claim 3, wherein
the locking member includes:
an elongate held portion held by the fixed frame and extending along a width of the fixed frame;
the plurality of engaging portions extending in parallel with the held portion and engaged with the engaged members; and
a plurality of coupling portions, each coupling portion disposed between one end of the held portion and one end of the corresponding engaging portion,
the locking member is disposed on the fixed frame so as to surround the fixed frame, and
the bumper is mounted on the locking member from a side of the fixed frame toward outside.

The invention according to claim 5 is the headrest according to claim 3 or 4, wherein
the front-back locking mechanism is pivotally held by the movable frame and includes a pivoting operating member for operating the locking member, and
the bumper is configured to increase the area of contact between the locking member and the pivoting operating member.

The invention according to claim 6 is the headrest according to any one of claims 1 to 3, wherein
the fixed frame includes:
pillar inserting holes formed at horizontal ends of the fixed frame and receiving the right and left headrest pillars vertically extending therethrough; and
slits formed vertically in at least one of front and rear faces of the fixed frame and in communication with the pillar inserting holes, and
the right and left headrest pillars are each provided with a pillar retainer slidably disposed through the slit when the headrest pillar is inserted into the corresponding pillar inserting hole.

The invention according to claim 7 is the headrest according to any one of claims 1 to 6, wherein
the front-back locking mechanism includes an urging member that urges the engaging portions toward the engaged members, and the fixed frame includes:
a receiver being open toward a front face of the fixed frame and accommodating the corresponding urging member; and
a retainer regulating a frontward movement of the corresponding urging member accommodated in the corresponding receiver.

The invention according to claim 8 is the headrest according to any one of claims 1 to 7, wherein
the fixed frame includes a holder holding the locking member, the holder being disposed on a rear face of the fixed frame, and
the holder is disposed in the rear of at least the right and left headrest pillars.

The invention according to claim 9 is the headrest according to claim 8, wherein the fixed frame includes a stopper disposed on the rear face of the fixed frame and being in contact with the locking member along a mounting direction of the locking member on the holder to regulate the movement of the locking member in the opposite direction of the mounting direction.

The invention according to claim 10 is the headrest according to anyone of claims 1 to 9, including a link mechanism having a first link and a second link pivotally connected with a shaft, the first link and the second link each connecting the fixed frame and the movable frame, wherein
the shaft is inserted through a through-hole formed in at least one of the first link and the second link, and
a movement regulator is disposed on a side face of one of the first link and the second link, the shaft being inserted from the side face and the movement regulator regulating a movement of the shaft in an axial direction thereof.

The invention according to claim 11 is a headrest including:
a fixed frame disposed on a headrest pillar;
a movable frame adjustable in the front-back direction relative to the fixed frame; and
a link mechanism having a first link and a second link, the first link and the second link pivotally connected with a shaft, the first link and the second link each connecting the fixed frame and the movable frame,
wherein the shaft is inserted into through-holes formed in the central portions of the first link and the second link, and
a movement regulator is disposed on a side face of one of the first link and the second link, the shaft being inserted from the side face and the movement regulator regulating a movement of the shaft in its axial direction.

The invention according to claim 12 is the headrest according to claim 11, wherein
the side face of one of the first link and the second link recesses inwardly toward the position of the through-hole, the shaft being inserted from the side face, and
the movement regulator is disposed in the vicinity of the through-hole on the side face.

The invention according to claim 13 is the headrest according to claim 11 or 12, wherein
the movement regulator includes:
an elastic extension disposed on the side face, extending toward the through-hole, and being elastically deformed at least in a direction of insertion of the shaft when the shaft is inserted into the through-hole;
a guide disposed at a tip of the elastic extensions in extending direction thereof and guiding the shaft into the through-hole when the shaft is inserted into the through-hole; and
a restrictor disposed at the tip of the elastic extension in the extending direction thereof and regulating the movement of the shaft in its axial direction after the shaft is inserted into the through-hole.

The invention according to claim 14 is a headrest including:
a fixed frame disposed on a headrest pillar;
a movable frame adjustable in the front-back direction relative to the fixed frame; and
a link mechanism having a plurality of links coupling the fixed frame with the movable frame,
wherein the fixed frame and the movable frame have a plurality of supports pivotally supporting the links with shafts,
each shaft is inserted into through-holes formed in the link and the support laterally adjacent to each other among the plurality of links and the plurality of supports, and
a movement regulator is disposed on at least one of the fixed frame and the movable frame, the movement regulator regulating the movement of the shaft in its axial direction.

The invention according to claim 15 is the headrest according to claim 14, wherein
the movement regulator disposed on the movable frame is disposed on a side of insertion of the shaft,
the movement regulator includes:
a guide guiding the shaft into the through-hole when the shaft is inserted into the through-hole; and
a restrictor integrated with a portion of the guide, the portion being adjacent to the support, the restrictor regulating a movement of the shaft in its axial direction after the shaft is inserted into the through-hole.

The invention according to claim 16 is the headrest according to claim 15, wherein
the guide is elastic, deformed at the time of guiding the shaft, and resiliently restored after passage of the shaft, and
a position of the restrictor is away from the support, the position facing the shaft.

The invention according to claim 17 is a headrest including:
a fixed frame disposed on a headrest pillar;
a movable frame adjustable in the front-back direction relative to the fixed frame; and
a link mechanism connecting the fixed frame and the movable frame and including a first link and a second link having central portions, the central portions intersecting with each other and being pivotally connected,
wherein the fixed frame and the movable frame have a plurality of supports that pivotally support the first link and the second link with shafts,
the plurality of supports includes sliding supports each for slidably support an end of the first link and an end of the second link in the vertical direction,
among the sliding supports, a sliding support disposed on a side of a tip of the inserted shaft and receiving the tip extends vertically and includes a receiving portion having an angular U shape in cross sectional view, the receiving portion being open toward a side from which the shaft is inserted, and
the receiving portion of at least one of the supports includes a locator therein, the locator determining the position of the shaft in a direction of insertion such that a tip of the shaft inserted into the receiving portion abuts on the locator.

The invention according to claim 18 is the headrest according to claim 17, wherein
the locator is integrated with an upper or lower end of inside of the receiving portion, the locator protruding toward a side from which the shaft is to be inserted.

The invention according to claim 19 is a headrest including:
a fixed frame disposed on a headrest pillar;
a movable frame coupled to the fixed frame with a movable mechanism and movable in the front-back direction relative to the fixed frame; and
a front-back locking mechanism to lock and unlock a front-back movement of the movable frame relative to the fixed frame,
wherein the movable mechanism is a link mechanism having a plurality of links, the links having ends along their width, the ends being pivotally supported by the fixed frame and the movable frame, and
at least the movable frame among the fixed frame and the movable frame further supports a center of the link in its width direction, the link being disposed on a side of the movable frame.

The invention according to claim 20 is the headrest according to claim 19, wherein
the movable frame includes a front cover supporting a head,
the front cover includes:
a plurality of supports pivotally supporting the link at both ends of the link in their width direction; and
protruding ribs disposed in the central region between the supports and protruding from the rear face of the front cover to the link, and
the link supported by the front cover includes a cutout engaged with the protruding ribs.

EFFECTS OF THE INVENTION

According to the invention of claim 1, the front-back movement of the movable frame can be locked and unlocked outside, in the width direction, the right and left headrest pillars. This configuration can enhance the stability in engagement of the engaged members with the locking member.

According to the invention of claim 2, the front cover and the rear cover constitute the movable frame, which moves in the front-back direction, and can hold the multiple engaged members. This configuration can enhance the supporting rigidity of the engaged members.

According to the invention of claim 3, in cooperation with the movement of the locking member toward the fixed frame, the bumper comes into contact with the fixed frame. This configuration allows the bumper to regulate the moving range of the locking member, while preventing the direct contact of the locking member with the fixed frame to reduce the occurrence of abnormal sound.

According to the invention of claim 4, the locking member is disposed around the fixed frame. The bumper is mounted on the locking member from the side of the fixed frame toward outside. This indicates the existence of the fixed frame in the direction of detachment of the bumper from the locking member. This configuration can effectively suppress the detachment of the bumper from the locking member disposed on the fixed frame.

According to the invention of claim 5, the bumper increases the area of contact between the locking member and the pivoting operating member. This configuration can effectively increase the efficiency with which the pivoting operating member actuates the locking member.

According to the invention of claim 6, the pillar retainers may be disposed both in the front and in the rear. This configuration allows the pillar retainers to ensure a smooth operation of the front-back locking mechanism, which is disposed outside the right and left headrest pillars, and effectively prevent the detachment of the fixed frame from the right and left headrest pillars.

According to the invention of claim 7, each urging member can be readily accommodated into the corresponding receiver from the front face of the fixed frame and the corresponding retainer can suppress the removal of the urging member from the receiver.

According to the invention of claim 8, the locking member can be held by the holders in the vicinity of the front-back locking mechanism. This configuration can reduce the deformation of the locking member and successfully engage the locking member with the engaged members.

According to the invention of claim 9, the stoppers can regulate the movement of the locking member in the opposite direction of the mounting direction.

According to the invention of claim 10, the movement regulator is disposed on a side face, adjacent to a side of insertion of the shaft, of one of the first link and the second link, can effectively prevent the movement of the shaft inserted into a through-hole formed at least in one of the first link and the second link in its extending direction. As a result, the first link and the second link can be connected stably.

According to the invention of claim 11, the movement regulator, disposed on a side face, adjacent to a side of insertion of the shaft, of one of the first link and the second link, can effectively suppress the movement of the shaft inserted into a through-hole formed in the central portions of the first link and the second link in its extending direction. As a result, the first link and the second link, which intersects with each other, can be connected stably.

According to the invention of claim 12, the movement regulator is disposed at the bottom of the recess on the side face of the link. This configuration can reduce the size of the headrest, as compared with a headrest without a recessed side face.

According to the invention of claim 13, the elastic extension is elastically deformed in accordance with the insertion of the shaft. The guide, disposed at the tips of the elastic extensions in their extending direction, can guide the shaft through the through-hole. This configuration can enhance the ease of assembly of the shaft to each link. This configuration causes the elastic extension to be resiliently restored after the insertion of the shaft into the through-hole and allows the restrictors, disposed at the tips of the elastic extension in their extending direction, to regulate the movement of the shaft in its axial direction.

According to the invention of claim 14, the movement regulators can effectively regulate the movement of the shaft in its axial direction in the fixed frame and the movable frame. As a result, the multiple supports can stably support the first link and the second link.

According to the invention of claim 15, the guide can guide the shaft into the through-hole to enhance the ease of assembly of the shaft to the support. The restrictor, integrated with the portions, adjacent to the support, of the guides, can regulate the movement of the shaft in its axial direction immediately after the insertion of the shaft into the through-hole.

According to the invention of claim 16, the position, facing the shaft, of the restrictor is away from the support. This configuration facilitates the deformation of the elastic guide, which is integrated with the restrictor, at the time of guiding the shaft. This, in turn, allows the guide to readily guide the shaft and the restrictor to regulate the movement of the shaft in its axial direction immediately after the passage of the shaft beyond the guide.

According to the invention of claim 17, the shaft collides with the locator disposed inside the receiving portion at the time of insertion of the shaft into the receiving portion. This configuration can enhance the positioning accuracy of the shaft at the time of assembly. Once the shaft collided with the locator, the shaft cannot further move into the back. This configuration prevents the contact of the tip of an inserted shaft with the bottom of the receiving portion to enable a smooth slide of the shaft according to the rotation of the links.

According to the invention of claim 18, the locator, which is integrated with the upper or lower end of the inside of the receiving portion, can enhance the positioning accuracy in the direction of insertion of the shaft and the rigidity of the receiving portion.

According to the invention of claim 19, at least the movable frame of the fixed frame and the movable frame further supports a link, adjacent to the movable frame, in the center of its width. This configuration can more effectively reduce the looseness of the link in the right-left direction than a single support of the link at both ends along the width.

According to the invention of claim 20, the link supported by the front cover includes a cutout engaged with the protruding ribs. The protruding ribs support the link in the center of its width at the time of pivoting the link.

DESCRIPTION OF PREFERRED EMBODIMENT

Figure 1:
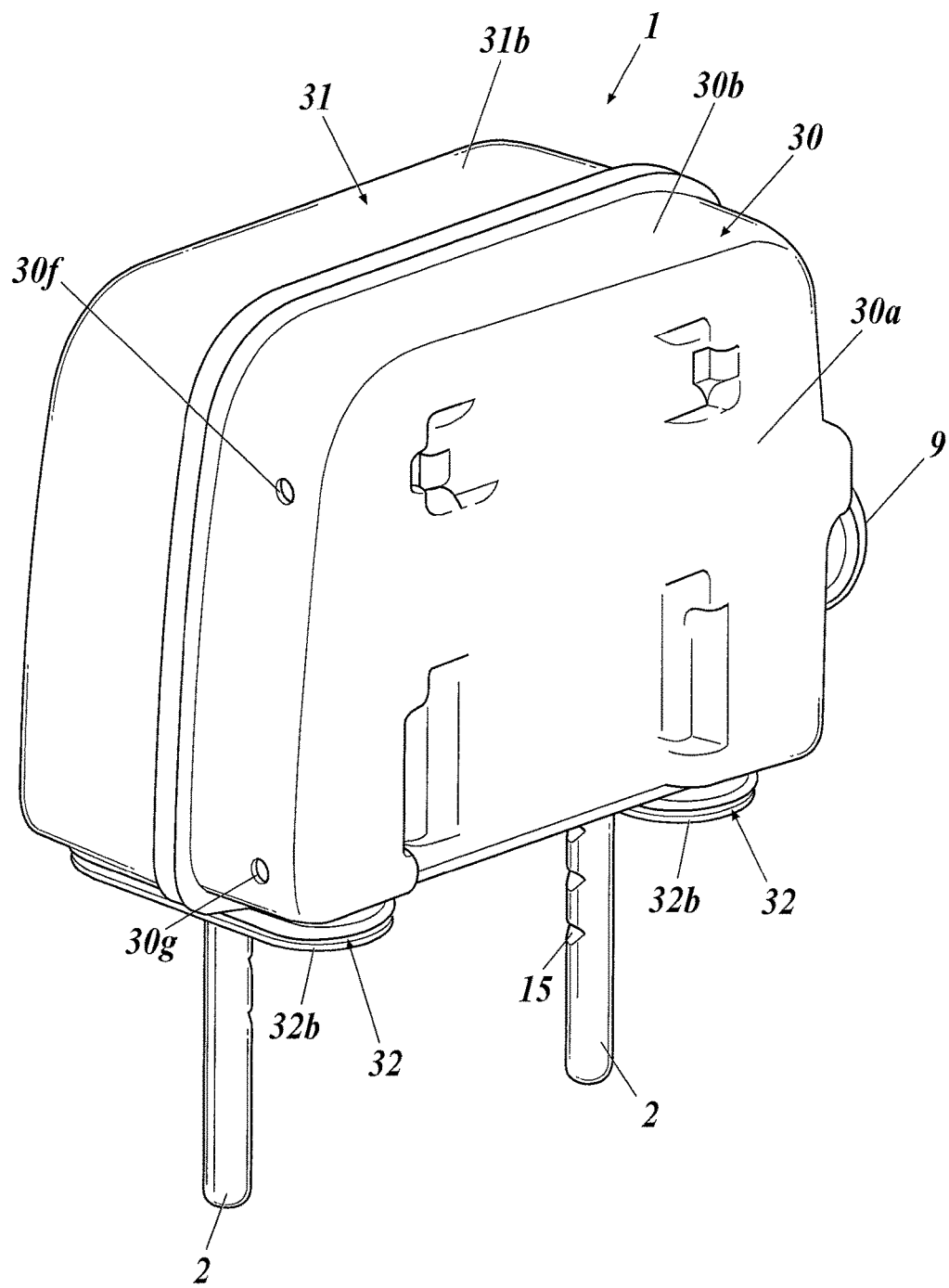
FIG. 1 is a perspective view of a headrest according to a first embodiment of the present invention.

With reference to the drawings, embodiments of the present invention will now be described.

[First Embodiment]

With reference to FIGS. 1 to 16, a headrest 1 according to this embodiment includes a pair of right and left headrest pillars 2, 2 separate from each other, a pair of right and left holders 3, 3, a fixed frame 4, a movable frame 5, a movable mechanism, a front-back locking mechanism, a vertical locking mechanism, and an operating unit 9. The headrest 1 includes a cushion pad 150 and skin sheets 160 surrounding the headrest 1.

The headrest 1 is mounted on the top of a backrest of a vehicle seat.

The front and back, up and down, and right and left directions according to this embodiment are the same as those of a vehicle seat and a vehicle.

The right and left holders 3, 3 are mounted on a backrest frame which serves as a framework of the backrest.

The right and left headrest pillars 2 extend below the headrest 1 and are held by the right and left holders 3, 3. In other words, the headrest 1 is mounted on the backrest frame via the right and left headrest pillars 2, 2 and the right and left holders 3, 3.

The right and left headrest pillars 2 have an identical diameter. At least one of the right and left headrest pillars 2, 2 has a plurality of notches 15 formed along its length at certain intervals.

The right and left headrest pillars 2, 2 are held by the right and left holders 3, 3, respectively, and vertically movable along the right and left holders 3, 3.

The right and left holders 3, 3 each include a cylinder 3a, a cover 3b, and a head 3c. The cylinder 3a holds the right or left headrest pillar 2, 2. The cover 3b covers the cylinder 3a. The head 3c is disposed at the top of the cylinder 3a.

The head 3c is provided with a lock 3d which is engaged with any of the notches 15 of the right or left headrest pillar 2, 2 to prevent the detachment of the headrest pillar 2, 2.

The right and left headrest pillars 2, 2 are inserted into pillar inserting holes 20, 20 of the fixed frame 4 (described below) and provided with pillar retainers 2a, 2a which are disposed slidably through slits 20a of the fixed frame 4 (described below). The pillar retainers 2a, 2a are disposed in the front and the rear direction of the headrest pillars 2. The pillar retainers 2a, 2a can prevent the detachment of the fixed frame 4 from the right and left headrest pillars 2, 2, while ensuring a smooth operation of the front-back locking mechanism, disposed outside the right and left headrest pillars 2, 2. The pillar retainers 2a, 2a also function as rotation stoppers to prevent the rotation of the right and left headrest pillars 2 in the circumferential direction.

The fixed frame 4 has the right and left headrest pillars 2, 2 disposed at its right and left ends and is mounted on the backrest frame via the right and left headrest pillars 2, 2.

The fixed frame 4 is vertically movable along the right and left headrest pillars 2, 2.

The movable frame 5 is movable relative to the fixed frame 4 in the front-back direction and coupled to the fixed frame 4 with the movable mechanism. More specifically, the movable frame 5 is coupled to the fixed frame 4 with the movable mechanism and movable forward away from and backward to the fixed frame 4.

The movable frame 5 includes a front cover 30 and a rear cover 31, which together constitutes a hollow case in an assembled state. The internal cavity defined by the front cover 30 and the rear cover 31 at least accommodates the tops of the right and left headrest pillars 2, 2, the fixed frame 4, the movable mechanism, and the front-back locking mechanism.

The movable mechanism couples the fixed frame 4 to the movable frame 5. For example, a link mechanism having links 6 and 7 is adopted as a movable mechanism. The links 6 and 7 are pivotally supported by the fixed frame 4 and the movable frame 5 at the both ends of their width direction.

In this embodiment, an X-link mechanism is adopted. The X-link mechanism includes a first or inside link 6 and a second or outside link 7. These links are pivotally connected about a central intersection 8.

The front-back locking mechanism locks and unlocks the front-back movement of the movable frame 5 relative to the fixed frame 4. The front-back locking mechanism includes a plurality of engaged members 10, 10, a locking member 11, urging members 12, and a pivoting member 13. The locking member 11 is engageable with the engaged members 10. Each urging member 12 urges the corresponding engaging portion 71 (described below) of the locking member 11 toward the corresponding engaged member 10. The pivoting member 13 is pivotally held by the movable frame 5 and operates the locking member 11.

The vertical locking mechanism locks and unlocks the fixed frame 4 at several vertical positions of the right and left headrest pillars 2, 2. The vertical locking mechanism includes a vertical locking member 14 (described below).

The operating unit 9 exposes from the outer surface of the headrest 1 and operates the front-back locking mechanism and the vertical locking mechanism concurrently. More specifically, the operating unit 9 unlocks the front-back movement of the movable frame 5 and the vertical movement of the fixed frame 4 via the pivoting member 13.

The operating unit 9 is configured to operate the locking mechanisms along the width of the headrest. Although the operating unit 9 may be operated manually or automatically, the manual operation is adopted for this embodiment.

The operating unit 9 according to this embodiment is a button 9 to be pressed toward inside the headrest 1 to manipulate the front-back locking mechanism and the vertical locking mechanism.

The fixed frame 4, the movable frame 5, and the X-link mechanism will now be described in detail.

(Fixed Frame)

Figure 2:
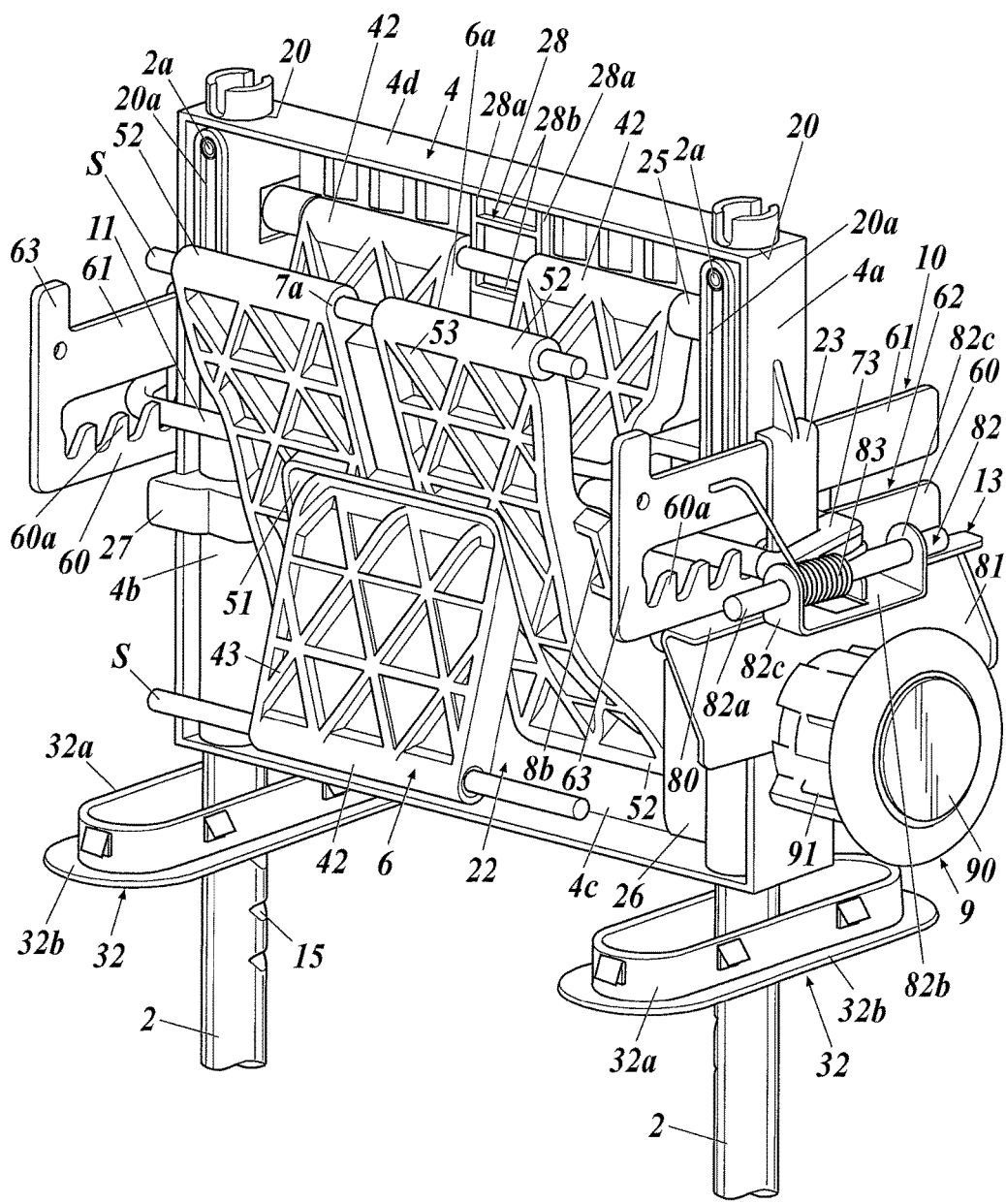
FIG. 2 is a perspective view of an internal structure of the headrest according to the first embodiment of the present invention.
Figure 9:
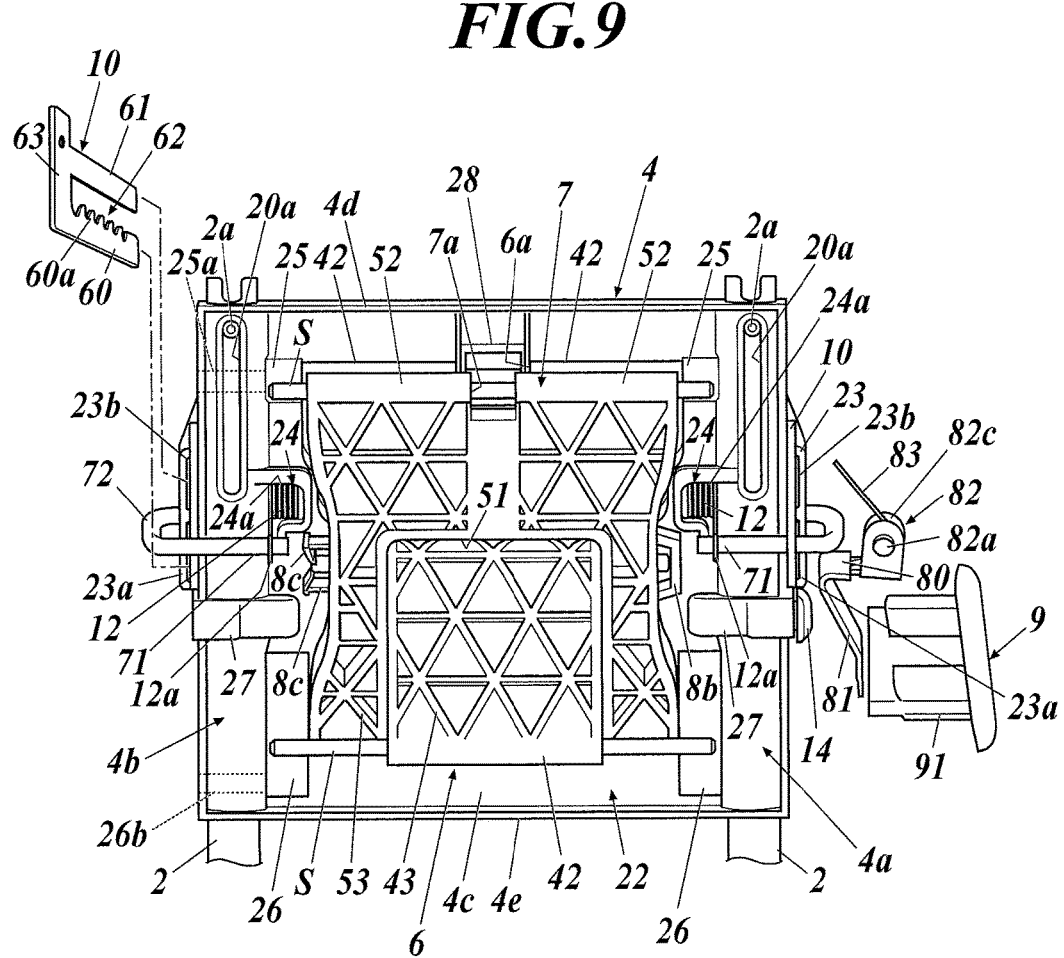
FIG. 9 is a front view of the internal structure of the headrest according to the first embodiment of the present invention.
Figure 13:
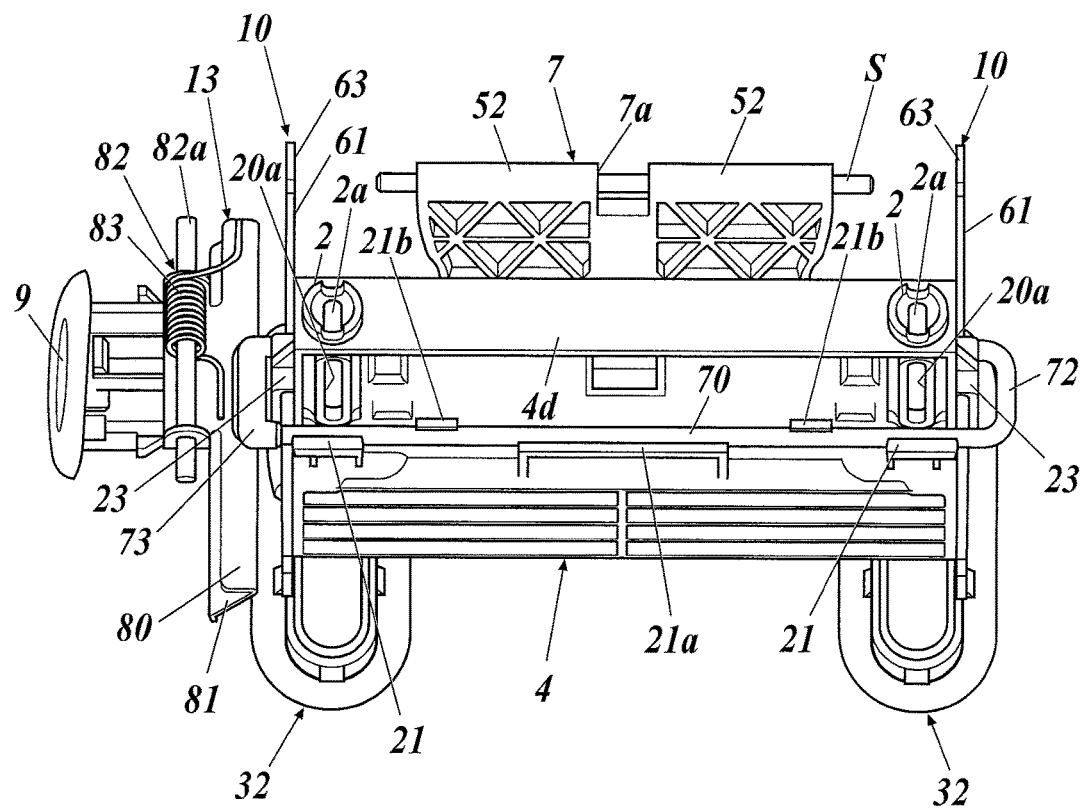
FIG. 13 is a perspective plan view of the internal structure of the headrest according to the first embodiment of the present invention.

The fixed frame 4 is made of resin and composed of a block, as shown in FIGS. 2, 9, and 13. The fixed frame 4 includes a pair of right and left pillar holders 4a and 4b, a rear-face coupler 4c, couplers 4d and 4e, a plurality of holders 21, 21, a plurality of mounts 23, 23, a plurality of receivers 24, 24, a plurality of retainers 24a, 24a, a plurality of supports 25 and 26, a lock holder 27, and a protruding rib 28. All of these portions of the fixed frame 4 are integrated.

The right and left pillar holders 4a and 4b are disposed on the right and left ends of the fixed frame 4 and constitute the right and left ends of the fixed frame 4. The right and left pillar holders 4a and 4b hold the right and left headrest pillars 2, 2, respectively. This configuration allows the fixed frame 4 to be vertically movable along the right and left headrest pillars 2, 2.

The right and left pillar holders 4a and 4b have pillar inserting holes 20 into which the right and left headrest pillars 2, 2 are inserted. The pillar inserting holes 20 extend through the right and left pillar holders 4a and 4b along their length (in the vertical direction).

The slits 20a, 20a are formed at least in one of the front and rear faces of the fixed frame 4. The slits 20a, 20a extend vertically and are in communication with the pillar inserting holes 20, 20. In this embodiment, the slits 20a, 20a are formed on both the front and rear faces.

These slits 20a, 20a in the right and left headrest pillars 2 are each provided with the pillar retainer 2a. Each pillar retainer 2a protrudes from the headrest pillar 2 in the front-back direction. The pillar retainers 2a, 2a are disposed and fixed on the headrest pillars 2, 2 after insertion of the right and left headrest pillars 2, 2 into the pillar inserting holes 20, 20.

The rear-face coupler 4c is a plate disposed between the right and left pillar holders 4a and 4b to couple the right and left pillar holders 4a and 4b.

The rear-face coupler 4c is provided with a plurality of holders 21, 21 on its rear face. The holders 21 each hold a held portion 70 of the locking member 11 (described below). The holders 21 are each in the form of a hook opening upward in the side view and disposed at least in the rear of the right and left headrest pillars 2, 2.

Similarly, the rear-face coupler 4c is provided with a central holder 21a on its rear face. The central holder 21a holds the center of the held portion 70 of the locking member 11. The central holder 21a is in the form of a hook opening upward in the side view and disposed side by side with the holders 21, 21 in the horizontal direction.

The rear-face coupler 4c is provided with a plurality of stoppers 21b on its rear face. The stoppers 21b come into contact with the locking member 11 in the direction in which the locking member 11 is mounted on the holders 21, 21, to prevent the movement of the locking member 11 in the direction opposite to the mounting direction. The stoppers 21b have a convex shape protruding backward from the rear face.

The stoppers 21b, 21b are each disposed between a holder 21, 21 and the central holder 21a.

In the side view, gaps are formed between the tips of the holders 21, 21 and the central holder 21a and between the tips of the stoppers 21b, 21b. The held portion 70 of the locking member 11 may be mounted through the gaps.

The coupler 4d is a plate disposed between the tops of the right and left pillar holders 4a and 4b and coupling the tops of the right and left pillar holders 4a and 4b. The top of the coupler 4d is flush with the tops of the right and left pillar holders 4a and 4b.

The coupler 4e is a plate disposed between the bottoms of the right and left pillar holders 4a and 4b and coupling the bottoms of the right and left pillar holders 4a and 4b. The bottom of the coupler 4e is flush with the bottoms of the right and left pillar holders 4a and 4b.

A portion, surrounded by the right and left pillar holders 4a and 4b and the couplers 4d and 4e, of the fixed frame 4 is a dent 22. More specifically, the dent 22 is a space surrounded by the opposing faces of the right and left pillar holders 4a and 4b, the front face of the rear-face coupler 4c, the lower face of the coupler 4d, and the upper face of the coupler 4e.

Figure 7:
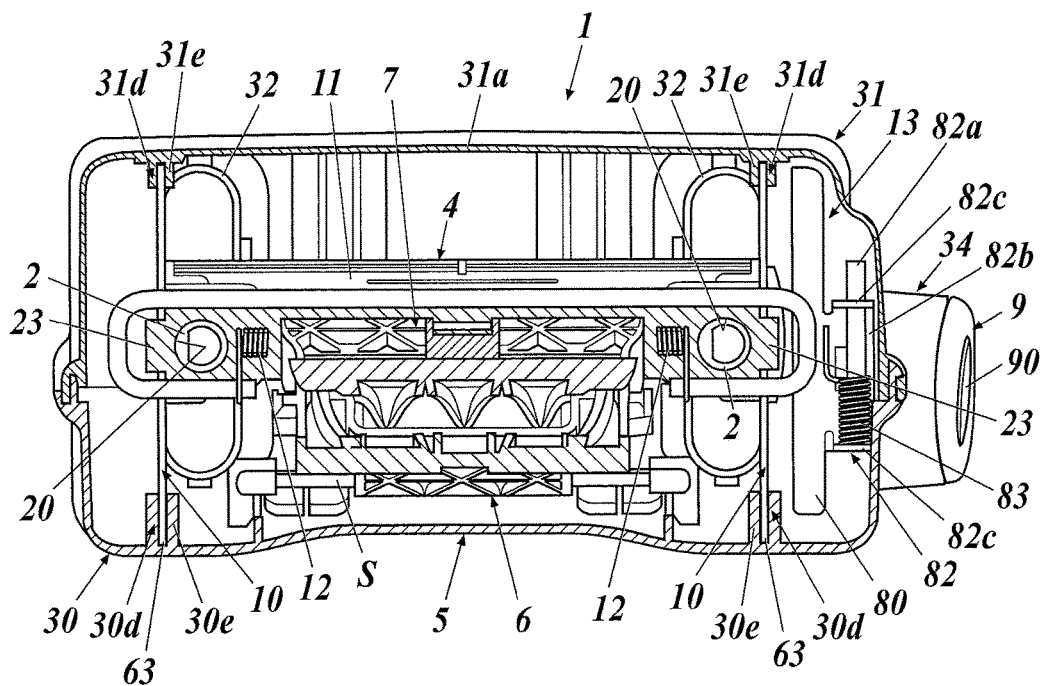
FIG. 7 a cross-sectional plan view of the headrest according to the first embodiment of the present invention.

Such a dent 22 accommodates the movable mechanism when the movable frame 5 approaches the fixed frame 4, as shown in FIG. 7.

The both right and left side faces of the rear-face coupler 4c are each provided with a mount 23 protruding laterally, as shown in FIGS. 2, 7, and 9. The mounts 23 receive the engaged members 10, 10 which constitutes the front-back locking mechanism.

Each mount 23 is provided with through-holes 23a and 23b. The through-holes 23a and 23b are formed at positions corresponding to a first projection 60 and a second projection 61 (described below) of the engaged member 10. The first projection 60 and the second projection 61 are inserted into the through-holes 23a and 23b, respectively. In other words, the through-holes 23a and 23b extend through the mount 23 in the front-back direction.

The mounts 23 that receive the engaged members 10, which constitute the front-back locking mechanism, are disposed on the both right and left side faces of the rear-face coupler 4c, i.e., outside the width of the right and left headrest pillars 2, 2. In other words, the engaged members 10 are disposed outside the right and left headrest pillars 2 along their width.

Figure 12:
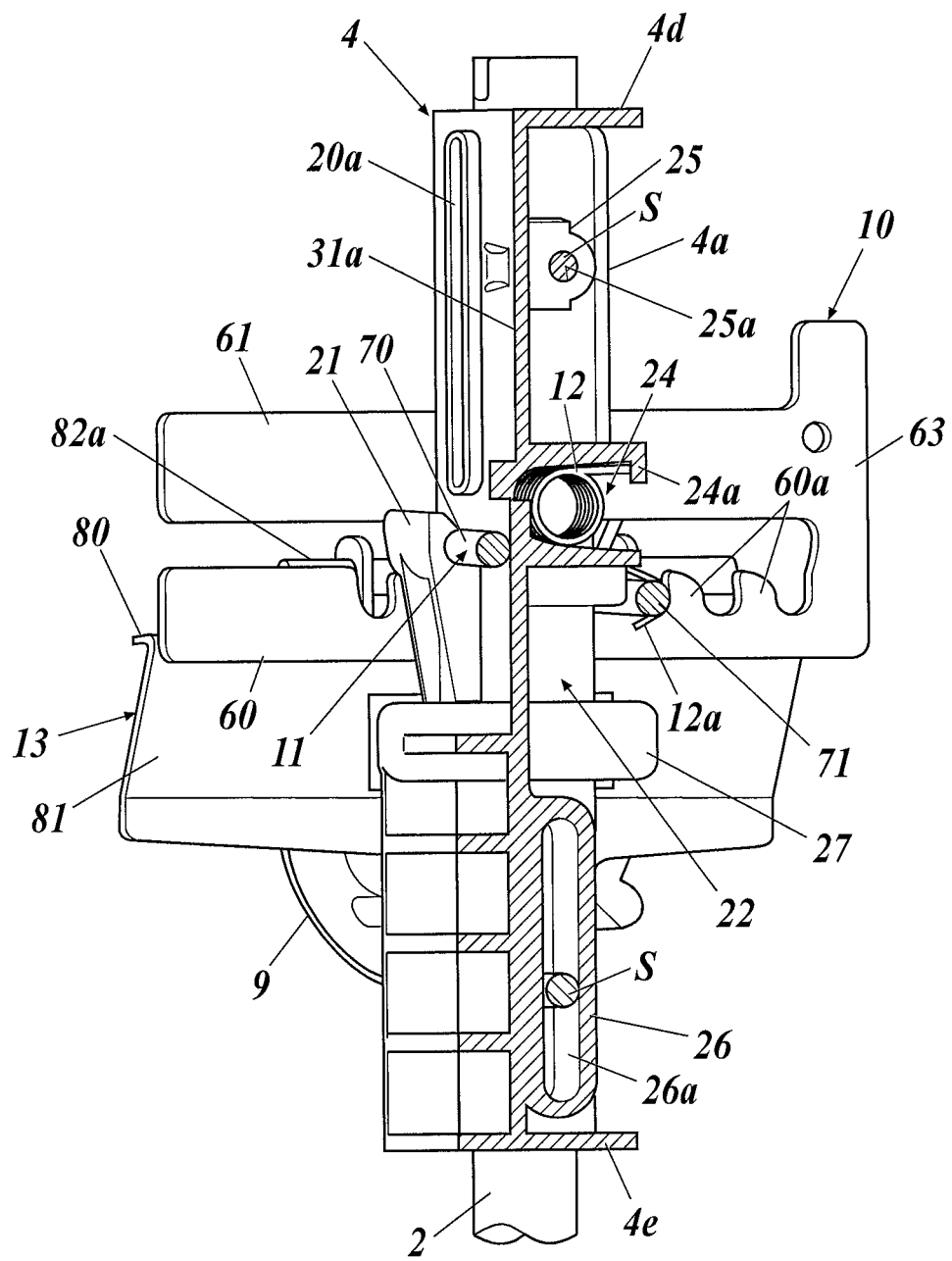
FIG. 12 is a cross-sectional side view of the internal structure of the headrest according to the first embodiment of the present invention.

The receivers 24, 24 are open toward the front of the fixed frame 4, as shown in FIGS. 9 and 12, and receive the urging members 12. More specifically, the receivers 24, 24 are boxes integrated with the surfaces, adjacent to the dent 22, of the right and left pillar holders 4a and 4b and the rear-face coupler 4c.

Each retainer 24a prevents the forward movement of the urging member 12 accommodated in the receiver 24. The retainer 24a is integrated with the receiver 24 and protrudes downward from the front end of the receiver 24.

The urging members 12 accommodated in the receivers 24 are each a coil spring having a hook 12a at one end. The hook 12a is received by the corresponding engaging portion 71. When the urging member 12 is accommodated into the receiver 24, the other end of the urging member 12 is received by the retainer 24a.

Each engaging portion 71 is urged by the corresponding coil spring 12 toward the multiple teeth 60a of the corresponding engaged member 10 (described below).

The supports 25 and 26 support the inside link 6 and the outside link 7, which constitutes the X-link mechanism. The inside link 6 and the outside link 7 are pivotally connected to the supports 25 and 26.

The supports 25 and 26 are disposed on the upper and lower surfaces, facing each other, of the right and left pillar holders 4a and 4b. In other words, the supports 25 and 26 are disposed at four corners of the dent 22.

The upper supports 25, 25 are integrated with the right and left pillar holders 4a and 4b and the rear-face coupler 4c. The lower supports 26, 26 are integrated with the right and left pillar holders 4a and 4b and the rear-face coupler 4c.

The upper supports 25 have insertion holes 25a into which a connecting rod (shaft) S is to be inserted. The connecting rod S is assembled to the fixed frame 4 from a side remote from the operating unit 9. Thus, the insertion hole 25a in the pillar holder 4b, remote from operating unit 9, is a through-hole horizontally extending through the pillar holder 4b. The insertion holes 25a in the upper supports 25, 25 are circular.

Of the right and left pillar holders 4a and 4b, the insertion of the connecting rod S starts with the insertion hole 25a having an opening in the side face of the pillar holder 4b. The connecting rod S is connected with the link 6.

The connecting rod S pivots the inside link 6 and the outside link 7 to the supports 25 and 26. In this embodiment, the connecting rod S is a metal shaft (pivoting shaft). The connecting rod S extends through the link 6 or 7 and the supports 25, 25.

The lower supports 26, 26 are vertically more elongated than the upper supports 25, 25.

The supports 26, 26 have holes 26a formed on the surfaces, adjacent to the dent 22, of the lower supports 26. A connecting rod S is inserted into the holes 26a. The holes 26a in the lower supports 26 are holes (slits) vertically elongated along the lower supports 26, 26. The supports 26, 26 receive the outside link 7 via the connecting rod S inserted into the holes 26a. In other words, the lower rear edges of the inside link 6 and the outside link 7 are slidably supported by the supports 26, 26 in the vertical direction.

As described above, the connecting rod S is assembled to a side, remote from the operating unit 9, of the fixed frame 4. Thus, a through-hole 26b (circular hole) for assembling the connecting rod S is provided at the lowest position of the hole 26a in the support 26 adjacent to the pillar holder 4b. The through-hole 26b extends through the pillar holder 4b horizontally.

The interval between the rear edges of the inside link 6 and the outside link 7 is greater at the time of assembling each end of the inside link 6 and the outside link 7 into the fixed frame 4 (supports 25 and 26) than at the time of sliding the lower ends (of the rear edge of the outside link 7).

The lock holder 27 holds the vertical locking member 14, which constitutes the vertical locking mechanism, and is disposed in the vicinity of the lower end of the right and left pillar holder 4a and 4b. One of the right and left pillar holders 4a and 4b is provided with the vertical locking member 14. In this embodiment, the vertical locking member 14 is disposed on the left side of the headrest 1. In other words, the lock holder 27 adjacent to the operating unit 9 holds the vertical locking member 14.

With reference to FIGS. 2 and 9, the protruding rib 28 is a frame-like rib disposed at the center of the top of the front face of the rear-face coupler 4c. The frame protrudes toward the front.

The frame protruding rib 28 includes vertical ribs 28a and horizontal ribs 28b. The vertical ribs 28a are integrated with the rear-face coupler 4c and the coupler 4d. The horizontal ribs 28b are integrated with the rear-face coupler 4c and the vertical ribs 28a.

The protruding rib 28 is disposed at the center between the supports 25, 25. A cutout 6a to be engaged with the protruding rib 28 is provided at the center of the top (rear end) of the inside link 6. When the inside link 6 is connected to the supports 25, 25 via the connecting rod S, the protruding rib 28 is engaged with the cutout 6a. The fixed frame 4 supports the inside link 6 with the supports 25, 25 and the center of the width of the inside link 6 disposed adjacent to the fixed frame 4.

(Movable Frame)

The movable frame 5 is disposed adjacent to the head of an occupant and movable in the front-back direction relative to the fixed frame. More specifically, the movable frame 5 can move in the front-back direction relative to the fixed frame 4, as shown in FIGS. 1 to 7, 15, and 16.

The movable frame 5 is composed of resin and includes the front cover 30, the rear cover 31, bottom edge covers 32, 32, holders 33, a button mount 34, a plurality of supports 35 and 36, guiding contacts (guides) 37, and protruding ribs 38. The front cover 30, the rear cover 31, and the bottom edge covers 32, 32 of the movable frame 5 are fabricated separately.

The front cover 30 and the rear cover 31 are combined to form a hollow case.

The front cover 30 supports a head. The front cover 30 includes a front (front wall) 30a and a peripheral side face (peripheral wall) 30b. The peripheral side face 30b extends backwardly from the upper and lower and right and left edges of the front 30a. The portions constituting the front cover 30 are integrated.

Figure 5:
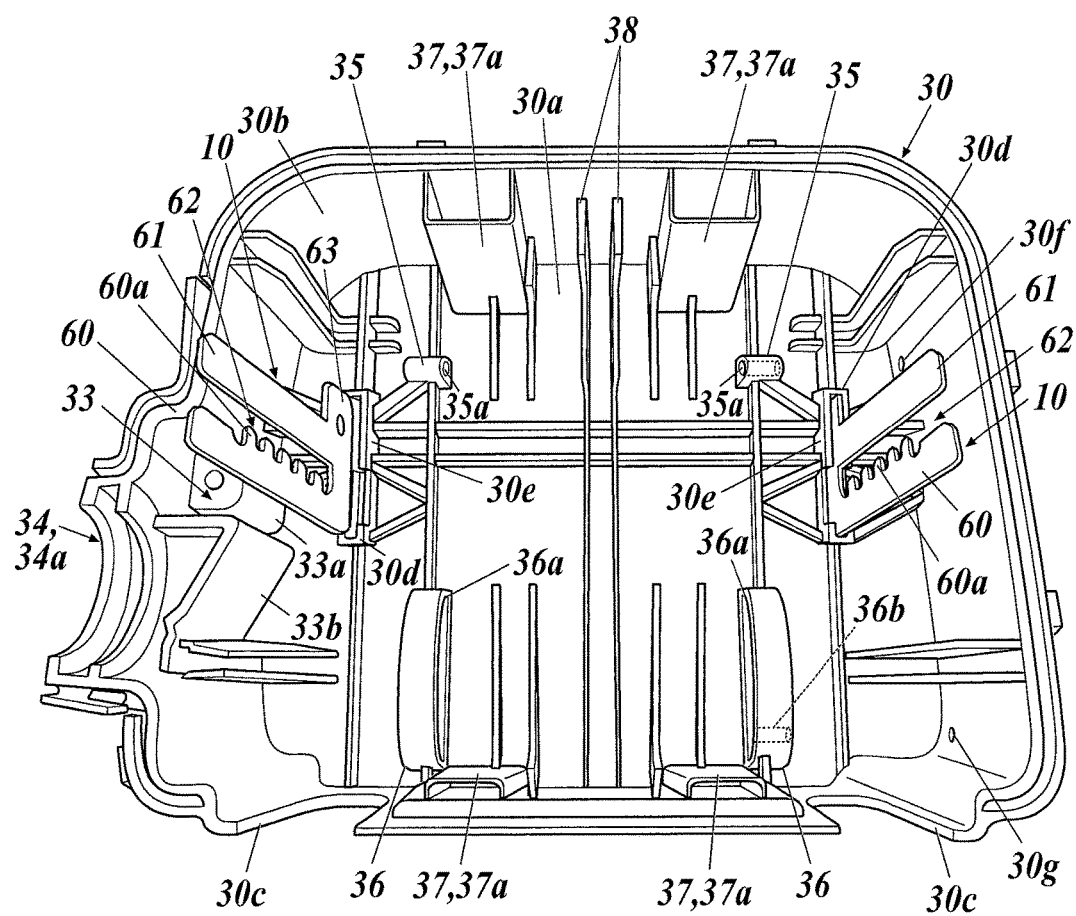
FIG. 5 is a perspective view of the rear face of the front cover and engaged members according to the first embodiment of the present invention.

As shown in FIG. 5, reinforcing ribs are disposed, as needed, on the rear faces of the front 30a and the peripheral side face 30b to effectively support a boundary between the front 30a and the peripheral side face 30b and the load of the head.

The rear cover 31 includes a rear (rear wall) 31a and a peripheral side face (peripheral wall) 31b. The peripheral side face 31b extends forward from the upper and lower and right and left edges of the rear 31a. The peripheral side face 31b of the rear cover 31 is coupled to the peripheral side face 30b of the front cover 30 to form the case.

Figure 6:
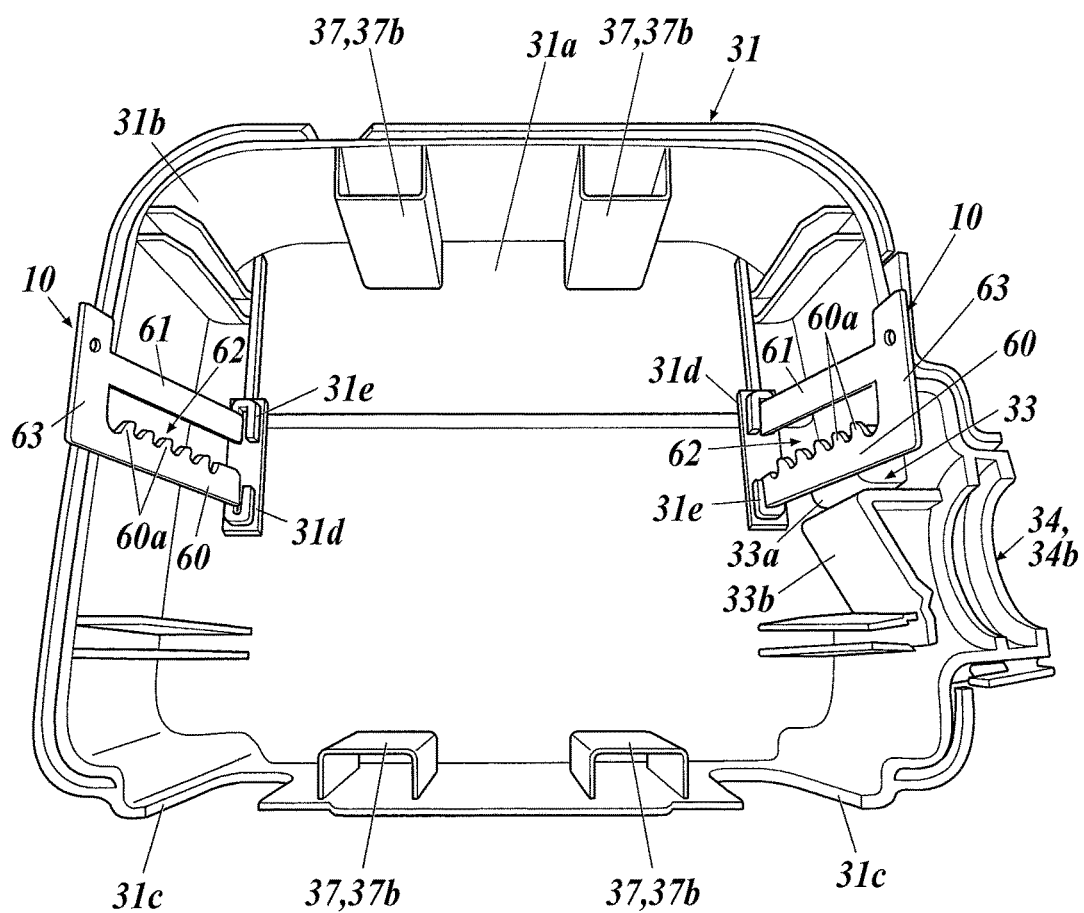
FIG. 6 is a perspective view of the front face of the rear cover and the engaged members according to the first embodiment of the present invention.

With reference to FIG. 6, reinforcing ribs are disposed, as needed, on the rear faces of the rear 31a and the peripheral side face 31b to reinforce the boundary between the rear 31a and the peripheral side face 31b.

The peripheral side face 30b of the front cover 30 is fitted to the peripheral side face 31b of the rear cover 31 via a fitting structure. Alternatively, other known techniques may be used.

With reference to FIG. 5, the front cover 30 includes base end receivers 30d. Each base end receiver 30d is disposed at a position corresponding to that of a base end 63 of the corresponding engaged member 10 (described below) so as to receive the corresponding base end 63. The base end receiver 30d protrudes from the rear surface of the front cover 30 and includes a wall 30e surrounding the base end 63.

With reference to FIG. 6, the rear cover 31 includes tip receivers 31d, 31d. The tip receivers 31d, 31d are disposed at a position corresponding to those of the tip of the first projection 60 and the tip of the second projection 61 of the corresponding engaged member 10 (described below) so as to receive the tips. The tip receivers 31d protrude from the front face of the rear cover 31. The tip receivers 31d each include walls 31e, 31e surrounding the tip of the first projection 60 and the tip of the second projection 61.

Each engaged member 10 is disposed in the front-back direction. The base end 63 of engaged member 10 is held by the front cover 30, while the tips of the first projection 60 and the second projection 61 are held by the rear cover 31. Thus, the engaged member 10 is carried between the front cover 30 and the rear cover 31.

The bottom edge covers 32 are fitted to two long holes (described below) in the bottom of the case, which is formed when the front cover 30 is coupled to the rear cover 31. The bottom edge cover 32 each include a cylinder 32a and a flange 32b. The cylinder 32a is inserted into the corresponding long hole. The flange 32b is disposed at the lower end of the cylinder 32a and comes into contact with the bottom of the case.

On the bottoms of the peripheral side faces 30b and 31b, are provided pairs of notches 30c and 31c, respectively, into which the right and left headrest pillars 2, 2 and the bottom edge covers 32, 32 are inserted. The notches 30c and 31c in each pair are each a semi-ellipse and can together form one long hole on the bottom of the case when the peripheral side face 30b is coupled to the peripheral side face 31b.

The two long holes are formed on the bottom of the case and disposed to enable the front-back movement of the movable frame 5 along the length of the holes. The cylinders 32a are also disposed to enable the front-back movement of the movable frame 5 along the length of the cylinders 32a.

The holders 33 hold a pivoting shaft 82 of the pivoting member 13 (described below). With reference to FIGS. 5, 6, and 9, the holders 33 are provided on the inner faces (in the internal cavity of the case) of at least one of the right and left side faces of the peripheral side face 30b of the front cover 30 and the peripheral side face 31b of the rear cover 31.

More specifically, the holders 33 each include an insertion holder 33a and a regulator 33b.

The insertion holders 33a, 33a are disposed on the front cover 30 and the rear cover 31 and each have a hole into which one end of the pivoting shaft 82 is inserted.

The regulators 33b are disposed on the front cover 30 and the rear cover 31 to prevent the movement of the pivoting member 13 to the side of the operating button 9. The regulators 33b are each formed in accordance with the shape of the pivoting member 13 and in contact with the pivoting member 13 to prevent the movement of the pivoting member 13 when the operation unit is not operated.

With reference to FIGS. 2 to 5, the button mount 34 is a mount through which a button 9 serving as the operating unit is mounted on the front cover 30 and the rear cover 31 and disposed on the side faces of the front cover 30 and the rear cover 31.

The button mount 34 is a cylinder protruding from the side faces of the front cover 30 and the rear cover 31 and includes a front cylinder 34a disposed adjacent to the front cover 30 and a rear cylinder 34b disposed adjacent to the rear cover 31.

The button 9 is mounted on the button mount 34 so as to be surrounded by the front cylinder 34a, adjacent to the front cover 30, and by the rear cylinder 34b, adjacent to the rear cover 31.

The supports 35 and 36 support the inside link 6 and the outside link 7, which constitutes the X-link mechanism. The inside link 6 and the outside link 7 are pivotally connected to the supports 35 and 36.

The supports 35 and 36 are disposed on the rear surface of the front cover 30 at positions corresponding to those of the front edges of inside link 6 and the outside link 7. The supports 35 and 36 are disposed on the rear surface of the front cover 30 at the upper and lower lateral ends thereof.

In other words, the supports are provided at four positions in the rear surface of the front cover 30. The front edge of the outside link 7 is connected to the upper supports 35, 35. The front edge of the inside link 6 is connected to the lower supports 36, 36.

The upper supports 35 each have an insertion hole 35a into which a connecting rod S is inserted in the horizontal direction. The insertion holes 35a of the upper supports 35 are circular.

A through-hole 30f is disposed on the right or left side face, remote from the operating button 9, of the peripheral side face 30b of the front cover 30. More specifically, the through-hole 30f resides on the extension of the insertion holes 35a, 35a of the upper supports 35, 35.

The connecting rod S is inserted into the insertion holes 35a of the supports 35 through the through-hole 30f to connect the front edge of the outside link 7 to the supports 35. In other words, the connecting rod S extends through the outside link 7 and the support 35 adjacent to the through-hole 30f.

The lower supports 36, 36 are longer than the upper supports 35, 35 in the vertical direction.

The supports 36, 36 each have a hole 36a into which the connecting rod S is to be inserted on the face facing the other support 36. The holes 36a of the lower supports 36, 36 are vertically elongated holes (slits) along the lower supports 36, 36. The supports 36, 36 receive the inside link 6 via the connecting rod S inserted into the holes 36a, 36a. In other words, among the front edges of the inside link 6 and the outside link 7, the lower edges are supported slidably in the vertical direction of the supports 36, 36.

The connecting rod S is assembled from a side, remote from the operating unit 9, of the front cover 30. A through-hole 30g is formed on the right or left side face, remote from the operating unit 9, of the peripheral side face 30b of the front cover 30. The support 36 remote from the operating button 9 has a through-hole 36b, which resides on the extension of the through-hole 30g. The through-hole 36b in the support 36 is disposed at the lowest position of the hole 36a and extends through the support 36 in the horizontal direction.

The interval between the front edges of the inside link 6 and the outside link 7 is greater at the time of assembling the ends of the inside link 6 and the outside link 7 into the supports 35 and 36 than at the time of sliding the lower ends (of the front edge of the inside link 6).

The relation among the fixed frame 4, the front cover 30, the inside link 6 and the outside link 7 will now be described in detail. As described above, the upper or lower ends (in this embodiment, the lower end) of the front edge and the rear edge of the inside link 6 and the outside link 7 are supported slidably in the vertical direction of the lower supports 26 and 36.

The intervals between the front edges of the inside link 6 and the outside link 7 and between the rear edges of the inside link 6 and the outside link 7 are configured to be greater at the time of assembling the ends of the inside link 6 and the outside link 7 into the front cover 30 and the fixed frame 4 than at the time of sliding the lower ends in the holes 26a and 36a of the supports 26 and 36, respectively.

In other words, when the lower ends of the inside link 6 and the outside link 7 are connected to the supports 26 and 36, the insertion of the connecting rod S starts with the through-holes 26b and 36b of the supports 26 and 36, respectively. The connecting rod S is designed so as not to fall below the through-holes 26b and 36b once assembled.

Figure 4:
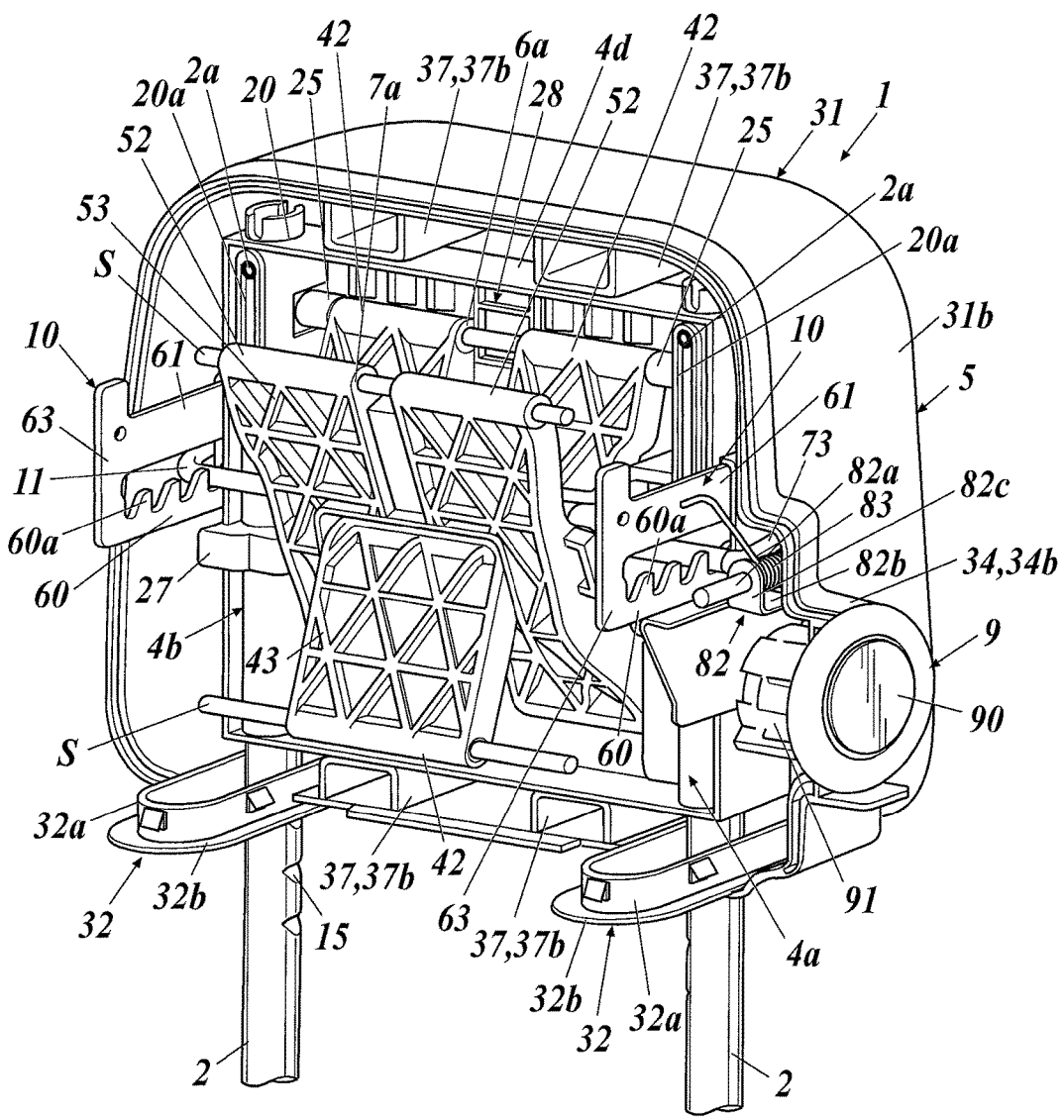
FIG. 4 is a perspective view of the headrest covered with a rear cover according to the first embodiment of the present invention.

With reference to FIGS. 4 to 6, the guiding contacts 37 come into contact with the fixed frame 4 in the case, composed of the front cover 30 and the rear cover 31, to guide the movement of the movable frame 5.

The guiding contacts 37 are disposed on at least one of the inner faces of the top and the bottom of the case. In this embodiment, the guiding contacts 37 are provided on both the inner faces of the top and the bottom of the case.

The guiding contacts 37 include front guiding contacts (lower contacts) 37a, 37a and rear guiding contacts 37b, 37b. The front guiding contacts are disposed on the peripheral side face 30b of the front cover 30. The rear guiding contacts 37b are disposed on the peripheral side face 31b of the rear cover 31.

The fixed frame 4 is fitted between the upper and lower guiding contacts 37 when accommodated into the case, composed of the front cover 30 and the rear cover 31. The movable frame 5 moves in the front-back direction, while constantly keeping the upper and lower guiding contacts 37 in contact with the upper and lower ends of the fixed frame 4.

Figure 3:
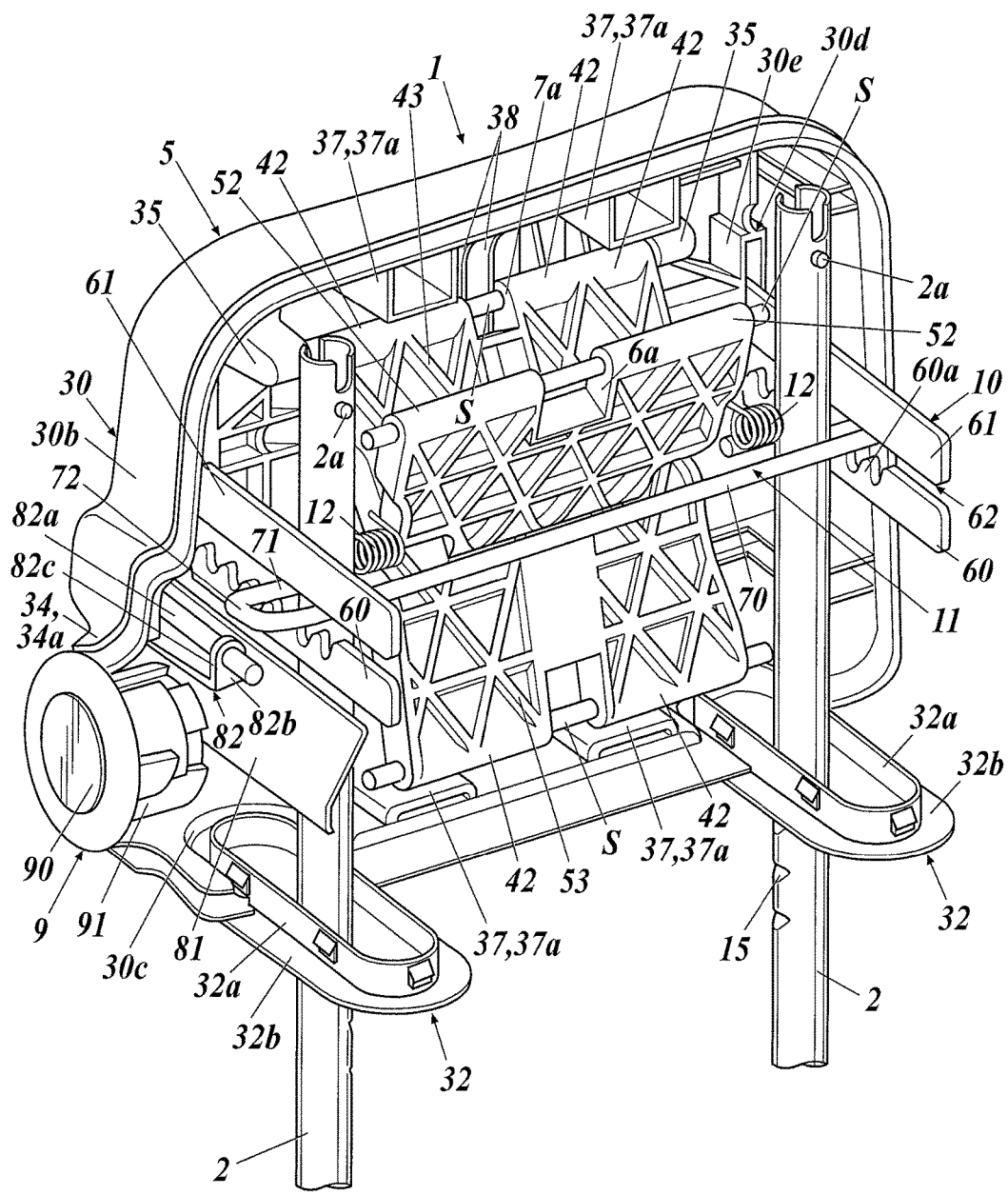
FIG. 3 is a perspective view of the headrest covered with a front cover according to the first embodiment of the present invention.

With reference to FIGS. 3 to 5, the protruding ribs 38 are disposed on the rear face of the front 30a of the front cover 30 and extend from the top of the peripheral side face 30b to the bottom of the peripheral side face 30b via the front 30a. The protruding ribs 38 are disposed at predetermined intervals.

The protruding ribs 38 are disposed at the center between the supports 35. The outside link 7 is provided with a cutout 7a fitted to the protruding ribs 38 in the center of the top (front end). When the outside link 7 is connected to the supports 35 via the connecting rod S, the protruding ribs 38 are fitted to the cutout 7a. The movable frame 5 supports the outside link 7 with the supports 35 and the center of the width of the outside link 7 disposed adjacent to the movable frame 5.

The protruding ribs 38, 38 are fitted to the cutout 7a such that the outer surfaces of the protruding ribs 38, 38 are in contact with the both sides of the cutout 7a.

(X-Link Mechanism)

With reference to FIGS. 2 to 4, the inside link 6 of the X-link mechanism has the upper (rear) edge adjacent to the fixed frame 4 and the lower (front) edge adjacent to the movable frame 5. The lower edge extends through an insertion hole 51 (described below) of the outside link 7.

The outside link 7 has the upper (front) edge adjacent to the movable frame 5 and the lower (rear) edge adjacent to the fixed frame 4.

Alternatively, the front-back direction of the inside link 6 and the outside link 7 may be reversed. The X-link mechanism is composed of resin, except for the connecting rod S.

The upper edge of the inside link 6 is disposed between the upper supports 25, 25 on the right and left sides of the fixed frame 4.

The lower edge of the outside link 7 is disposed between the lower supports 26, 26 on the right and left sides of the fixed frame 4.

The lower edge of the inside link 6 is disposed between the lower supports 36, 36 on the right and left sides of the movable frame 5.

The upper edge of the outside link 7 is disposed between the upper supports 35, 35 on the right and left sides of the movable frame 5.

As described above, the upper edges of the inside link 6 and the outside link 7 are supported by the fixed frame 4 and the movable frame 5, respectively, in the center of their width.

Figure 15:
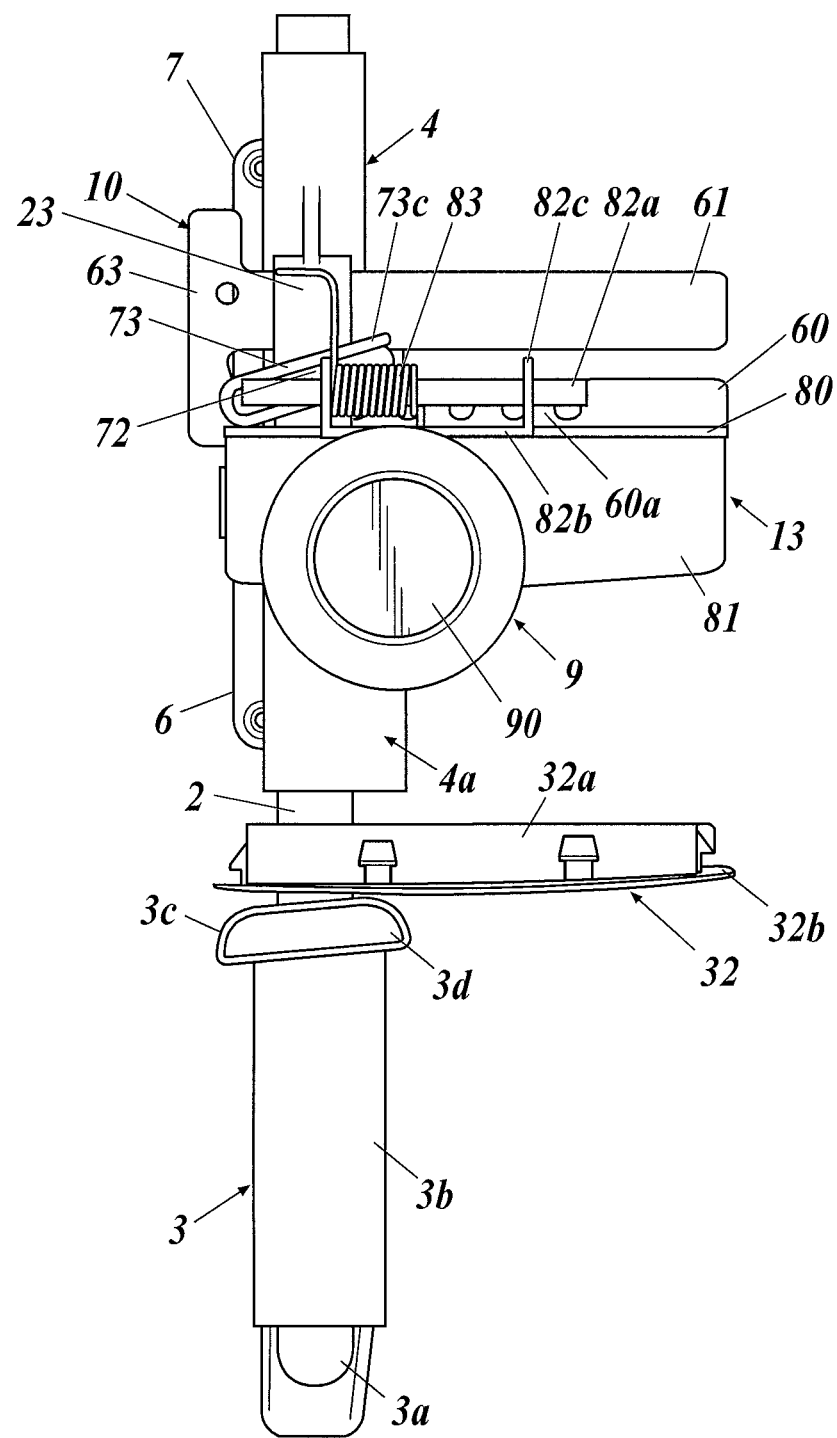
FIG. 15 is a side view of the internal structure of the headrest according to the first embodiment of the present invention before operation.

The inside link 6 and the outside link 7 are curved in side view. As shown in FIG. 15, the inside link 6 and the outside link 7 are folded into a shape suitable for being accommodated in the dent 22 of the fixed frame 4.

The inside link 6 and outside link 7 are pivotally connected about the central intersection 8.

One link of the X-link mechanism inevitably intersects with the other link at a site. The intersection 8 is disposed at the site at which the inside link 6 and the outside link 7 of the X-link mechanism intersect with each other.

Figure 10:
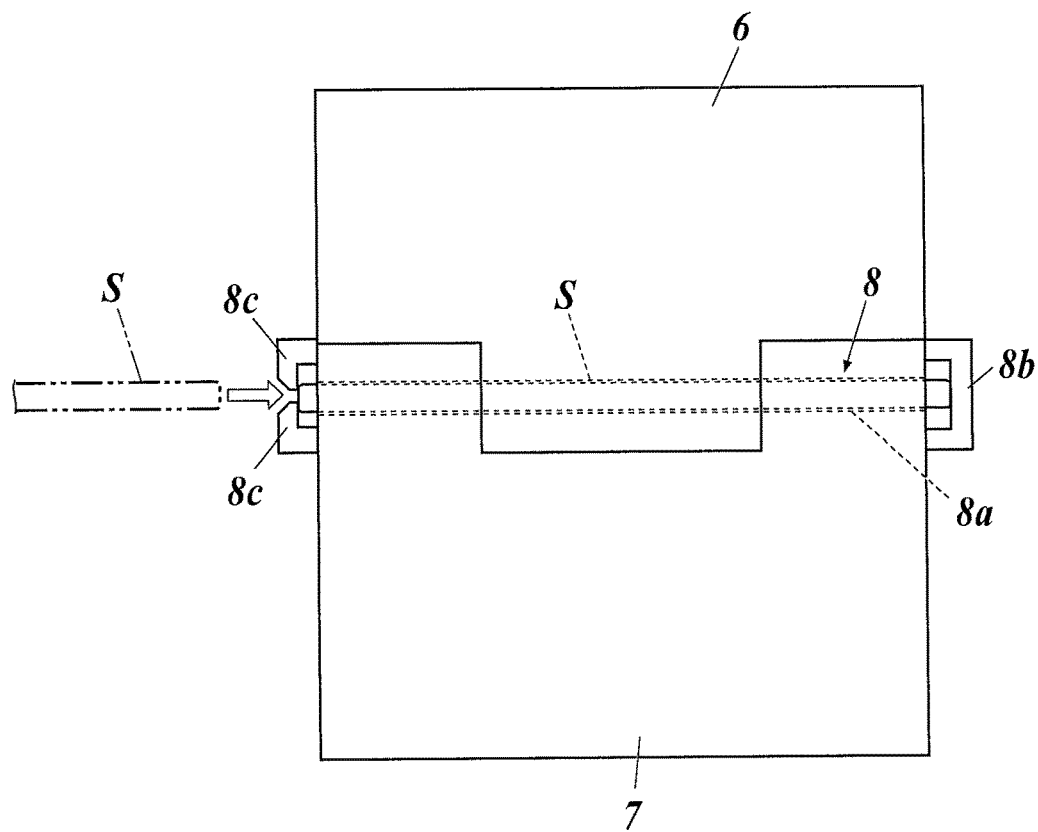
FIG. 10 is a schematic view of a structure of a central intersection of an X-link mechanism according to the first embodiment of the present invention.

With reference to FIGS. 9 and 10, the intersection 8 is disposed at the point of intersection of a line connecting the connecting rods S disposed in the upper and lower edges of the inside link 6 and a line connecting the connecting rods S disposed in the upper and lower edges of the outside link 7.

The intersection 8 includes a hole 8a, the connecting rod S inserted into the hole 8a, a stopper 8b, and a retaining craw 8c.

The hole 8a extends through the inside link 6 and the outside link 7 in the width direction.

The stopper 8b is disposed at the opposite end of an end of the width of the intersection 8 into which the connecting rods S is inserted. The stopper 8b is disposed to cover the hole 8a.

The retaining craws 8c are disposed at an end of the width of the intersection 8 into which the connecting rods S is inserted. The retaining craws 8c are elastic and disposed such that their tips cover the hole 8a.

The connecting rod S is inserted into the hole 8a as follows: the connecting rod S is inserted into the hole 8a through the gap between the retaining craws 8c until the end, in the opposite direction of the direction of insertion, of the connecting rod S passes beyond the tips of the retaining craws 8c. The retaining craws 8c, which are elastic, are elastically deformed at the time of insertion of the connecting rod S and are resiliently restored at the time of passage of the end, in the opposite direction of the direction of insertion, of the connecting rod S beyond the tips of the retaining craws 8c.

The intersection 8, which has the above configuration, allows the inside link 6 and the outside link 7 to be pivotally connected with the connecting rods S, which work as pivoting shafts.

The inside link 6 according to this embodiment is generally wide in the horizontal direction. The width of the inside link in the horizontal direction from the lower edge to the center at which the inside link is inserted into the insertion hole 51 of the outside link 7 is narrower than that of the inside link from the upper edge to the center.

The inside link 6 is provided with a plurality of connecting portions 42 on the upper and lower edges. The connecting portions 42 are connected to the upper supports 25, 25 of the fixed frame 4 and the lower supports 36, 36 of the movable frame 5 and supported by the upper supports 25, 25 and the lower supports 36, 36. The connecting portions 42 have through-holes (circular holes) into which the connecting rod S is inserted. The through-holes extend through the connecting portions 42 along their width.

The through-holes formed in the upper edge of the connecting portions 42 reside on the extension of the insertion holes 25a, 25a formed in the upper supports 25, 25 of the fixed frame 4. The connecting rod S is inserted into the circular holes in the upper supports 25 and the circular holes in the connecting portions 42 of the upper edges. The upper edge of the inside link 6 is pivotally connected to the fixed frame 4 about the connecting rod S with the connecting rod S.

The upper edge of the inside link 6 has the cutout 6a to which the protruding rib 28 of the fixed frame 4 are fitted. In other words, the two connecting portions 42 are provided on the upper edge of the inside link 6 on the both sides of the cutout 6a.

The cutout 6a is disposed such that the connecting rod S does not interfere with the protruding rib 28. In other words, the protruding rib 28 protrudes so as not to come into contact with the connecting rod S.

Similarly, the connecting portion 42 in the lower edge of the inside link 6 has a through-hole (circular hole).

A connecting rod S is inserted into the long holes 36a, 36a in the lower supports 36, 36 of the movable frame 5 and in the circular hole in the lower connecting portion 42. The lower edge of the inside link 6 is pivotally connected to the movable frame 5 about the connecting rod S with the connecting rod S.

The connecting rod S inserted into the lower connecting portion 42 of the inside link 6 is vertically movable along the long holes 36a formed in the lower supports 36. The lower edge of the inside link 6 is vertically movable along the lower supports 36 in accordance with the front-back movement of the movable frame 5.

The inside link 6 has several ribs 43 formed on the surface thereof. The ribs 43 are disposed so as to form a truss structure on the surface of the inside link 6. Such ribs 43 can enhance the rigidity and reduce the weight of the inside link 6.

The outside link 7 according to this embodiment is generally wide in the horizontal direction. The outside link 7 is provided with the insertion hole 51 into which the central and lower portions of the inside link 6 are inserted at its center.

The outside link 7 includes a plurality of connecting portions 52 disposed on the upper and lower edges. The connecting portions 52 are connected to the upper supports 35, 35 of the front cover 30 and the lower supports 26, 26 of the fixed frame 4 and supported by the upper supports 35, 35 and the lower supports 26, 26. The connecting portions 52 each have a through-hole (circular hole) into which a connecting rod S is inserted. The through-hole extends through the connecting portions 52 in the lateral width direction.

The through-holes extending through the upper connecting portions 52 are disposed on the extension of the insertion holes 35a, 35a of the upper supports 35, 35 of the front cover 30. The connecting rod S is inserted into the circular holes of the upper supports 35, 35 and into the circular holes of the upper connecting portions 42. In other words, the upper edge of the outside link 7 is pivotally connected to the front cover 30 about the connecting rod S with the connecting rod S.

The upper edge of the outside link 7 has cutout 7a to which the protruding ribs 38 of the front cover 30 are fitted. The two connecting portions 52 are provided on the upper edge of the outside link 7 on the both sides of the cutout 7a.

The cutout 7a is disposed such that the connecting rod S does not interfere with the protruding ribs 38. In other words, the protruding ribs 38 protrude so as not to come into contact with the connecting rod S.

Similarly, the connecting portions 52 of the lower edge of the outside link 7 also have through-holes (circular holes) formed.

A connecting rod S is inserted into the long holes 26a, 26a of the lower supports 26, 26 of the fixed frame 4 and into the circular holes of the lower connecting portions 52. In other words, the lower edge of the outside link 7 is pivotally connected to the fixed frame 4 about the connecting rod S with the connecting rod S.

The connecting rod S inserted into the connecting portions 52 of the lower edge of the outside link 7 is vertically movable along the long holes 26a, 26a in the lower supports 26, 26. In other words, the lower edge of the outside link 7 is vertically movable along the lower supports 26 in accordance with the front-back movement of the movable frame 5.

The outside link 7 has several ribs 53 formed on the surface thereof. The ribs 53 are disposed so as to form a truss structure on the surface of the outside link 7. Such ribs 53 can enhance the rigidity and reduce the weight of the outside link 7.

The connecting rods S used in the X-link mechanism are metal shafts pivotally coupling the inside link 6 and the outside link 7 to the fixed frame 4 and the front cover 30 of the movable frame 5.

The connecting rods S are configured to be assembled to the fixed frame 4 and the front cover 30 of the movable frame 5 from a side remote from the operating unit 9.

Figure 11:
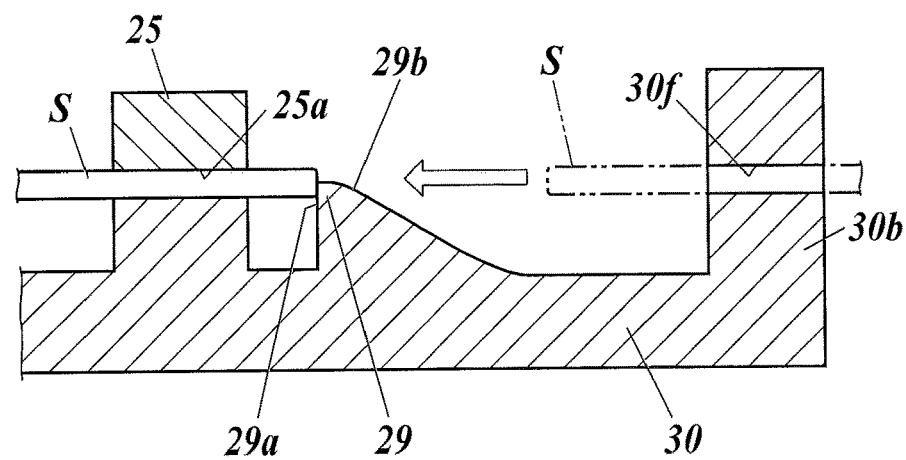
FIG. 11 is a schematic view of an exemplary mounting of a connecting rod according to the first embodiment of the present invention.

As shown in FIG. 11, a retainer 29 for retaining the connecting rod S may be disposed in the vicinity of each support 25. The retainer 29 is a projection that includes a vertical wall 29a and an inclined wall 29b. The tip of the projection is elastic. A connecting rod S is inserted into the insertion hole 25a of the support 25 as follows: The connecting rod S is inserted into the through-hole 30f and then inserted into the insertion hole 25a until the end, in the opposite direction of the direction of insertion, of the connecting rod S passes beyond the tip of the retainer 29. The retainer 29 is elastically deformed at the time of insertion of the connecting rod S and is resiliently restored at the time of passage of the end, in the opposite direction of the direction of insertion, of the connecting rod S beyond the tip of the retainer 29.

The above configuration allows the movable frame 5 to move forward away from and backward to the fixed frame 4 with the X-link mechanism, a movable mechanism.

The front-back locking mechanism and the vertical locking mechanism will now be described in detail.

(Front-Back Locking Mechanism)

The front-back locking mechanism includes a plurality of engaged members 10, the locking member 11, the urging members 12, and the pivoting member 13. The locking member 11 is engaged with the engaged members 10. The urging members 12 each urge the locking member 11 to the corresponding engaged member 10. The pivoting member 13 is pivotally held by the movable frame 5 and operates the locking member 11.

The engaged members 10 are composed of metal, disposed in the front-back direction, and carried by the front cover 30 and the rear cover 31, as shown in FIGS. 2 to 7.

The engaged members 10 are disposed outside the right and left headrest pillars 2 along their width.

The engaged member 10 each have a ratchet structure having teeth 60a disposed in the front-back direction. The teeth 60a protrude upward.

Each engaged member 10 includes the first projection 60, the second projection 61, a gap 62, and a base end 63.

The base end 63 is received by the base end receiver 30d of the front cover 30. The first projection 60 protrudes toward the rear cover 31 from the end of the lower half of the base end 63. The second projection 61 protrudes toward the rear cover 31 from end of the upper half of the base end 63.

The first projection 60 has the teeth 60a, which are core elements of the engaged member 10 serving as a ratchet structure. The teeth 60a protrude diagonally upward from the upper edge of the first projection 60.

The second projection 61 is disposed in parallel with the first projection 60 with a gap from the tops of the teeth 60a. The gap between the second projection 61 and the teeth 60a of the first projection 60 corresponds to the gap 62.

The tips of the first projection 60 and the second projection 61 are each received by the tip receiver 31d of the rear cover 31.

Each engaged member 10 has the first projection 60 extending through a through-hole 23a of the mount 23 and the second projection 61 extending through a through-hole 23b of the mount 23. Thus, the engaged members 10, 10 are disposed outside the right and left headrest pillars 2, 2 along their width. The first projection 60 and the second projection 61 move through the through-holes 23a and 23b in the front-back direction, respectively, in accordance with the front-back movement of the movable frame 5.

Figure 8:
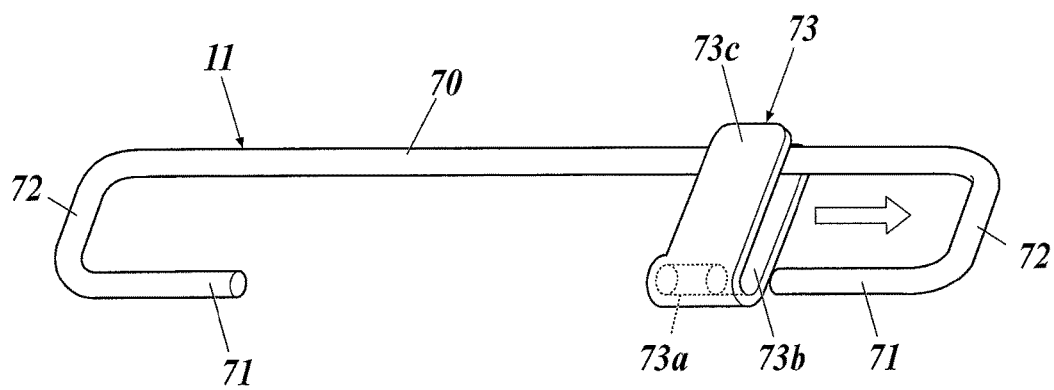
FIG. 8 is a perspective view of a locking member and a bumper according to the first embodiment of the present invention.

The locking member 11, which is engaged with the engaged members 10, constitutes a core structure of the front-back locking mechanism together with the engaged members 10. With reference to FIGS. 7 to 9, the locking member 11 includes the held portion 70, the engaging portions 71, and the coupling portions 72.

The held portion 70 is a long metal shaft extending along the width of the fixed frame 4 and held by the fixed frame 4. With reference to FIGS. 7 and 13, the held portion 70, which is disposed in the rear of the fixed frame 4, is mounted through a gap between the tips of the holders 21, 21 and the central holder 21a, disposed on the rear face of the fixed frame 4, and the tips of the stoppers 21b, 21b.

The held portion 70 is disposed in the gap 62 between the first projection 60 and the second projection 61. The held portion 70 is disposed above the engaging portions 71, 71.

The engaging portions 71, 71 are metal shafts to be engaged with the engaged members 10, 10 to lock the movement of the movable frame 5.

More specifically, the engaging portions 71, 71 are disposed in parallel with the held portion 70, pivot about the held portion 70, and are urged toward the teeth 60a for engagement. The engaging portions 71, 71 are disposed in front of the fixed frame 4.

The engaging portions 71, 71 are disposed in positions that allow them to be engaged with the teeth 60a when urged by the urging members 12 and return to the position of the gap 62 when operated in the opposite direction of the urging direction. When the engaging portions 71, 71 move to the position of the gap 62, the lock is released.

As shown in FIG. 7, the ends or tips, adjacent to the teeth 60a, of the engaging portions 71, 71 extend inside the engaged members 10, 10 but do not reach the X-link mechanism.

The coupling portions 72 are metal shafts disposed on the right and left sides of the fixed frame 4 to couple the ends of the held portion 70 to the ends of the engaging portions 71.

The locking member 11 is disposed in the vicinity of the fixed frame 4 and in the form of a substantially C shape surrounding the fixed frame 4. The held portion 70, the engaging portions 71, 71, and the coupling portions 72, 72 are integrated. The corners between the held portion 70 and the coupling portions 72, 72 and those between the coupling portions 72, 72 and the engaging portions 71, 71 are round.

With reference to FIG. 8, a bumper 73 composed of resin is provided between the locking member 11 and the fixed frame 4. The coupling portion 72 adjacent to the pivoting member 13 is provided with the bumper 73 such that the bumper 73 covers the coupling portion 72, and the ends, adjacent to the corresponding coupling portion 72, of the held portion 70 and the engaging portion 71. The coupling portion 72 includes the bumper 73.

As shown in FIG. 8, the bumper 73 is mounted on the locking member 11 and then moved toward the outside of the fixed frame 4.

The bumper 73 includes an insertion hole 73a, a groove 73b, and a covering wall 73c. The insertion hole 73a is a hole into which the engaging portion 71 is inserted. The groove 73b is a groove into which the coupling portion 72 adjacent to the bumper 73 is fitted. The covering wall 73c covers the coupling portion 72.

The groove 73b is formed such that the end, adjacent to the coupling portion 72, of the held portion 70 and the coupling portion 72 can be fitted into the groove 73b. The insertion hole 73a extends through the bottom of the groove 73b.

The bumper 73, having such a shape, is mounted on the locking member 11 as follows: one engaging portion 71 is inserted into the insertion hole 73a, while the end, adjacent to the coupling portion 72, of the held portion 70 is fitted into the groove 73b and the bumper 73 is moved in the direction shown by the arrow in FIG. 8 to fit the coupling portion 72 into the groove 73b.

The bumper 73 is configured to increase the area of contact between the locking member 11 and the pivoting member 13.

The bumper 73, which entirely covers the coupling portion 72 of the locking member 11, has a thickness greater than the diameter of the coupling portion 72.

The locking member 11 and the pivoting member 13 both pivot. If the bumper 73 were not mounted on the locking member 11, the rounded corners of the locking member 11 would escape from the contact when the pivoting member 13 comes into contact with to rotate the locking member 11, resulting in a reduction in actuation efficiency of the locking member 11. To solve this problem, the bumper 73 is mounted on the locking member 11 to increase the area of contact between the locking member 11 and the pivoting member 13. This can prevent a reduction in efficiency with which the pivoting member 13 actuates the locking member 11.

The bumper 73 is designed to come into contact with the fixed frame 4 when the locking member 11 moves toward the fixed frame 4. As a result, the bumper 73 can restrict the moving range of the locking member 11, while preventing a direct contact of the locking member 11 with the fixed frame 4 to reduce the occurrence of abnormal sound.

The urging members 12 each urge the corresponding engaging portion 71, 71 of the locking member 11 toward the corresponding engaged member 10 (the side of the teeth 60a). In this embodiment, the urging members 12 are coil springs, which are accommodated in the receivers 24, 24, as described above.

The hook 12a of each urging member 12 is hooked around the engaging portion 71 from above.

The pivoting member 13 is composed of metal, pivotally held by the movable frame 5, and operates the engaging portions 71 of the locking member 11. With reference to FIGS. 5, 6, and 9, the pivoting member 13 is held by the front cover 30 and the rear cover 31 through the holders 33.

The pivoting member 13 operates the engaging portions 71 of the locking member 11 in the opposite direction of the urging direction of the urging members 12 to cause the engaging portions 71 to pivot in a direction to disengage the engaging portions 71 from the teeth 60a of the engaged members 10. The pivoting member 13 is oriented such that the engaging portions 71 of the locking member 11 are urged by the urging members 12. The pivoting member 13 gradually inclines downward from the rear toward the front. In other words, the holders 33 are disposed inclined so that the pivoting member 13 can be inclined.

The pivoting member 13 includes a first operating board 80, a second operating board 81, a pivoting shaft 82, and an urging member 83. The first operating board 80 and the second operating board 81 are integrated.

The first operating board 80 operates the front-back locking mechanism, is disposed below the coupling portion 72 of the locking member 11, and comes into contact with the bumper 73 from below. The protruding tip of the first operating board 80 is disposed below the pivoting shaft 82. Pivoting the first operating board 80 upward about the pivoting shaft 82 can move the bumper 73 upward.

The second operating board 81 operates the vertical locking mechanism. The second operating board 81 is integrated with the first operating board 80 and extends diagonally downward from the end, adjacent to the fixed frame 4, of the first operating board 80 toward the operating unit 9. The protruding tip of the second operating board 81 is disposed below the vertical locking member 14. The middle, in the protruding direction, of the second operating board 81 is substantially the same level as that of the vertical locking member 14.

The side face, adjacent to the fixed frame 4, of the second operating board 81 is away from the vertical locking member 14 during the locking of the vertical movement and comes into contact with the vertical locking member 14 during the unlocking.

Pivoting the second operating board 81 upward about the pivoting shaft 82 presses the vertical locking member 14 toward the fixed frame 4.

The pivoting shaft 82 is disposed at the end, adjacent to the operating unit 9, of the first operating board 80 and functions as a pivoting shaft for pivoting the pivoting member 13.

The pivoting shaft 82 includes a shaft body 82*a* and a shaft holder 82*b*. The shaft body 82*a* is a metal shaft. The shaft holder 82*b* holds the shaft body 82*a* and is integrated with the end, adjacent to the operating unit 9, of the first operating board 80.

The shaft body 82*a* is held by the shaft holder 82*b* above the first operating board 80. The shaft holder 82*b* includes projections 82*c*, 82*c* and is in the form of a U shape. The projections 82*c*, 82*c* each protrude upward and include an insertion hole into which the shaft body 82*a* is inserted.

The ends, protruding outside the projections 82*c* (in the front and rear direction), of the shaft body 82*a* are inserted into and held by the holes formed in the insertion holders 33*a*, 33*a* of the holders 33.

The urging member 83 is a coil spring and disposed between the projections 82*c*, 82*c* and the shaft body 82*a* extends therethrough.

One end of the urging member 83, which is a coil spring, is in contact with the upper surface of the first operating board 80, while the other end is in contact with the inner face of the front cover 30 or the rear cover 31. In other words, operating the pivoting member 13 so as to pivot the first operating board 80 upward causes one end of the urging member 83 to approach the other end of the urging member 83. At the time of stopping the operation of the pivoting member 13, the first operating board 80 is restored to its original position by the resilient restoring force of the urging member 83.

This configuration allows the front-back movement of the movable frame 5 relative to the fixed frame 4 to be locked or unlocked at a position at which the engaging portions 71 are each engaged with any of the teeth 60*a*.

(Vertical Locking Mechanism)

The right and left headrest pillars 2 are provided with the vertical locking mechanism. More specifically, the vertical locking mechanism locks or unlocks the fixed frame 4 at any vertical position of the right and left headrest pillars 2.

The vertical locking mechanism includes several notches 15 disposed on at least one of the right and left headrest pillars 2, the right and left pillar holders 4*a* and 4*b*, the vertical locking member 14, and the pivoting member 13.

The notches 15 may be disposed on at least one of the right and left headrest pillars 2 having the vertical locking member 14. In this embodiment, the both right and left headrest pillars 2 have the notches 15 because the notches 15 are used together with the locks 3*d*, 3*d* of the right and left holders 3, 3 to prevent the detachment of the headrest pillars 2.

With reference to FIGS. 1 to 4, the notches 15 are provided along the length of the right and left headrest pillars 2. The notches 15 are formed on the inward faces of the right and left headrest pillars 2.

The right and left pillar holders 4*a* and 4*b* hold the right and left headrest pillars 2, 2, respectively. This configuration allows the fixed frame 4 to move vertically along the right and left headrest pillars 2.

The fixed frame 4 can be vertically moved within a slidable range of the pillar retainers 2*a*, 2*a* disposed on the right and left headrest pillars 2, 2 along the slits 20*a*, 20*a*.

The vertical locking member 14 is held by the lock holder 27 disposed on the right or left pillar holder 4*a* or 4*b* having the pivoting member 13.

The vertical locking member 14 includes an engaging section (not shown) and an urging member (not shown). The engaging section is engaged with any of the notches 15 within the lock holder 27. The urging member (not shown) urges the engaging section in a direction to engage the engaging section with any of the notches 15.

The vertical locking member 14 is pressed toward the back of the lock holder 27 to disengage the engaging section (not shown) from the notches 15. The engaging section (not shown) remains engaged with the notches 15 until the vertical locking member 14 is operated.

As described above, the pivoting member 13 includes the second operating board 81 that operates the vertical locking member 14.

The first operating board 80 pivots in conjunction with the second operating board 81. The second operating board 81 can unlock the vertical locking mechanism when the first operating board 80 unlocks the front-back locking mechanism.

The pivoting member 13 has a front-back length in accordance with the moving distance of the movable frame 5. In other words, any portion of the first operating board 80 along its length comes into contact with part of the bumper 73. Any portion of the second operating board 81 along its length comes into contact with part of the button 9. Any portion of the second operating board 81 comes into contact with the vertical locking member 14. The pivoting shaft 82 is held by the holders 33 along its length.

Since any portion of the second operating board 81 along its length comes into contact with the button 9, the positional relation between the pivoting member 13 and the button 9 depends on the front-back movement of the movable frame 5, but the positional relation between the movable frame 5, consisting of the front cover 30 and the rear cover 31, and the button 9 remains the same.

This configuration allows the fixed frame 4 to be locked or unlocked at any vertical position of the right and left headrest pillars 2, i.e., at the position of any notch 15.

The operating button 9 serving as the operating unit 9 is mounted on the button mount 34 provided on the front cover 30 and the rear cover 31, as described above, and in contact with the pivoting member 13. When pressed into the internal cavity of the case, the operating button 9 can operate the pivoting member 13.

The button 9 includes a button body 90 and a cylinder 91.

The button body 90, which is inserted into the cylinder 91, freely moves back and forth along the cylinder 91. The cylinder 91 is mounted on the button mount 34. The button body 90 is in contact with the lower end (protruding tip) of the second operating board 81 of the pivoting member 13. The button body 90 freely moves back and forth along the cylinder 91 without interference with the regulator 33*b* of the holders 33.

This configuration allows the pivoting member 13 to pivot upward about the pivoting shaft 82 and thus allows the first operating board 80 to operate the locking member 11 and the second operating board 81 to operate the vertical locking member 14.

(Description of Skin Sheets)

Figure 14:
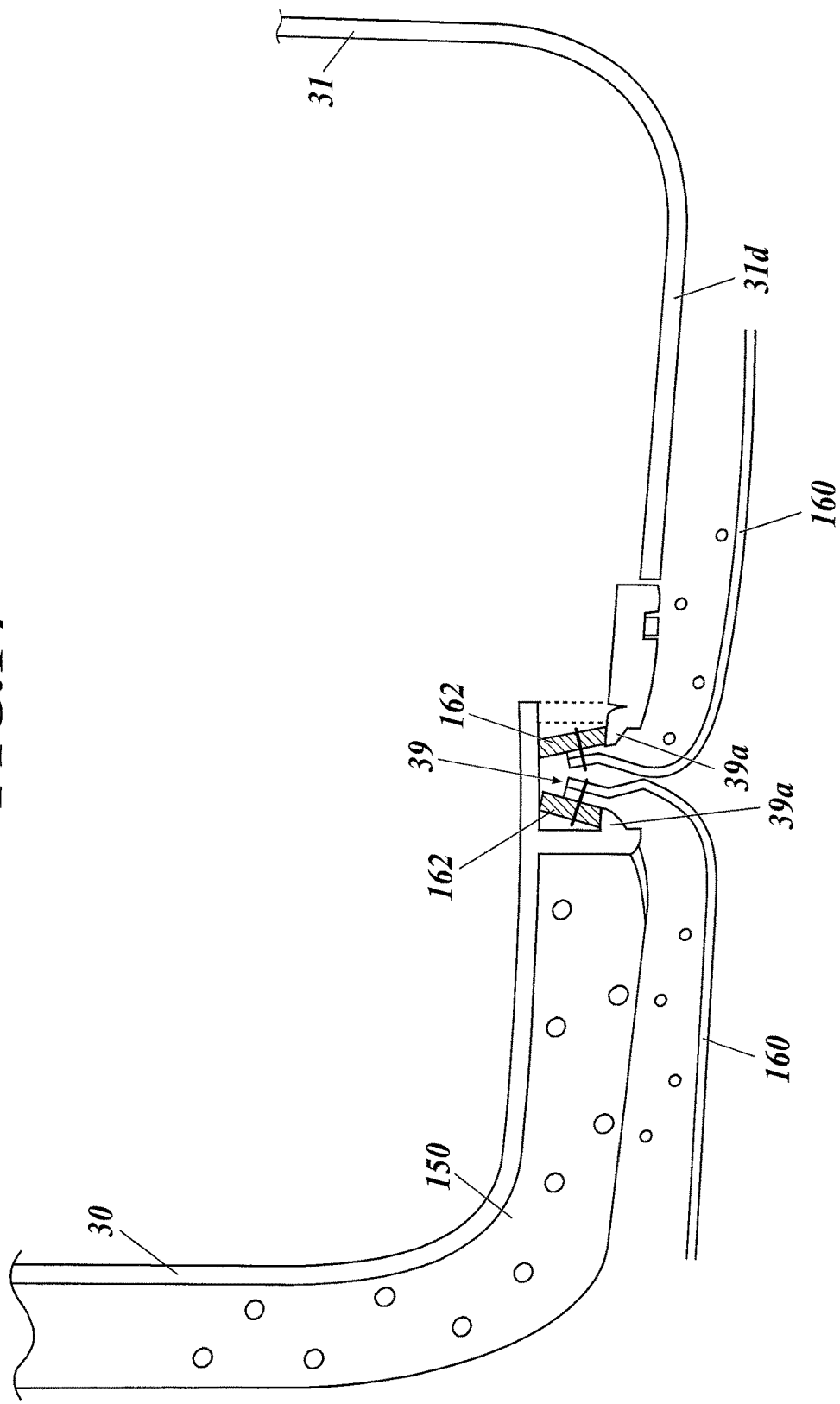
FIG. 14 is a cross-sectional view of an exemplary mounting of skins according to the first embodiment of the present invention.

With reference to FIG. 14, the case, consisting of the front cover 30 and the rear cover 31, is covered with the skin sheets 160.

A trim plate 162 is sown on the end of each skin sheet 160.

The bottom surface of the case (in this embodiment, the front cover 30, in particular) has a channel 39 into which the ends of the skin sheets 160 are embedded. The channel 39 is disposed at a position opposite to that of the guiding contacts 37 (37a).

Projections 39a, which protrude inwardly, are integrated in the vicinity of the opening of the channel 39.

The case is covered with the skin sheets 160 as follows: the case is entirely covered with the skin sheets 160; the trim plates 162 at the ends of the skin sheets 160 are inserted into the channel 39 and caught by the projections 39a; and subsequently, the bottom edge covers 32 are fitted into the two long holes formed in the bottom of the case such that the skin sheets 160 are also caught by the bottom edge covers 32.

A cushion pad 150 is disposed in the rear of a skin sheet 160 and between the skin sheets 160 and the case.

(Operation of Headrest)

The operation of the headrest 1, which has the above configuration, will now be described.

The operation of the headrest 1 includes a movement of the front cover 30 of the movable frame 5 away from the fixed frame 4 toward the front and a movement back toward the rear. The operation further includes a vertical movement of the fixed frame 4, which includes the right and left pillar holders 4a and 4b, along the right and left headrest pillars 2, 2.

The operation of the movable frame 5 will now be described.

In FIG. 15, the movable frame 5 (front cover 30) is close to the fixed frame 4, i.e., the fixed frame 4 is restored to its rear position. When the button 9 is left unoperated, the engaging portion 71 remains engaged with any teeth 60a of the engaged members 10 to lock the front-back movement of the movable frame 5.

The movable frame 5 is moved forward away from the fixed frame 4 as follows: the button 9 is pressed to pivot the pivoting member 13 toward the X-link mechanism. This operation causes the first operating board 80 to pivot upward to push up the engaging portion 71 provided with the bumper 73.

This causes each engaging portion 71 to move away from the teeth 60a of the corresponding engaged member 10, thus allowing the locking member 11 to unlock the front-back movement of the movable frame 5.

The movable frame 5 is moved forward away from the fixed frame 4, while keeping the engaging portions 71 pushed up.

The engaged members 10 move forward in accordance with the pivoting of the inside link 6 and the outside link 7. The connecting rod S in the inside link 6 and the connecting rod S in the outside link 7 move upward along the long holes 26a in the lower supports 26 and the long holes 36a in the lower supports 36, respectively.

Figure 16:
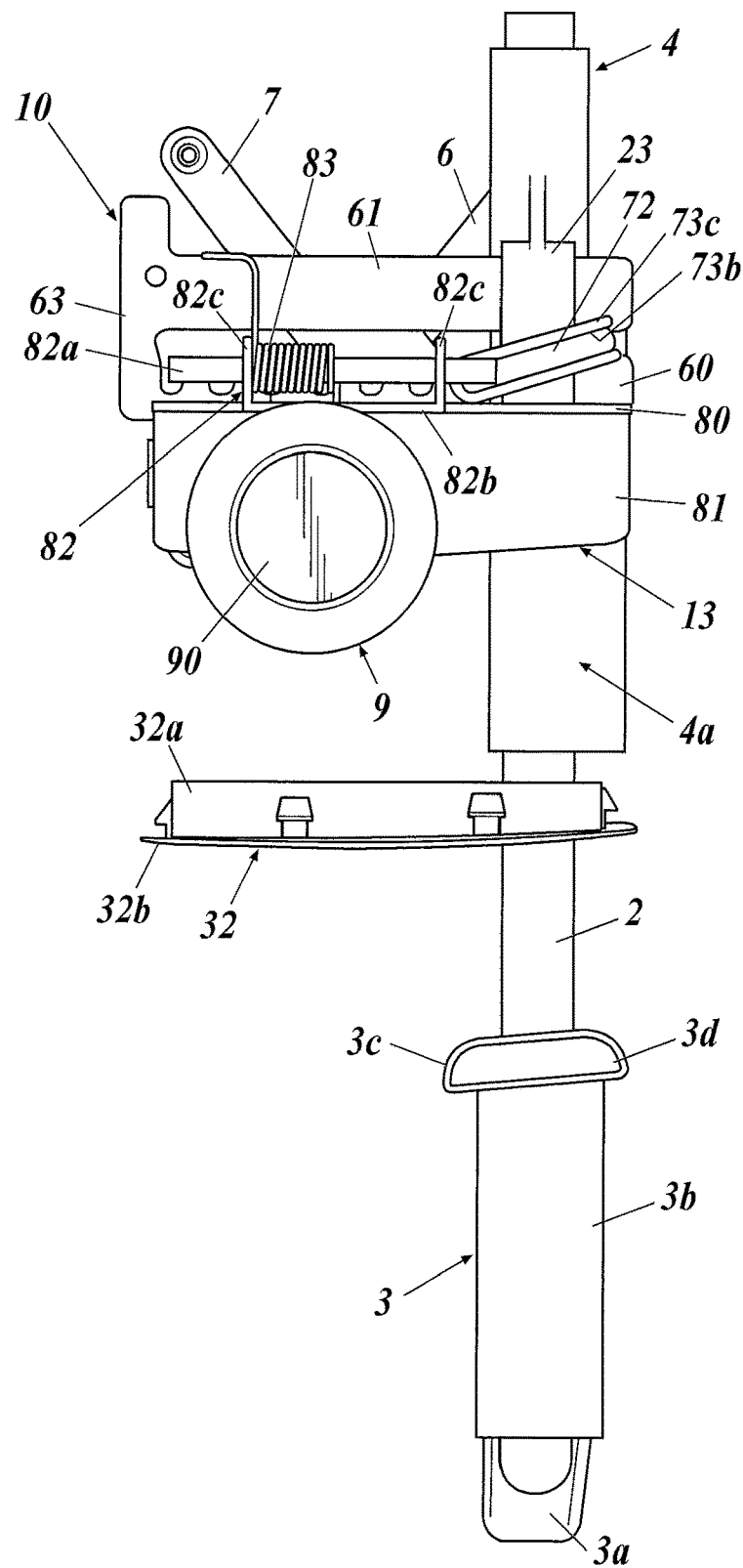
FIG. 16 is a side view of the internal structure of the headrest according to the first embodiment of the present invention after operation.

At the time of stopping the operation of the button 9 at a desired position, each engaging portion 71 is urged toward the side of the teeth 60a by the urging force of the corresponding urging member 12 to get engaged with any of the teeth 60a. This allows the movable frame 5 to move forward away from the fixed frame 4 and be locked at a desired position, as shown in FIG. 16.

At the time of locking, the engaging portion 71 may come into contact with the tip of any of the teeth 60a, without falling into the valley between teeth 60a. In this case, the movable frame 5 should be moved back or forth without pressing the button 9. This operation causes the engaging portion 71 to fall into any adjacent valley, thereby successfully locking the movable frame 5.

A similar procedure is applied to moving back of the movable frame 5 to the rear: the button 9 is pressed to operate the bumper 73 and unlock the engaging portion 71.

The movable frame 5 is then moved back to the rear and the button 9 is released at a desired position of the movable frame 5. The movement of the X-link mechanism during the backward movement of the movable frame 5 is reverse to that of the X-link mechanism during the forward movement of the movable frame 5.

As described above, the above configuration enables the front-back movement of the movable frame 5 and a stepwise adjustment of the position in accordance with the arrangement of the teeth 60a of the engaged members 10. In other words, the anteroposterior position of the headrest 1 can be adjusted stepwise.

The vertical operation of the fixed frame 4, including the right and left pillar holders 4a and 4b, will now be described:

As shown in FIG. 15, the right and left pillar holders 4a and 4b are disposed on the lower side of the right and left headrest pillars 2. When the button 9 is not operated, the engaging section of the vertical locking member 14 remains engaged with any of the notches 15 on the lower side of the headrest pillars 2, thereby locking the vertical movement of right and left pillar holders 4a and 4b.

The right and left pillar holders 4a and 4b may be moved upward along the right and left headrest pillars 2, 2 as follows: the button 9 is pressed to pivot the pivoting member 13 toward the X-link mechanism. This operation causes the second operating board 81 to pivot toward the X-link mechanism to push the vertical locking member 14 toward the back (inward) of the lock holder 27. This operation causes the engaging section (not shown) to move into the back (inward) of the lock holder 27.

This operation causes the engaging section of the vertical locking member 14 to move away from the notch 15 of the headrest pillar 2, thus allowing the engaging section of the vertical locking member 14 to unlock the vertical movement of the right and left pillar holders 4a and 4b.

The right and left pillar holders 4a and 4b and the fixed frame 4 are moved upward along the right and left headrest pillars 2, while the engaging section of the vertical locking member 14 remains in the back (inward) of the lock holder 27.

This operation causes the movable frame 5 and the X-link mechanism to move upward in accordance with the movement of the fixed frame 4.

At the time of stopping the operation of the button 9 at a desired position, the engaging section of the vertical locking member 14 is restored to its original position by the urging force of the urging member (not shown) to get engaged with any of the notches 15 on the headrest pillars 2. This operation allows the right and left pillar holders 4a and 4b to move along the right and left headrest pillars 2 to be locked at a desired position, as shown in FIG. 16.

At the time of locking, the engaging section of the vertical locking member 14 may come into contact with the outer perimeter, between vertically adjacent notches 15, of the headrest pillars 2. In this case, the right and left pillar holders 4a and 4b should be moved up or down without pressing the button 9. This operation causes the engaging section to be engaged with the nearest notch 15, thereby successfully locking the right and left pillar holders 4a and 4b.

A similar procedure is applied to the downward movement of the right and left pillar holders 4a and 4b: the button 9 is pressed to operate the second operating board 81 and unlock the engaging section of the vertical locking member 14.

Subsequently, the right and left pillar holders 4a and 4b and the fixed frame 4 are moved downward and the button 9 is released at a desired position. The movable frame 5 and the X-link mechanism also move downward in accordance with the downward movement of the right and left pillar holders 4a and 4b.

As described above, the above configuration enables the vertical movement of the right and left pillar holders 4a and 4b and a stepwise adjustment of the position in accordance with the arrangement of the notches 15 on the headrest pillars 2. In other words, the vertical position of the headrest 1 can be adjusted stepwise.

This embodiment allows the front-back movement of the movable frame 5 to be locked and unlocked outside the right and left headrest pillars 2 along their width. This configuration can increase the stability in engagement of the engaged members 10 with the locking member 11.

The front cover 30 and the rear cover 31 constitute the movable frame 5, which moves in the front-back direction, and can hold the engaged members 10, 10. This configuration can enhance the supporting rigidity of the engaged members 10, 10.

Accordingly, this configuration can highly satisfy the demand for enhancing the supporting rigidity of the engaged members 10, 10.

In cooperation with the movement of the locking member 11 toward the fixed frame 4, the bumper 73 comes into contact with the fixed frame 4. This configuration allows the bumper 73 to restrict the moving range of the locking member 11 and prevent a direct contact of the locking member 11 with the fixed frame 4 to reduce the occurrence of abnormal sound.

Accordingly, this configuration can highly satisfy the demand for restricting the moving range of the locking member 11 and reducing the occurrence of abnormal sound.

The locking member 11 is mounted around the fixed frame 4 and the bumper 73 is mounted on the locking member 11 outside the fixed frame 4. The bumper 73 must be moved toward the fixed frame 4 before it can be removed from the locking member 11. This configuration can prevent the detachment of the bumper 73 from the locking member 11 mounted on the fixed frame 4.

Accordingly, this configuration can highly satisfy the demand for preventing the detachment of the bumper 73 from the locking member 11 mounted on the fixed frame 4.

The bumper 73 increases the area of contact between the locking member 11 and the pivoting member 13. This configuration can enhance the efficiency with which the pivoting member 13 actuates the locking member 11.

Accordingly, this configuration can highly satisfy the demand for enhancing the efficiency with which the pivoting member 13 actuates the locking member 11.

The pillar retainers 2a, 2a may be disposed both in the front and in the rear. The pillar retainers 2a, 2a can prevent the detachment of the fixed frame 4 from the right and left headrest pillars 2, 2, while ensuring a smooth operation of the front-back locking mechanism, disposed outside the right and left headrest pillars 2.

Accordingly, this configuration can highly satisfy the demand for preventing the detachment of the fixed frame 4 from the right and left headrest pillars 2, 2, while ensuring a smooth operation of the front-back locking mechanism.

The urging members 12 can be each readily accommodated in the receiver 24 from the front side of the fixed frame 4. The retainer 24a can prevent the detachment of the urging member 12 from the receiver 24.

Accordingly, this configuration can highly satisfy the demand for readily accommodating the urging members 12 and preventing the detachment of the urging members 12 from the receivers 24.

The holders 21 allow the locking member 11 to be held in the vicinity of the front-back locking mechanism. This configuration allows the locking member 11 to be engaged with the engaged members 10, 10, while preventing the deformation of the locking member 11.

Accordingly, this configuration can highly satisfy the demand for reducing the deformation of the locking member 11 and engaging the locking member 11 with the engaged members 10, 10.

The stoppers 21b prevent the locking member 11 from moving in the opposite direction of the mounting direction.

Accordingly, this configuration can highly satisfy the demand for the stopper 21b to prevent the locking member 11 from moving in the opposite direction of the mounting direction.

[Additional Statements on First Embodiment]

As is evident from the description on the first embodiment 1, the description of the first embodiment contains various technical ideas disclosed in addition to the following notes on the invention:

Note 1

A headrest including:

a fixed frame disposed on headrest pillars;

a movable mechanism;

a movable frame coupled to the fixed frame with the movable mechanism and movable in the front-back direction relative to the fixed frame; and a front-back locking mechanism to lock and unlock a front-back movement of the movable frame relative to the fixed frame, wherein the movable mechanism is a link mechanism having a plurality of links, the links having ends along their width, the ends being pivotally supported by the fixed frame and the movable frame, and at least the movable frame further supports the center of a link in its width direction, the link being disposed adjacent to the movable frame.

Note 2

The headrest according to Note 1, wherein the movable frame includes a front cover for supporting a head, the front cover includes:

a plurality of supports pivotally supporting the link at the both ends of the link in their width direction; and a protruding rib disposed in the central region between the supports and protruding from the rear face of the front cover to the link, and the link supported by the front cover includes a cutout engaged with the protruding rib.

Note 3

The headrest according to Note 2, wherein the movable mechanism is a X-link mechanism having a first link and a second link, the first link and the second link being pivotally connected at a central intersection;

the front cover includes a plurality of supports pivotally supporting the front edges of the first link and the second link, the fixed frame includes a plurality of supports pivotally supporting the rear edges of the first link and the second link, the upper or lower ends of the front edges and rear edges of the first link and the second link are supported by the supports so as to be vertically slidable, and an interval between the front edges of the first link and the second link and an interval between the rear edges of the first link and the second link are greater at the time of assembling the ends of the first link and the second link to the front cover and the fixed frame than at the time of sliding the upper or lower ends.

Note 4

The headrest according to Note 3, wherein the intersection includes:

a hole extending through the first link and the second link along their width;

a shaft inserted into the hole;

a stopper disposed at one end of the width of the intersection, the end being on a side in a direction of insertion of the shaft; and retaining craws disposed at one end of the width of the intersection, the end being on a side in the opposite direction of the direction of insertion of the shaft, and the retaining craws are elastic and disposed such that their tips cover the hole.

Note 5

The headrest according to one of Notes 2 to 4, wherein the movable frame includes a rear cover constituting a hollow case together with the front cover, an internal cavity of the case at least accommodates the fixed frame, and an inner face of at least one of a top and a bottom of the case, composed of the front cover and the rear cover, is provided with a guiding contact in contact with the fixed frame in the case to guide a movement of the movable frame.

Note 6

The headrest according to Note 5, further including:

a skin sheet covering the case; and a channel for embedding the ends of the skin sheets into the bottom of the case; wherein the guiding contact is disposed on the inner face of the bottom of the case, and the channel is disposed at the position opposite to the position of the guiding contact.

Note 7

The headrest according to one of Notes 1 to 6, further including:

an operating button disposed on one of the right and left sides of the fixed frame, the operating button operating the movable mechanism, wherein the movable mechanism has a plurality of connecting rods pivoting the links to the fixed frame and the movable frame, and the connecting rods are assembled to the fixed frame and the movable frame from a side remote from the operating button.

According to the aspect, described in Note 1, of the present invention, at least the movable frame of the fixed frame and the movable frame further supports the center of the link adjacent to the movable frame along its width. This configuration can more effectively reduce the looseness of the link in the horizontal direction than a sole support of the link at the both ends along its width.

According to the aspect, described in Note 2, of the present invention, the link supported by the front cover has a cutout engaged with the protruding ribs. The protruding ribs support the link in the center of its width at the time of pivoting the link.

According to the aspect, described in Note 3, of the present invention, the interval between the front edges of the first link and the second link and the interval between the rear edges of the first link and the second link are designed to be greater at the time of assembling the ends of the first link and the second link to the front cover and the fixed frame than at the time of sliding the upper or lower ends. This configuration can suppress the detachment of the first link and the second link from the front cover and the fixed frame at the time of sliding the upper or lower ends after assembling the first link and the second link to the front cover and the fixed frame.

Accordingly, this configuration can highly satisfy the demand for suppressing the detachment of the first link and the second link from the front cover and the fixed frame.

According to the aspect, described in Note 4, of the present invention, the shaft is inserted into the hole until the end, in the opposite direction of the direction of insertion, of the shaft passes beyond the tips of the retaining craws. The retaining craws can suppress the removal of the shaft through the hole.

The retaining craws can highly satisfy the demand for suppressing the removal of the shaft thorough the hole.

According to the aspect, described in Note 5, of the present invention, the guiding contacts in contact with the fixed frame can guide the movement of the movable frame to increase the stability in the movement of the movable frame.

The guiding contacts are disposed on the inner face of at least one of the top and bottom of the case to enhance the rigidity of the case.

Accordingly, this configuration can highly satisfy the demand for increasing the stability in the movement of the movable frame and increasing the rigidity of the case.

According to the aspect, described in Note 6, of the present invention, the guiding contact is disposed on the inner face of the bottom of the case to enhance the rigidity of the bottom of the case.

The channel is formed on the bottom of the case for embedding the ends of the skin sheets and disposed at a position opposite to the position of the guiding contact. This indicates that the channel is disposed at a rigid position. This configuration increases the stability in embedding the skin sheets into the channel.

Accordingly, this configuration can highly satisfy the demand for increasing the stability in embedding the skins into the channel.

According to the aspect, described in Note 7, of the present invention, the connecting rods are assembled to the fixed frame and the movable frame from a side remote from the operating button. This configuration can ensure a smooth assembly of the connecting rods without interference from the operating unit.

Accordingly, this configuration can highly satisfy the demand for ensuring a smooth assembly of the connecting rods without interference from the operating button.

[Second Embodiment]

With reference to FIGS. 17 to 32, a headrest 1A according to this embodiment includes a pair of right and left headrest pillars 2, 2 separate from each other, a pair of right and left holders 3, 3, a fixed frame 4, a movable frame 5, a movable X-link mechanism, a front-back locking mechanism, a vertical locking mechanism, and an operating unit 9. The headrest 1 includes a cushion pad and skin sheets surrounding the headrest 1.

The headrest 1 is mounted on the top of a backrest of a vehicle seat.

The front and back, up and down, and right and left directions according to this embodiment are the same as those of a vehicle seat and a vehicle.

The right and left holders 3, 3 are mounted on a backrest frame.

The right and left headrest pillars 2 extend below the headrest 1 and are held by the right and left holders 3, 3. In other words, the headrest 1 is mounted on the backrest frame via the right and left headrest pillars 2, 2 and the right and left holders 3, 3.

The right and left headrest pillars 2 have an identical diameter. At least one of the right and left headrest pillars 2, 2 has a plurality of notches 15 formed along its length at certain intervals.

The right and left headrest pillars 2, 2 are held by the right and left holders 3, 3, respectively, and vertically movable along the right and left holders 3, 3.

The right and left holders 3, 3 each include a cylinder 3a, a cover 3b, and a head 3c. The cylinder 3a holds the right or left headrest pillar 2. The cover 3b covers the cylinder 3a. The head 3c is disposed at the top of the cylinder 3a.

The head 3c is provided with a lock 3d which is engaged with any of the notches 15 of the right or left headrest pillar 2 to prevent the movement of the headrest pillar 2, 2.

The right and left headrest pillars 2, 2 are inserted into pillar inserting holes 20, 20 of the fixed frame 4 (described below) and provided with pillar retainers 2a, 2a which are disposed slidably through slits 20a, 20a of the fixed frame 4 (described below). The pillar retainers 2a, 2a are disposed in the front and the rear of the headrest pillars 2, 2. The pillar retainers 2a, 2a can suppress the detachment of the fixed frame 4 from the right and left headrest pillars 2, while ensuring a smooth operation of the front-back locking mechanism, disposed outside the right and left headrest pillars 2, 2. The pillar retainers 2a also function as rotation stoppers to prevent the rotation of the right and left headrest pillars 2, 2 in the circumferential direction.

The fixed frame 4 has the right and left headrest pillars 2, 2 disposed at its right and left ends and is mounted on the backrest frame via the right and left headrest pillars 2, 2. In other words, the fixed frame 4 is disposed on the right and left headrest pillars 2, 2, which is disposed on the backrest frame.

The fixed frame 4 is vertically movable along the right and left headrest pillars 2, 2.

The position of the movable frame 5 is adjustable relative to the fixed frame 4 in the front-back direction and coupled to the fixed frame 4 with the movable mechanism. More specifically, the movable frame 5 is coupled to the fixed frame 4 with the movable mechanism and movable forward away from and backward to the fixed frame 4.

The movable frame 5 includes a front cover 30 and a rear cover 31, which together constitutes a hollow case. The internal cavity defined by the front cover 30 and the rear cover 31 at least accommodates internal mechanisms, i.e., the tops of the right and left headrest pillars 2, 2, the fixed frame 4, the movable mechanism, and the front-back locking mechanism.

The movable mechanism couples the fixed frame 4 to the movable frame 5. For example, a link mechanism having links 6 and 7 is adopted as a movable mechanism. The links 6 and 7 are pivotally supported by the fixed frame 4 and the movable frame 5 at the both ends of their width direction.

In this embodiment, an X-link mechanism is adopted. The X-link mechanism includes a first or inside link 6 and a second or outside link 7 to which the central portions intersecting with each other are pivotally connected.

The front-back locking mechanism locks and unlocks the front-back movement of the movable frame 5 relative to the fixed frame 4. The front-back locking mechanism includes a plurality of engaged members 10, 10, a locking member 11, urging members (not shown), and a pivoting member 13. The locking member 11 is engageable with the engaged members 10. Each urging member urges the corresponding engaging portion 71 (described below) of the locking member 11 toward the corresponding engaged member 10. The pivoting member 13 is pivotally held by the movable frame 5 and operates the locking member 11.

The vertical locking mechanism locks and unlocks the fixed frame 4 at several vertical positions of the right and left headrest pillars 2, 2. The vertical locking mechanism includes a vertical locking member (described below).

The operating unit 9 exposes from the outer surface of the headrest 1 and operates the front-back locking mechanism and the vertical locking mechanism concurrently. More specifically, the operating unit 9 unlocks the front-back movement of the movable frame 5 and the vertical movement of the fixed frame 4 via the pivoting member 13.

The operating unit 9 is configured to operate the locking mechanisms along the width of the headrest. Although the operating unit 9 may be operated manually or automatically, the manual operation is adopted for this embodiment.

The operating unit 9 according to this embodiment is a button 9 to be pressed inside the headrest 1 to manipulate the front-back locking mechanism and the vertical locking mechanism.

The portions at which the fixed frame 4 intersects with the X-link mechanism (the inside link 6 and the outside link 7), the movable frame 5 intersects with the X-link mechanism, and the central portion of the inside link 6 intersects with the central portion of the outside link 7 are pivotally connected about shafts S. The shafts S are linear metal rods. Five rods are used in this embodiment.

The movable frame 5 is provided with a first movement regulator 100 that regulates the movement of the shaft S connecting the movable frame 5 with the X-link mechanism in its extending direction.

The fixed frame 4 is provided with a second movement regulator 110 that regulates the movement of the shaft S connecting the fixed frame 4 with the X-link mechanism in its extending direction.

The side face of the outside link 7 of the inside link 6 and the outside link 7 is provided with a third movement regulator 120 that regulates the movement of the shaft S connecting the central portion of the inside link 6 with the central portion of outside link 7 in its extending direction.

Figure 22:
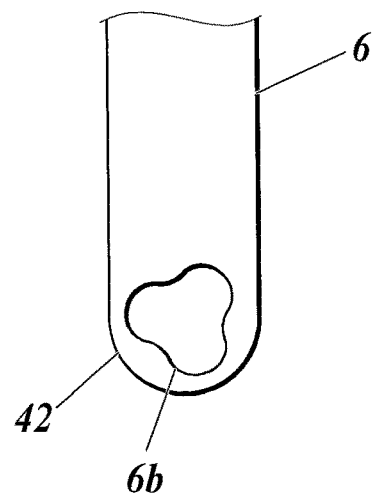
FIG. 22 describes the shape of a through-hole according to the second embodiment of the present invention.

Through-holes 6h, 7b, 25c, and 35b and insertion holes 25d and 35c are formed in the upper and lower edges of the inside link 6, the upper and lower edges of the outside link 7, the supports 25, 25 of the fixed frame 4, and the supports 35, 35 of the movable frame 5. As shown in FIG. 22, these holes are not circular and have a deformed circular shape. These deformed circular holes can receive a shaft S having a slightly larger diameter than the inner diameters of these holes. This configuration allows the shafts S to be received by these holes rigidly.

Although FIG. 22 illustrates the through-hole 6b in the inside link 6 for convenience sake, the drawing is also applicable to the through-hole 7b in the outside link 7 and other through-holes.

The fixed frame 4, the movable frame 5, and the X-link mechanism will now be described in detail.

(Fixed Frame)

Figure 17:
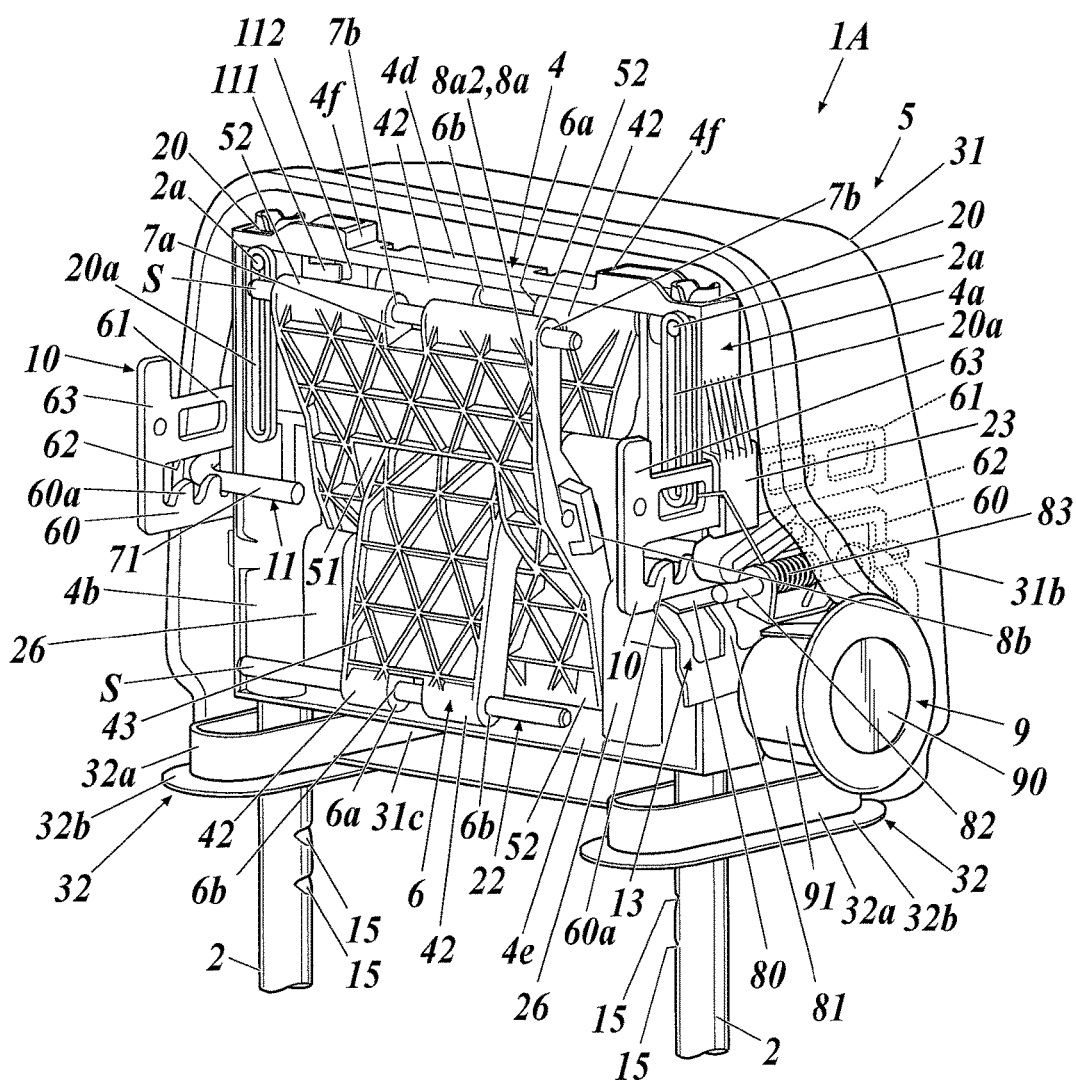
FIG. 17 is a perspective view of a headrest covered with a rear cover according to a second embodiment of the present invention
Figure 24:
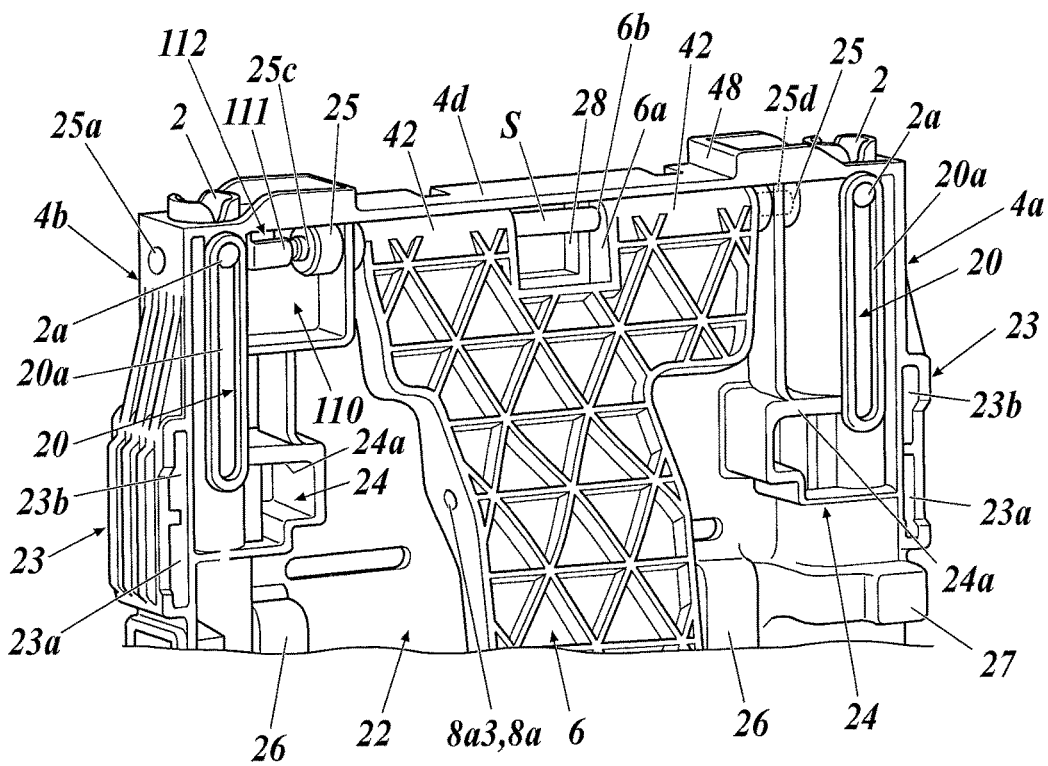
FIG. 24 is a partial perspective view of a fixed frame, including the second movement regulator according to the second embodiment of the present invention.
Figure 32:
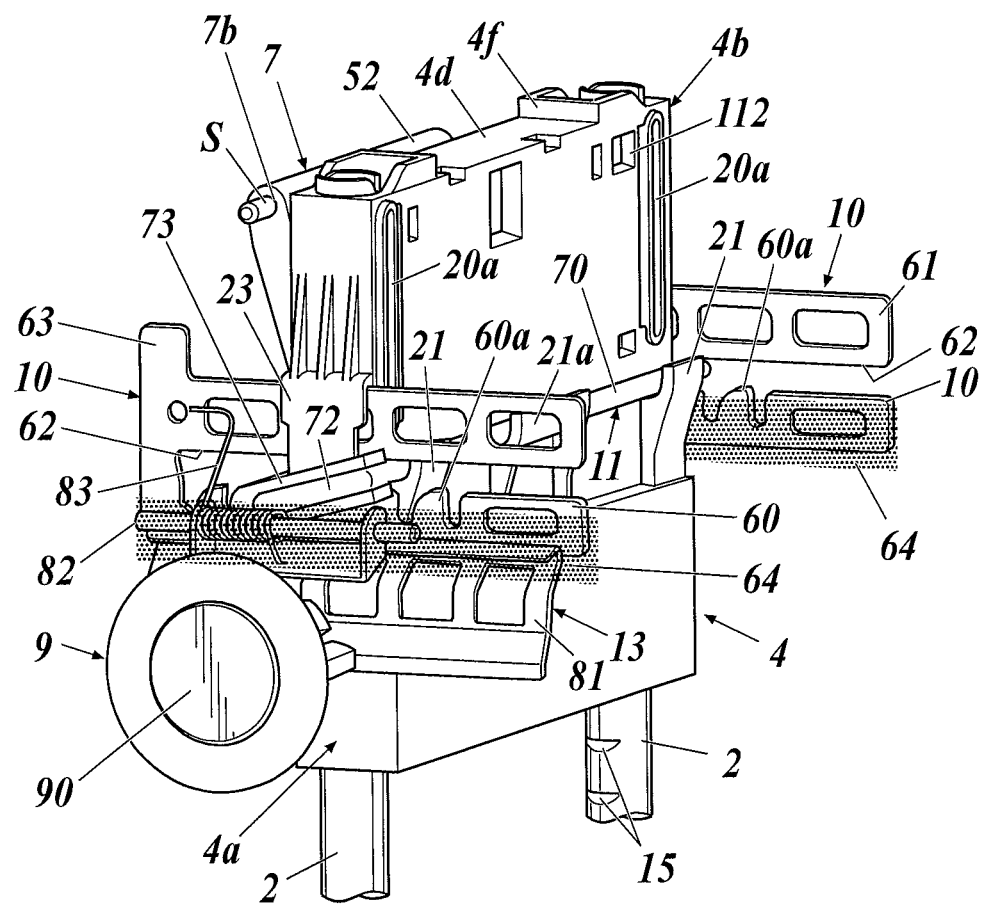
FIG. 32 is a conceptual perspective view of an engaged member according to the second embodiment of the present invention covered with a resin cover.

The fixed frame 4 is made of resin and composed of a block, as shown in FIGS. 17, 24 and 32. The fixed frame 4 includes a pair of right and left pillar holders 4a and 4b, a rear-face coupler 4c, couplers 4d and 4e, upper contacts 4f, a plurality of holders 21, 21, a plurality of mounts 23, 23, a plurality of receivers 24, 24, retainers 24a, 24a, a plurality of supports 25 and 26, a lock holder 27, and a protruding rib 28. All of these portions of the fixed frame 4 are integrated.

The right and left pillar holders 4a and 4b are disposed on the right and left ends of the fixed frame 4 and constitute the right and left ends of the fixed frame 4. The right and left pillar holders 4a and 4b hold the right and left headrest pillars 2, 2, respectively. This configuration allows the fixed frame 4 to be vertically movable along the right and left headrest pillars 2, 2.

The right and left pillar holders 4a and 4b have pillar inserting holes 20, 20 into which the right and left headrest pillars 2, 2 are inserted. The pillar inserting holes 20 extend through the right and left pillar holders 4a and 4b along their length (in the vertical direction).

The slits 20a are formed at least in one of the front and rear faces of the fixed frame 4. The slits 20a extend vertically and are in communication with the pillar inserting holes 20. In this embodiment, the slits 20a are formed on both the front and rear faces.

These slits 20a, 20a are each provided with the pillar retainer 2a for preventing the detachment of the right and left headrest pillars 2, 2. Each pillar retainer 2a protrudes from the headrest pillar 2 in the front-back direction. The pillar retainers 2a, 2a are disposed and fixed on the headrest pillars 2, 2 after insertion of the right and left headrest pillars 2, 2 into the pillar inserting holes 20, 20.

The rear-face coupler 4c is a plate disposed between the right and left pillar holders 4a and 4b to couple the right and left pillar holders 4a and 4b.

The rear-face coupler 4c is provided with a plurality of holders 21, 21 on its rear face. The holders 21 each hold a held portion 70 of the locking member 11 (described below). The holders 21, 21 are each in the form of a hook in the side view and disposed at least in the rear of the right and left headrest pillars 2.

Similarly, the rear-face coupler 4c is provided with a central holder 21a on its rear face. The central holder 21a holds the center of the held portion 70 of the locking member 11. The central holder 21a is in the form of a hook in the side view and disposed side by side with the holders 21 in the horizontal direction.

The rear-face coupler 4c is provided with a plurality of stoppers on its rear face. The stoppers come into contact with the locking member 11 in the direction in which the locking member 11 is mounted on the holders 21, to prevent the movement of the locking member 11 in the direction opposite to the mounting direction. The stoppers have a convex shape protruding backward from the rear face.

The stoppers are each disposed between each holder 21 and the central holder 21a.

In the side view, gaps are formed between the tips of the holders 21, 21 and the central holder 21a and between the tips of the stoppers. The held portion 70 of the locking member 11 may be mounted through the gaps.

The coupler 4d is a plate disposed between the tops of the right and left pillar holders 4a and 4b and coupling the tops of the right and left pillar holders 4a and 4b. The top of the coupler 4d is flush with the tops of the right and left pillar holders 4a and 4b.

The coupler 4e is a plate disposed between the bottoms of the right and left pillar holders 4a and 4b and coupling the bottoms of the right and left pillar holders 4a and 4b. The bottom of the coupler 4e is flush with the bottoms of the right and left pillar holders 4a and 4b.

The coupler 4d between the tops of the right and left pillar holders 4a and 4b is provided with upper contacts 4f. The upper contacts 4f are disposed at the ends adjacent to the left pillar holder 4a and the right pillar holder 4b. The upper contacts 4f, 4f are walls protruding upward and extending in the front-back direction. Each upper contact 4f is in contact with the corresponding upper rail 37c (described below) disposed on the movable frame 5.

A portion, surrounded by the right and left pillar holders 4a and 4b and the couplers 4d and 4e, of the fixed frame 4 is a dent 22. More specifically, the dent 22 is a space surrounded by the opposing faces of the right and left pillar holders 4a and 4b, the front face of the rear-face coupler 4c, the lower face of the coupler 4d, and the upper face of the coupler 4e.

Figure 30:
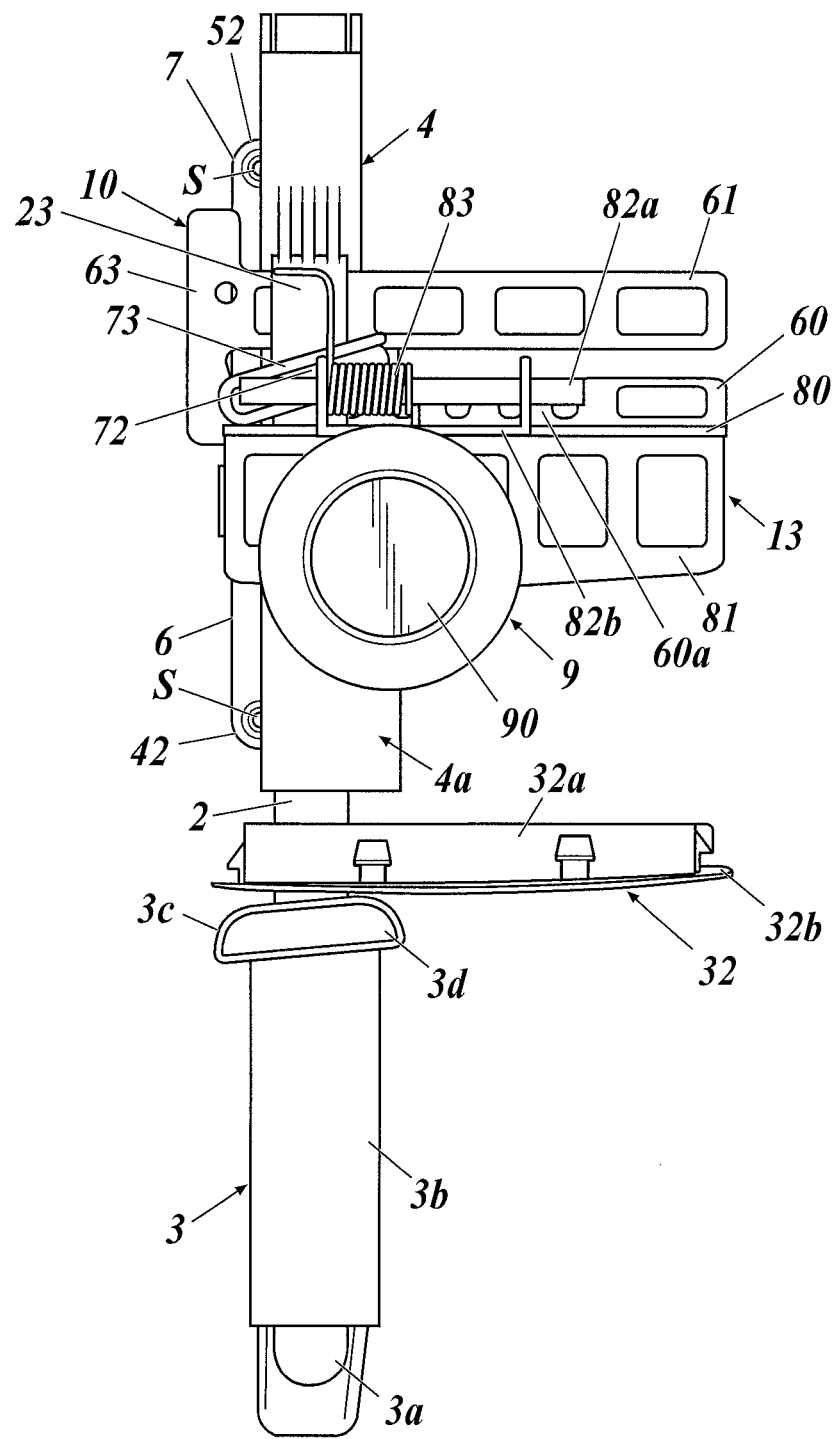
FIG. 30 is a side view of the internal structure of the headrest according to the second embodiment of the present invention before operation.

Such a dent 22 accommodates the movable mechanism when the movable frame 5 approaches the fixed frame 4, as shown in FIG. 30.

The both right and left side faces of the rear-face coupler 4c are each provided with a mount 23 protruding laterally, as shown in FIGS. 17, 24, and 30 to 32. The mounts 23, 23 receive the engaged members 10, 10, which constitute the front-back locking mechanism.

Each mount 23 is provided with through-holes 23a and 23b. The through-holes 23a and 23b are formed at positions corresponding to a first projection 60 and a second projection 61 (described below) of the engaged member 10. The first projection 60 and the second projection 61 are inserted into the through-holes 23a and 23b, respectively. In other words, the through-holes 23a and 23b extend through the mount 23 in the front-back direction.

The mounts 23 that receive the engaged members 10, which constitute the front-back locking mechanism, are disposed on the both right and left side faces of the rear-face coupler 4c, i.e., outside the width of the right and left headrest pillars 2, 2. In other words, the engaged members 10 are disposed outside the right and left headrest pillars 2, 2 along their width.

The receivers 24, 24 are open toward the front of the fixed frame 4, as shown in FIG. 24, and receive the urging members. More specifically, the receivers 24, 24 are boxes integrated with the surfaces, adjacent to the dent 22, of the right and left pillar holders 4a and 4b and the rear-face coupler 4c.

Each retainer 24a prevents the forward movement of the urging member accommodated in the receiver 24. The retainer 24a is integrated with the receiver 24 and protrudes downward from the front end of the receiver 24.

The urging members accommodated in the receivers 24 are each a coil spring having a hook at one end. The hook is received by the corresponding engaging portion 71. When the urging member is accommodated into the receiver 24, the other end of the urging member is received by the retainer 24a.

Each engaging portion 71 is urged by the corresponding coil spring toward the teeth 60a of the corresponding engaged member 10 (described below).

The supports 25 and 26 support and are pivotally connected to the inside link 6 and the outside link 7 constituting the X-link mechanism about the shaft S. In other words, the fixed frame 4 includes the supports 25 and 26 that pivotally support the inside link 6 and the outside link 7 with the shaft S.

The supports 25 and 26 are disposed on the upper and lower surfaces, facing each other, of the right and left pillar holders 4a and 4b. In other words, the supports 25 and 26 are disposed at four corners of the dent 22.

The supports 25 and 26 are integrated with the rear-face coupler 4c. The left upper support 25 is integrated with the pillar holder 4a and the other or right upper support is disposed away from the pillar holder 4b. One of the lower supports 26 is disposed away from the pillar holder 4a and the other lower support is integrated with the pillar holder 4b.

The shaft S connecting the supports 25, 25 and the inside link 6 is assembled from the side, remote from the operating unit 9, of the fixed frame 4, that is, from the side of the right pillar holder 4b.

The wall forming the pillar holder 4b has insertion holes 25a and 25b extending along the direction of insertion of the shaft S. The support 25 adjacent to the pillar holder 4b has a through-hole 25c along the direction of insertion of the shaft S. The rear edge of the inside link 6 between the supports 25, 25 has the through-hole 6b along the direction of insertion of the shaft S. The through-hole 6b extends along the shaft S and a cutout 6a. The support 25 adjacent to the pillar holder 4a has an insertion hole 25d. The insertion hole 25d does not extend through the support 25 and receives the tip of an inserted shaft S.

The shaft S is inserted into the insertion hole 25a having an opening on the side face of the right pillar holder 4b of the right and left pillar holders 4a and 4b until the tip of the shaft S reaches the insertion hole 25d formed on the support 25 adjacent to the left pillar holder 4a to connect the rear edge of the inside link 6. In other words, the shaft S is inserted into laterally adjacent through-holes and insertion holes formed in the links 6 and 7 and the supports 25, 26, 35 and 36.

Figure 23:
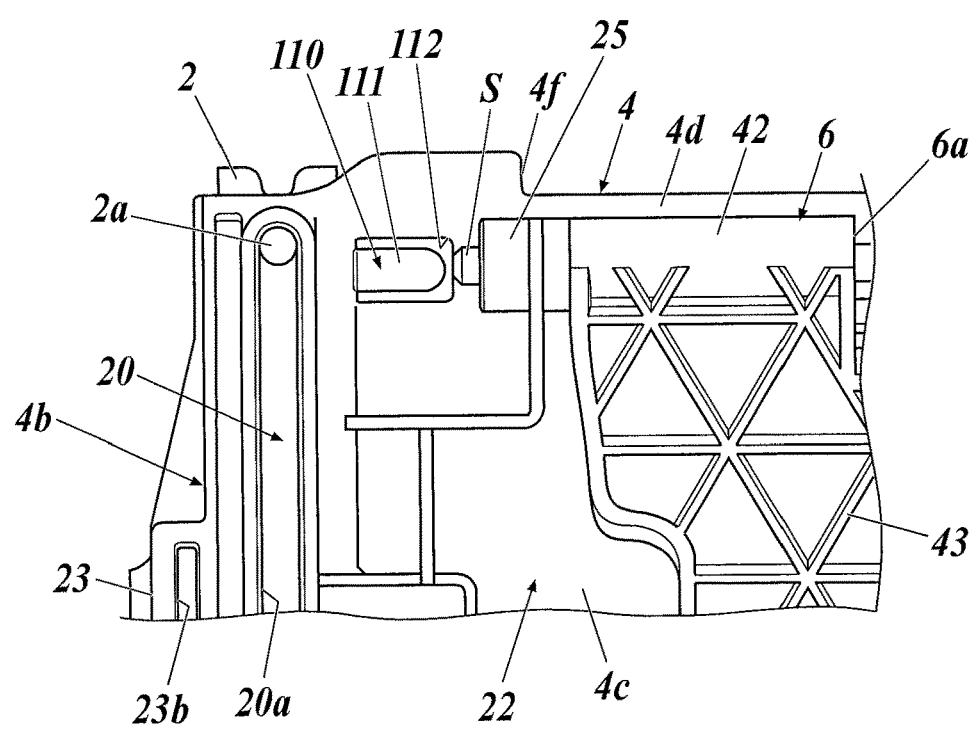
FIG. 23 is a partially enlarged perspective view of a second movement regulator according to the second embodiment of the present invention.
Figure 25:
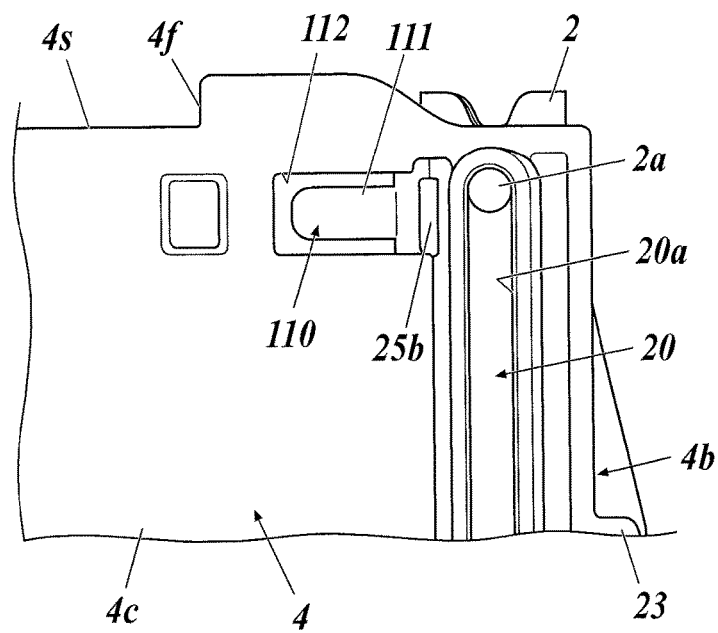
FIG. 25 illustrates an opening functioning as a window for checking the second movement regulator according to the second embodiment of the present invention.

With reference to FIGS. 23 to 25, the second movement regulator 110 is disposed between the right pillar holder 4b and the support 25. The second movement regulator 110 regulates the movement of the shaft S connecting the fixed frame 4 and the inside link 6 along its extending direction.

The second movement regulator 110 is disposed on the side from which the shaft S is inserted.

The second movement regulator 110 protrudes from a portion near the insertion hole 25b, which extends through the inner wall of the pillar holder 4b, toward the through-hole 25c of the right support 25. The second movement regulator 110 includes a regulating projection 111 that regulates the movement of the shaft S in its extending direction after the insertion of the shaft S into the through-hole 25c. The regulating projection 111 controls the movement of the shaft S.

The regulating projection 111 is elastic and has a tip disposed to face the center of shaft S after insertion of the regulating projection 111 into the through-hole 25c. A base end of the regulating projection 111 is disposed away from the insertion hole 25b, which extends through the inner wall of the pillar holder 4b. At the time of insertion of the shaft S, the tip of the regulating projection 111 is elastically deformed away from the through-hole 25c.

Alternatively, the regulating projection 111 may be tapered toward the tip, although not shown. This configuration allows the regulating projection 111 to be readily elastically deformed to facilitate the insertion of the shaft S. The base end of the regulating projection ill is thick and can enhance the rigidity of the inner wall of the pillar holder 4b having the insertion hole 25b.

An opening 112 is formed on the fixed frame 4 at a position facing the regulating projection 111. In other words, the opening 112 is formed on the rear-face coupler 4c at a position facing the regulating projection ill to function as a window for checking the regulating projection 111.

The opening 112 is in communication with the insertion hole 25b extending through the inner wall of the pillar holder 4b. In other words, the opening 112 and the insertion hole 25b together form an expanded opening area. The expanded opening area can reduce the amount of the wall around the regulating projection 111, which facilities the elastic deformation of the regulating projection 111.

The lower supports 26, 26 are longer than the upper supports 25, 25 in the vertical direction. The supports 25, 26, 35 and 36 include a plurality of supports which slidably support the ends of the inside link 6 and the ends of the outside link 7 in the vertical direction. The lower supports 26, 26 of the fixed frame 4 are supports for supporting slidably.

More specifically, the lower supports 26, 26 are each long in the vertical direction and include a receiving portion (not shown) into which the shaft S is inserted. The receiving portion has an angular U shape in cross sectional view, similar to that of a receiving portion 36c shown in FIGS. 18 and 28. The receiving portions of the lower supports 26, 26 are long holes (slits or dent grooves) in the vertical direction along the lower supports 26, 26. The outside link 7 is connected to the supports 26 with the shaft S inserted into the receiving portions. Of the rear edges of the inside link 6 and the outside link 7, the lower ends (of the rear edge of the outside link 7) are slidably supported in the vertical direction of the supports 26, 26.

The shaft S connecting the supports 26, 26 and the outside link 7 is assembled from the side, remote from the operating unit 9, of the fixed frame 4, that is, the side of the right pillar holder 4b.

The shaft S is inserted into the insertion hole having an opening on the side face of the right pillar holder 4b of the right and left pillar holders 4a and 4b until the tip of the shaft S reaches the receiving portion formed in the support 26 adjacent to the left pillar holder 4a to connect the rear edge of the outside link 7. In other words, the shaft S is inserted into laterally adjacent through-holes and insertion holes formed in the links 6 and 7 and the supports 25, 26, 35 and 36.

The interval between the rear edges of the inside link 6 and the outside link 7 is greater at the time of assembling each end of the inside link 6 and the outside link 7 to the fixed frame 4 (supports 25 and 26) than at the time of sliding the lower ends (of the rear edge of the outside link 7).

The lock holder 27 holds the vertical locking member (not shown), which constitutes the vertical locking mechanism, and is disposed in the vicinity of the rear end of the left pillar holders 4a. The vertical locking member is held by the lock holder 27, adjacent to the operating unit 9. This configuration allows the vertical locking member to be operated by the operating unit 9.

(Movable Frame)

The movable frame 5 is disposed adjacent to the head of an occupant and movable in the front-back direction relative to the fixed frame 4. More specifically, the movable frame 5 can move in the front-back direction relative to the fixed frame 4, as shown in FIGS. 17 to 19, 30, and 31.

The movable frame 5 is composed of resin and includes the front cover 30, the rear cover 31, bottom edge covers 32, 32, a holder 33, a button mount 34, a plurality of supports 35 and 36, guides 37, and protruding ribs 38. The front cover 30, the rear cover 31, and the bottom edge covers 32, 32 of the movable frame 5 are fabricated separately.

The front cover 30 and the rear cover 31 are combined to form a hollow case.

The front cover 30 supports a head. The front cover 30 includes a front wall 30a and a peripheral wall 30b. The peripheral wall 30b extends backwardly from the perimeter of the front wall 30a. The portions constituting the front cover 30 are integrated.

With reference to FIGS. 18 to 20 and 29, the front wall 30a includes steps 30h and coupling walls 30i, 30j, 30k, 30l, and 30m.

The steps 30h are disposed to sandwich the ends of the front edge (lower edge) of the inside link 6 and protrude backward. The steps 30h regulate the horizontal position of the inside link 6.

The steps 30h are formed such that the front face of the front wall 30a has a concave and the rear face of the front wall 30a has a convex at the corresponding position. The steps 30h are integrated with the supports 36, 36.

The coupling walls 30i are ribs each disposed between the corresponding lower support 36 and the corresponding upper support 35 to couple the supports 35 and 36.

The coupling walls 30j are ribs each disposed between one of the upper supports 35 and the peripheral wall 30b to couple the support 35 and the peripheral wall 30b.

The coupling walls 30k, 30l and 30m are ribs disposed between one of the supports 36, 36 and the peripheral wall 30b to couple the supports 36, 36 and the peripheral wall 30b.

More specifically, the coupling walls 30k are each disposed between one of the supports 36 and the lower peripheral wall 30b. The coupling walls 30l are each disposed between the left support 36, adjacent to the operating unit 9, and the left peripheral wall 30b. The coupling walls 30m are each disposed between the right support 36 and the right peripheral wall 30b.

Figure 29:
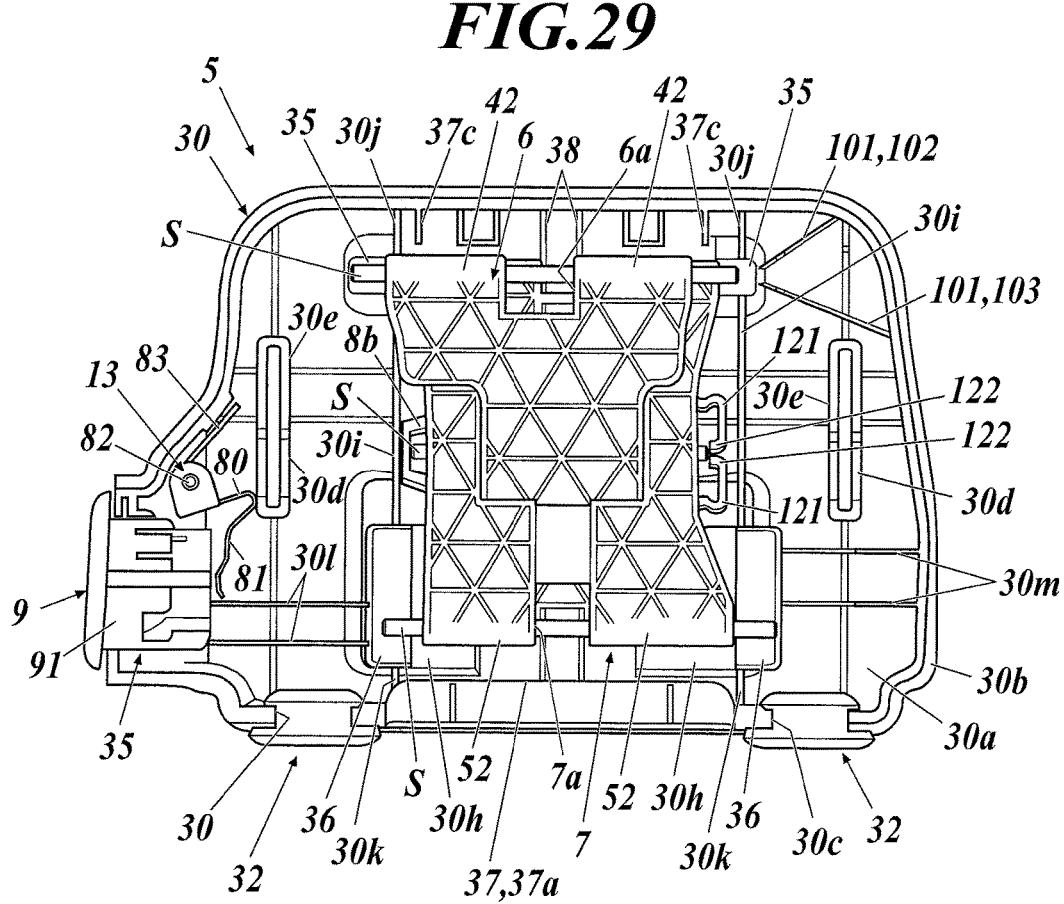
FIG. 29 illustrates a front cover, a first link, a second link, and an operating unit according to the second embodiment of the present invention.

The coupling walls 30l and the coupling walls 30m, which extend horizontally, disposed at different vertical levels, as shown in FIG. 29. In other words, the coupling walls 30l are disposed distant from the operating unit 9. The coupling walls 30l are disposed at positions that do not interfere with the operating unit 9 (and the pivoting member 13), which is operated at the time of manipulation of the headrest.

Each support 35 is disposed between the corresponding coupling wall 30i and the corresponding coupling wall 30j. Alternatively, each coupling wall 30i may be integrated with the corresponding coupling wall 30j. In this case, the integrated coupling walls function as ribs that couple the support 35 to the upper peripheral wall 30b.

The front cover 30 is provided with reinforcing ribs, as needed, to effectively support a boundary between the front wall 30a and the peripheral wall 30b and the load of the head.

The rear cover 31 includes a rear wall and a peripheral wall 31b. The peripheral wall 31b extends forward from the upper and lower and right and left edges of the rear wall. The peripheral wall 31b of the rear cover 31 is coupled to the peripheral wall 30b of the front cover 30 to form the case.

Reinforcing ribs are disposed, as needed, on the front face of the rear wall 31a and the peripheral wall 31b to reinforce the boundary between the rear wall and the peripheral wall 31b.

The peripheral wall 30b of the front cover 30 is fitted to the peripheral wall 31b of the rear cover 31 via a fitting structure. Alternatively, other techniques may be used.

Figure 18:
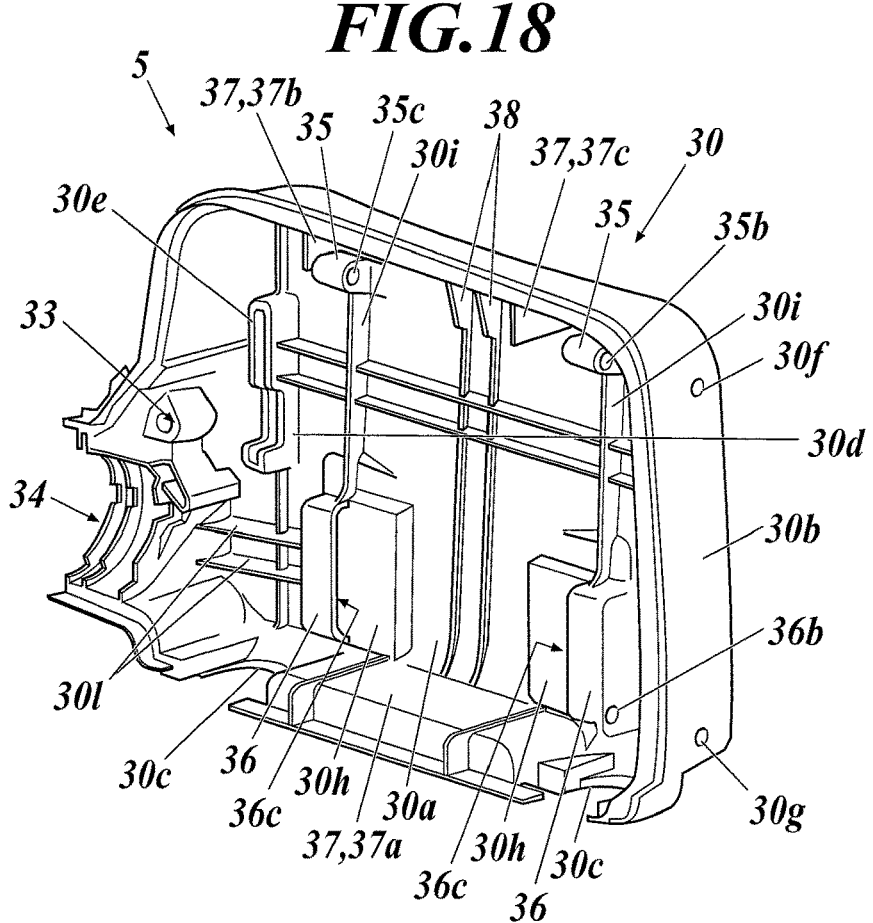
FIG. 18 is a perspective view of the inside of a front cover according to the second embodiment of the present invention.
Figure 19:
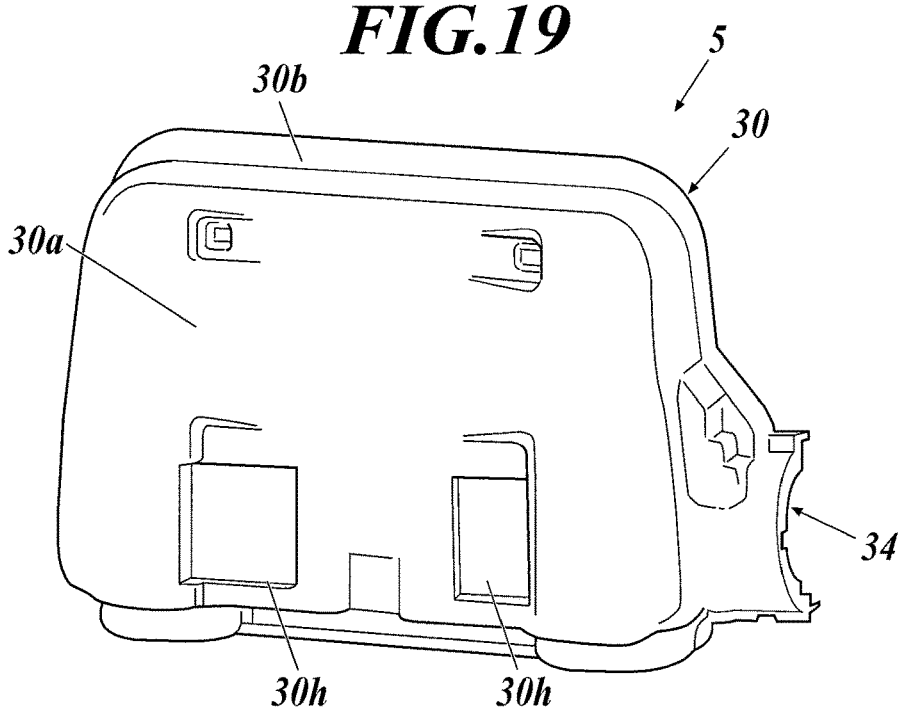
FIG. 19 is a perspective view of the outside of the front cover according to the second embodiment of the present invention.

With reference to FIGS. 17 and 18, the front cover 30 includes base end receivers 30d. Each base end receiver 30d is disposed at a position corresponding to that of a base end 63 of the corresponding engaged member 10 (described below) so as to receive the corresponding base end 63. The base end receiver 30d protrudes from the rear surface of the front cover 30 and includes a wall 30e surrounding the base end 63.

The rear cover 31 (not shown) includes pairs of tip receivers. Each pair of tip receivers is disposed at a position corresponding to those of the tip of the first projection 60 and the tip of the second projection 61 of the corresponding engaged member 10 (described below) so as to receive the tips.

Each engaged member 10 is disposed in the front-back direction. The base end 63 of engaged member 10 is held by the front cover 30, while the tips of the first projection 60 and the second projection 61 are held by the rear cover 31. Thus, the engaged member 10 is carried by the front cover 30 and the rear cover 31.

The bottom edge covers 32, 32 are fitted to two long holes (described below) in the bottom of the case, which is formed when the front cover 30 is coupled to the rear cover 31. The bottom edge cover 32 each include a cylinder 32a and a flange 32b. The cylinder 32a is inserted into the corresponding long hole. The flange 32b is disposed at the lower end of the cylinder 32a and comes into contact with the bottom of the case.

On the bottoms of the peripheral walls 30b and 31b, are provided pairs of notches 30c and 31c, respectively, into which the right and left headrest pillars 2 and the bottom edge covers 32 are inserted. The notches 30c and 31c in each pair are each a semi-ellipse and can together form one long hole on the bottom of the case when the peripheral wall 30b is coupled to the peripheral wall 31b.

The two long holes are formed on the bottom of the case and disposed to enable the front-back movement of the movable frame 5 along the length of the holes. The cylinders 32a are also disposed to enable the front-back movement of the movable frame 5 along the length of the cylinders 32a.

The holders 33 hold a pivoting shaft 82 of the pivoting member 13 (described below) and are disposed in the vicinity of the operating unit 9, as shown in FIG. 29.

With reference to FIGS. 17 to 19 and 29, the button mount 34 is amount through which the button 9 serving as the operating unit 9 is mounted on the front cover 30 and the rear cover 31 and disposed on the side faces of the front cover 30 and the rear cover 31.

The button mount 34 is a cylinder protruding from the side faces (peripheral walls 30b and 31b) of the front cover 30 and the rear cover 31 and surrounds the button 9.

The supports 35 and 36 support the inside link 6 and the outside link 7, which constitutes the X-link mechanism. The inside link 6 and the outside link 7 are pivotally connected to the supports 35 and 36.

The supports 35 and 36 are disposed on the rear surface of the front cover 30 at positions corresponding to those of the front edges of inside link 6 and the outside link 7. The supports 35 and 36 are disposed on the rear surface of the front cover 30 at the upper and lower lateral ends thereof.

In other words, the supports are provided at four positions in the rear surface of the front cover 30. The front edge of the outside link 7 is connected to the upper supports 35. The front edge of the inside link 6 is connected to the lower supports 36.

A shaft S connecting the supports 35 and the outside link 7 is assembled from the right side, remote from the operating unit 9, of the movable frame 5.

An insertion hole 30f is formed in the right top of the peripheral wall 30b of the front cover 30. The insertion hole 30f extends through the peripheral wall in the direction of insertion of the shaft S. A through-hole 35b, which extends in the direction of insertion of the shaft S, is formed in the support 35 adjacent to the insertion hole 30f. An insertion hole 35c is formed in the support 35 opposite to the insertion hole 30f. The insertion hole 35c does not extend through the support 35 and receives the tip of an inserted shaft S.

The shaft S is inserted into the insertion hole 30f, which is formed on the right side face of the peripheral wall 30b of the front cover 30, until the tip of the shaft S reaches the insertion hole 35c, which is formed on the left support 35, to connect the front edge of the outside link 7. In other words, the shaft S is inserted into laterally adjacent through-holes and insertion holes formed in the links 6 and 7 and the supports 25, 26, 35 and 36.

Figure 20:
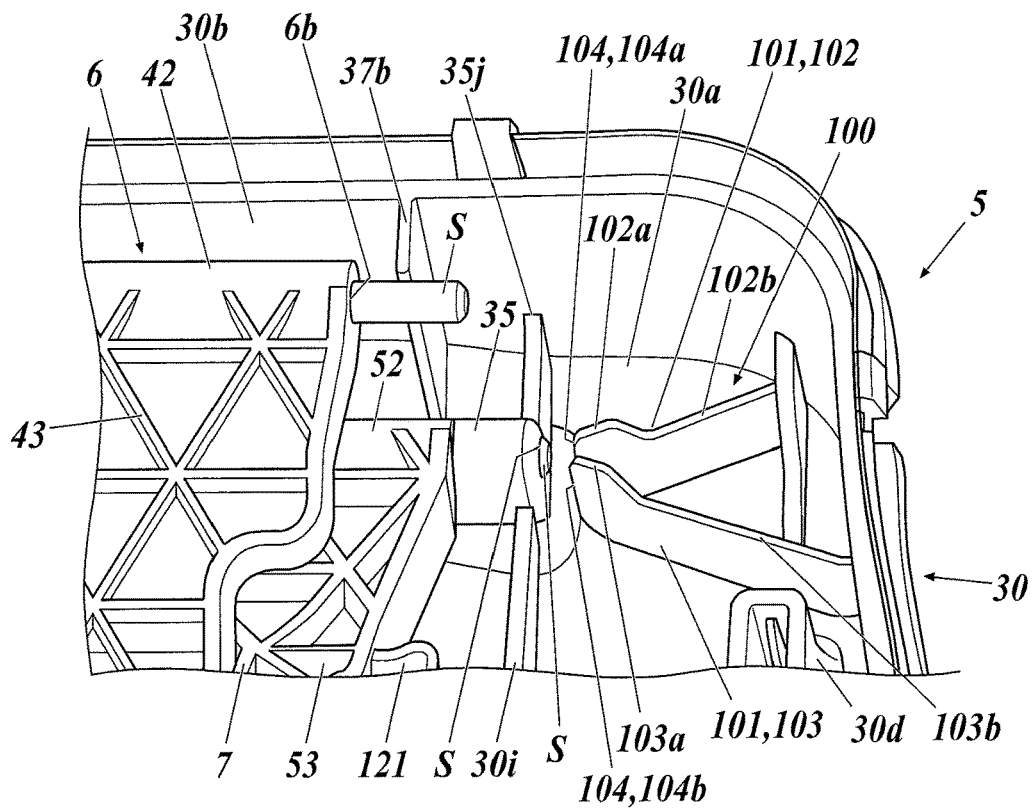
FIG. 20 is a partially enlarged perspective view of a first movement regulator according to the second embodiment of the present invention.
Figure 21:
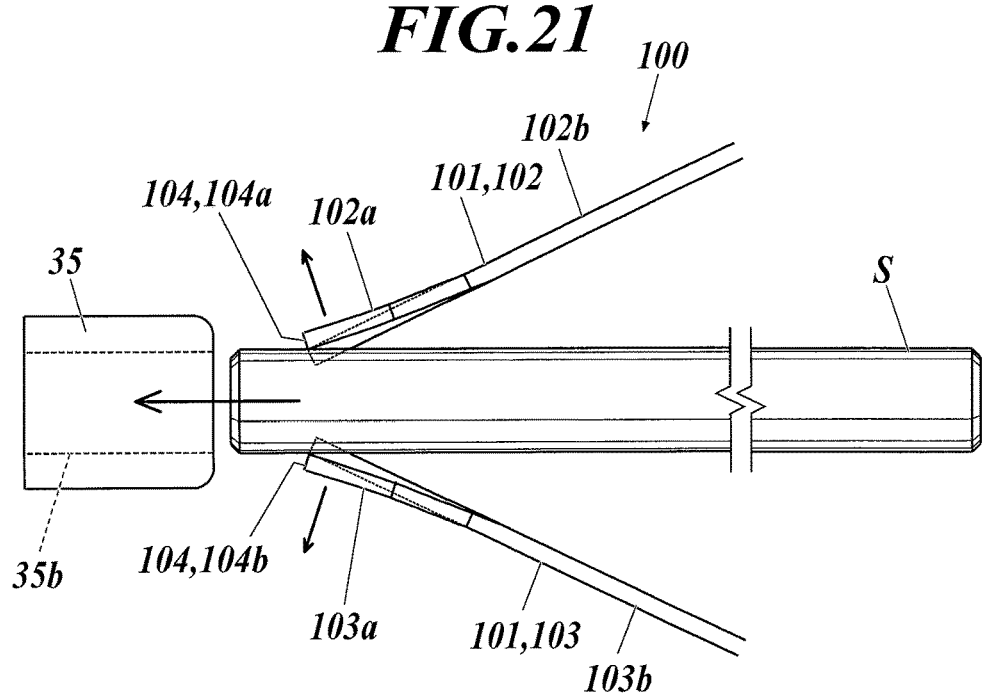
FIG. 21 describes the operation of the first movement regulator according to the second embodiment of the present invention at the time of insertion of a shaft.

With reference to FIGS. 20 and 21, the first movement regulator 100 is disposed between the right peripheral wall 30b of the front cover 30 and the support 35. The first movement regulator 100 regulates the movement of the shaft S connecting the movable frame 5 and the outside link 7 in its extending direction.

The first movement regulator 100 is positioned on the side from which the shaft S is inserted.

The first movement regulator 100 includes guides 101 and restrictors 104. The guides 101 directs the shaft S into the through-hole 35b formed in the support 35 adjacent to the insertion hole 30f at the time of insertion of the shaft S. The restrictors 104 are integrated with the sides, adjacent to the support 35, of the guides 101 and regulate the movement of the shaft S in its extending direction after insertion into the through-hole 35b. In other words, the guides 101 guide the shaft S into the through-hole 35b, while the restrictors 104 restrict the movement of the shaft S.

The guides 101 are integrated with the movable frame 5 and disposed at positions on the movable frame where the shaft S is disposed between the guides 101. Each of the guides 101 includes a first guiding wall 102 and a second guiding wall 103. The distance between the first guiding wall 102 and the second guiding wall 103 tapers or decreases toward the direction of insertion.

More specifically, the first guiding wall 102 and the second guiding wall 103 are integrated with the front wall 30a and the right peripheral wall 30b of the front cover 30. In other words, the ends, adjacent to the front wall 30a, of the first guiding wall 102 and the second guiding wall 103 are integrated with the front wall 30a. The ends, adjacent to the right peripheral wall 30b, of the first guiding wall 102 and the second guiding wall 103 are integrated with the right peripheral wall 30b. Other ends are free ends and disposed so as not to interfere with other members or portions. The ends adjacent to the support 35 are away from the support 35.

The first guiding wall 102 and the second guiding wall 103 are elastic and deformed at the time of guiding the shaft S and is resiliently restored after the passage of the shaft S.

The ends, adjacent to the support 35, of the first guiding wall 102 and the second guiding wall 103 protrude backward. The other portions of the first guiding wall 102 and the second guiding wall 103 protrude forward. In other words, the ends, adjacent to the support 35, of the first guiding wall 102 and the second guiding wall 103 have projections 102a and 103a protruding toward the shaft S, respectively. The other portions of the first guiding wall 102 and the second guiding wall 103 include recesses 102b and 103b, respectively, to avoid interference of the first guiding wall 102 and second guiding wall 103 with the fixed frame 4.

More specifically, the projections 102a and 103a are on the extension of the insertion hole 30f and the through-hole 35b (on which the shaft S travels). The recesses 102b and 103b are disposed closer to the front wall 30a than the line connecting the insertion hole 30f and the through-hole 35b.

The restrictors 104 are provided at ends of the first guiding wall 102 and the second guiding wall 103 where the ends are adjacent to the support 35. For the convenience of explanation, the restrictor 104 adjacent to the first guiding wall 102 is referred to as the first restrictor 104a. The restrictor 104 adjacent to the second guiding wall 103 is referred to as the second restrictor 104b.

As described above, the ends, adjacent to the support 35, of the first guiding wall 102 and the second guiding wall 103 are away from the support 35. Thus, the positions, facing the shaft S inserted into the through-hole 35b, of the first restrictor 104a and the second restrictor 104b are away from the support 35. More specifically, the ends, from the front wall 30a to the protruding portion, of the first restrictor 104a and the second restrictor 104b are away from the support 35. This configuration facilitates the elastic deformation of the first guiding wall 102 and the second guiding wall 103.

In this first movement regulator 100, the first guiding wall 102 and the second guiding wall 103 are disposed such that the distance therebetween vary so as to become narrower. This configuration facilitates the correction of the orientation of the shaft S with the first guiding wall 102 or the second guiding wall 103 even if the inserted tip deviates toward the first guiding wall 102 or the second guiding wall 103.

The lower supports 36, 36 are longer than the upper supports 35, 35 in the vertical direction. The supports 25, 26, 35 and 36 include a plurality of support which slidably support the ends of the inside link 6 and the ends of the outside link 7 in the vertical direction. The lower supports 36, 36 are supports for supporting slidably.

More specifically, the lower supports 36, 36 extend vertically and include receiving portions 36c into which shaft S is inserted. Each receiving portion has an angular U shape in cross sectional view. The receiving portions 36c of the lower supports 36 are vertically long holes (slits or grooves) along the lower supports 36, 36. The inside link 6 is connected to the supports 36, 36 with a shaft S inserted into the receiving portions 36c, 36c. The lower ends (of the front edge of the inside link 6) of the front edges of the inside link 6 and the outside link 7 are supported slidably in the vertical direction of the supports 36, 36.

The shaft S connecting the supports 36, 36 and the inside link 6 is assembled from the right side, remote from the operating unit 9, of the movable frame 5.

The lower right end of the peripheral wall 30b of the front cover 30 has an insertion hole 30g. The insertion hole 30g extends through the peripheral wall 30b in the direction of insertion of the shaft S. The support 36 adjacent to the insertion hole 30g has a through-hole 36b along the direction of insertion of the shaft S. The through-hole 36b communicates the space in the receiving portion 36c in the right support 36 with the space between the right support 36 and the lower right end of the peripheral wall 30b of the front cover 30. The through-hole 36b is disposed at the bottom of the receiving portion 36c of the right support 36.

In other words, the shaft S is inserted into the insertion hole 30g having an opening at the lower right end of the peripheral wall 30b of the front cover 30 until the tips of the shaft reaches the receiving portion 36c formed in the left support 36 to connect the front edge of the inside link 6. In other words, the shaft S is inserted into laterally adjacent through-holes and insertion holes formed in the links 6 and 7 and the supports 25, 26, 35 and 36.

The interval between the front edges of the inside link 6 and the outside link 7 is greater at the time of assembling each end of the inside link 6 and the outside link 7 into the movable frame 5 (the supports 35 and 36) than at the time of sliding the lower ends (of the front edge of the inside link 6).

The relation between the fixed frame 4, the front cover 30, the inside link 6 and the outside link 7 will now be described in detail. As described above, the upper or lower ends (in this embodiment, the lower end) of the front edge and the rear edge of the inside link 6 and the outside link 7 are supported slidably in the vertical direction of the lower supports 26 and 36.

The intervals between the front edges of the inside link 6 and the outside link 7 and between the rear edges of the inside link 6 and the outside link 7 are configure to be greater at the time of assembling the ends of the inside link 6 and the outside link 7 to the front cover 30 and the fixed frame 4 than at the time of sliding the lower ends in the receiving portions 36c of the supports 26 and 36, respectively.

In other words, when the lower ends of the inside link 6 and the outside link 7 are connected to the supports 26 and 36, the insertion of the shaft S starts with the through-holes 26b and 36b of the supports 26 and 36, respectively. The shaft S is designed so as not to fall to the through-holes 26b and 36b once assembled.

Of the lower supports 36, 36 disposed on the front cover 30 according to this embodiment (the supports 36, 36 for sliding the shaft S), the support 36 for receiving the tip of an inserted shaft S in the direction of insertion (the left support 36) has the above-mentioned receiving portion 36c.

The receiving portion 36c extends vertically and has an angular U shape in cross sectional view that is open toward the side from which the shaft S is inserted.

Figure 28:
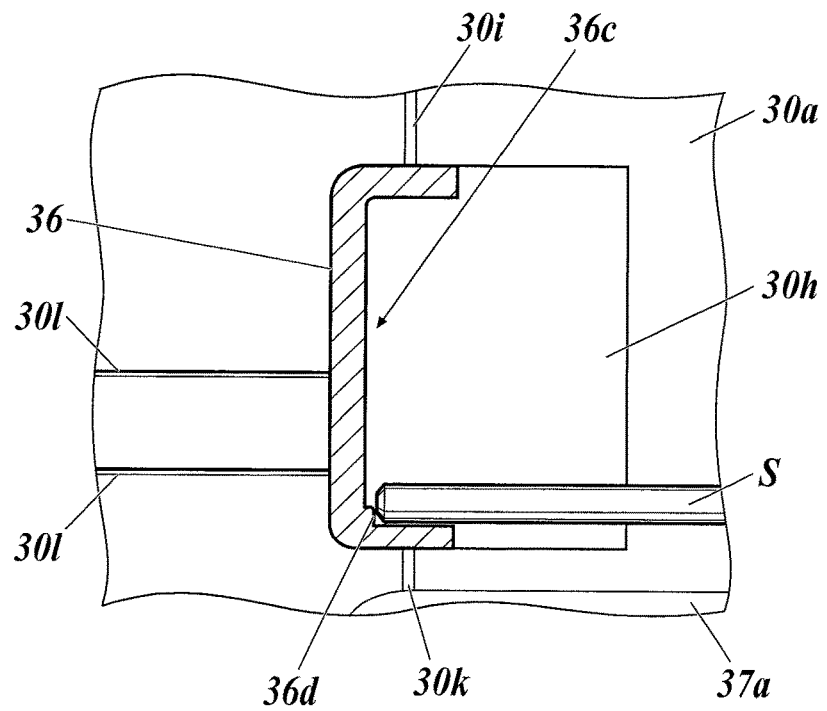
FIG. 28 is a cross-sectional view of a receiving portion having a stop according to the second embodiment of the present invention.

The receiving portion 36c includes a locator 36d with which the tip of the shaft S inserted into the receiving portion 36c collides, as shown in FIG. 28. The locator 36d thus determines the position of the shaft S in the direction of insertion.

The locator 36d is integrated with the inside of the receiving portion 36c and disposed at the bottom of the receiving portion 36c and protrudes toward the side from which the shaft S is inserted into the receiving portion 36c. In other words, the locator 36d comes into contact with the shaft S at the deepest position of the shaft S inserted into the insertion hole 30g.

Since the shaft S is firmly held by the through-hole 6b of the inside link, a further movement beyond the locator 36d is prevented after the insertion. The contact of the shaft S with the locator 36d at the time of the assembly of the shaft S provides a beneficial effect of preventing the contact of the tip of the shaft S with the internal wall (wall in the direction of insertion) of the receiving portion 36c at the time of a vertical slide of the shaft S inside the receiving portion 36c in accordance with the slide of a movable frame 5.

Such a configuration of the locator 36d and the interval between the front edges of the inside link 6 and the outside link 7 determines a method for manufacturing the headrest 1, more specifically a method for assembling the front edge of the inside link 6 to the lower supports 36 of the movable frame 5.

For assembly of the front edge of the inside link 6 to the left support 36 with the shaft S, the tip of the shaft S is inserted into the receiving portion 36c and collides with the locator 36d. The front edge of the outside link 7 is then assembled to the upper supports 35 with the shaft S.

The configuration of the locator 36d is also applicable to the lower left support 26 in the fixed frame 4.

The locator 36d according to this embodiment is integrated with the inside of the receiving portion 36c. Alternatively, the locator 36d may be subsequently added to the inside of the receiving portion 36c or a separate locator 36d may be inserted from the outside.

The guide 37 guides the movable frame 5. With reference to FIGS. 23 to 25 and 29, the guide 37 includes a lower contacts 37a and upper rails 37c.

The lower contact 37a is disposed on the inner face of the bottom of the case, has a concave shape and comes into contact with the lower face of the fixed frame 4 to guide the movable frame 5.

The upper rails 37c, 37c are disposed on the inner face of the top of the case and protrude downward. The side faces of the upper rails 37c come into contact with the side faces of the upper contacts 4f of the fixed frame 4 to guide the movable frame 5.

The movable frame 5 moves in the front-back direction such that the lower contact 37a and the upper rails 37c, 37c, which constitute the guide 37, are always in contact with the upper and lower ends of the fixed frame 4.

With reference to FIGS. 17, 18, and 29, the protruding ribs 38 are disposed on the rear face of the front wall 30a of the front cover 30 and extend from the top of the peripheral wall 30b to the bottom of the peripheral wall 30b via the front wall 30a. The protruding ribs 38 are disposed at predetermined intervals.

The protruding ribs 38, 38 are disposed at the center between the supports 35, 35. The outside link 7 is provided with a cutout 7a fitted to the protruding ribs 38, 38 in the center of the top (front end). When the outside link 7 is connected to the supports 35, 35 via the shaft S, the protruding ribs 38, 38 are fitted to the cutout 7a. The movable frame 5 supports the outside link 7 with the supports 35, 35 and the center of the width of the outside link 7 disposed adjacent to the movable frame 5.

The protruding ribs 38 are fitted to the cutout 7a such that the outer surfaces of the protruding ribs 38, 38 are in contact with the both sides of the cutout 7a.

(X-Link Mechanism)

With reference to FIGS. 17, 24, and 29, the inside link 6 of the X-link mechanism has the upper (rear) edge adjacent to the fixed frame 4 and the lower (front) edge adjacent to the movable frame 5. The lower edge extends through an insertion hole 51 (described below) of the outside link 7.

The outside link 7 has the upper (front) edge adjacent to the movable frame 5 and the lower (rear) edge adjacent to the fixed frame 4.

Alternatively, the front-back direction of the inside link 6 and the outside link 7 may be reversed. The X-link mechanism is composed of resin, except for the shaft S.

The upper edge of the inside link 6 is disposed between the upper supports 25, 25 on the right and left sides of the fixed frame 4.

The lower edge of the outside link 7 is disposed between the lower supports 26, 26 on the right and left sides of the fixed frame 4.

The lower edge of the inside link 6 is disposed between the lower supports 36, 36 on the right and left sides of the movable frame 5.

The upper edge of the outside link 7 is disposed between the upper supports 35, 35 on the right and left sides of the movable frame 5.

As described above, at least the upper edges of the inside link 6 and the outside link 7 are supported by the fixed frame 4 and the movable frame 5, respectively, in the center of their width (due to the relation between the protruding ribs 28 and 38 and the cutouts 6a and 7a).

Figure 27:
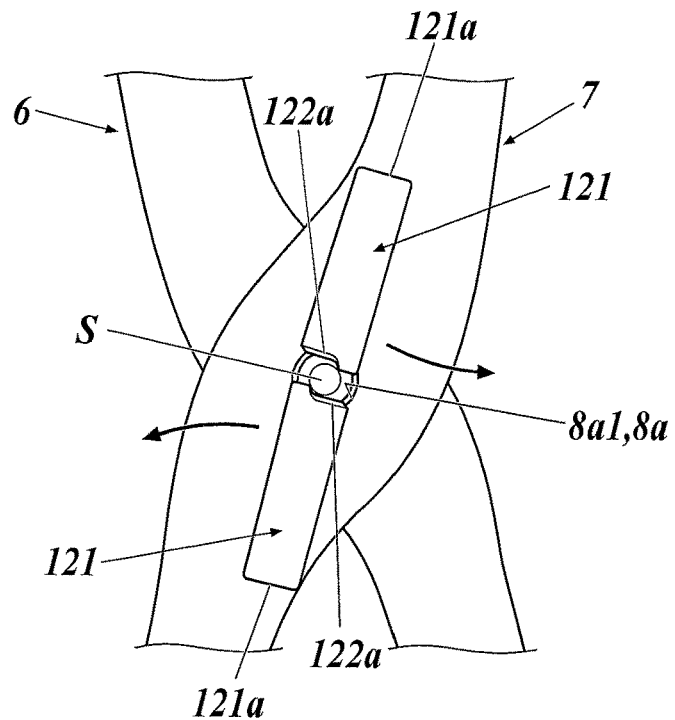
FIG. 27 is a side view of the third movement regulator according to the second embodiment of the present invention.

With reference to FIG. 27, the inside link 6 and the outside link 7 are curved in side view. With reference to FIG. 30, the inside link 6 and the outside link 7 are folded into a shape suitable for being accommodated in the dent 22 of the fixed frame 4.

The central portions, intersecting with each other, of the inside link 6 and the outside link 7 are pivotally connected about the shaft S.

The shaft S is inserted into through-holes 8a1, 8a2, and 8a3 formed in the central portions of the inside link 6 and the outside link 7. The through-hole 8a1 extends from the right side face of the central portion of the outside link 7 to the insertion hole 51. The through-hole 8a2 extends from the left side face of the central portion of the outside link 7 to the insertion hole 51. The through-hole 8a3 extends through the central portion of the inside link 6.

Figure 26A:
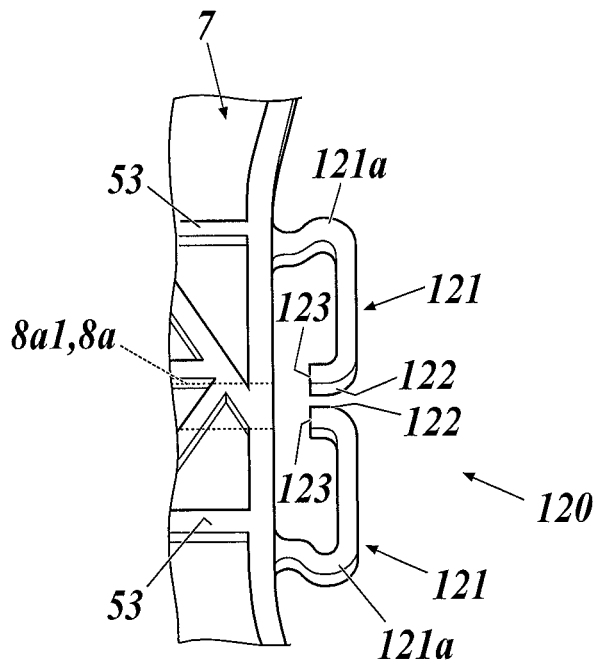
FIG. 26A illustrates a third movement regulator according to the second embodiment of the present invention before insertion of a shaft.
Figure 26B:
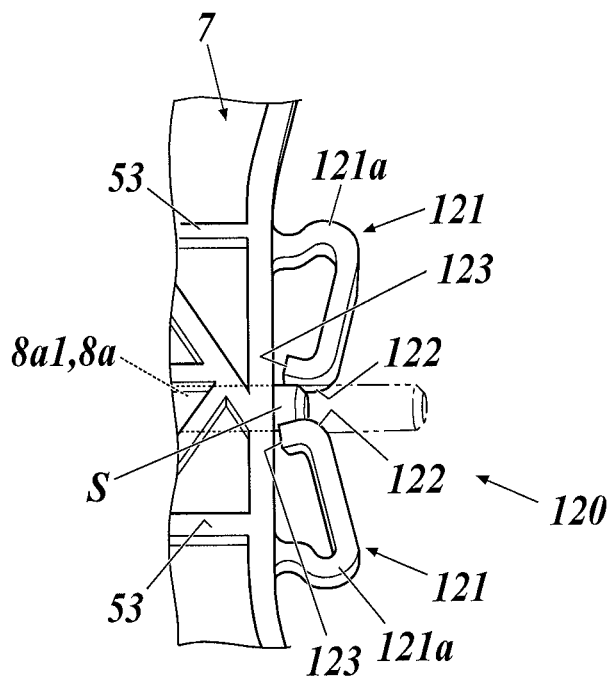
FIG. 26b illustrates the third movement regulator according to the second embodiment of the present invention at the time of insertion of a shaft.

With reference to FIGS. 26 and 27, a third movement regulator 120 is provided on the side face (right), on the side of insertion of the shaft S, of the outside link 7 to regulate the movement of the shaft S in its extending direction.

As shown in FIG. 29, the side face, on the side of insertion of the shaft S, of the outside link 7 recesses inwardly toward the position of the through-holes 8a1, 8a2, and 8a3.

The third movement regulator 120 is disposed on the side face around through-holes 8a1, 8a2, and 8a3. The third movement regulator 120 is disposed at the bottom of the recess on the side face of the outside link 7.

The third movement regulator 120 includes elastic extensions 121, 121, guides 122, 122, and regulators 123, 123.

A pair of elastic extensions 121 is disposed on the side face of the outside link 7 and extends toward the through-hole 8a1. The elastic extensions 121 are integrated with the side face of the outside link 7.

The elastic extensions 121 are elastically deformed at least toward the direction of insertion of the shaft S at the time of insertion of the shaft S into the through-hole 8a1.

Each elastic extension 121 includes the guide 122 and a curvature 121a. The curvature 121a curves in the opposite direction of the corresponding regulator 123. More specifically, the elastic extension 121, 121 each protrude laterally from the side face of the outside link 7, then curve upward or downward, and then extend vertically toward the through-hole 8a1. The tips of the elastic extensions 121, 121 are not in contact with each other and apart from the through-hole 8a1.

The base ends of the elastic extensions 121, 121 integrated with the side face of the outside link 7 are disposed in the vicinity of the ribs 53, 53 formed on the surface of the outside link 7, as shown in FIG. 29. This configuration can enhance the rigidity of the base ends of the elastic extensions 121, 121.

The side faces of the outside link 7 near the through-hole 8a1 and 8a2 are wider than that at its edges. The pair of the elastic extensions 121, 121 is disposed within the width of the side faces of the outside link 7, as shown in FIG. 27.

The guides 122 are positioned at the tips of the elastic extensions 121 and direct the shaft S into the through-hole 8a1 at the time of insertion of the shaft S.

The guides 122 protrude toward the through-hole 8a1 from the tips of the elastic extensions 121 in their extending direction. The pair of the guides 122, 122, which protrudes toward the through-hole 8a1 from the tips of the pair of the elastic extensions 121 in their extending direction, is not in contact with each other and away from the through-hole 8a1.

The shaft S is configured to pass between the pair of the guides 122, 122. Thus, each guide 122 includes a guiding face 122a. More specifically, the guides 122 causes the elastic extensions 121 to be elastically deformed into a direction perpendicular to the extending direction of the shaft S at the time of insertion of the shaft S into the through-hole 8a1.

With reference to FIG. 27, each guiding face 122a includes an arch-like portion and erects around part of the perimeter of the through-hole 8a1. The upper guiding face 122a according to this embodiment is disposed backward with respect to the central axis of the elastic extension 121 in side view. The lower guiding face 122a is disposed forward with respect to the central axis of the elastic extension 121 in side view.

At the time of insertion of the shaft S between the guiding faces 122a, 122a, the pair of the elastic extensions 121, 121 is elastically deformed in the direction shown by the arch arrow in FIG. 27 in accordance with the roundness of the outer perimeter of the shaft S. The upper elastic extension 121 is elastically deformed toward the front direction perpendicular to the extending direction of the shaft S. The lower elastic extension 121 is elastically deformed toward the rear direction perpendicular to the extending direction of the shaft S. Such elastic deformation of the upper and lower elastic extensions 121 in the different directions causes the guiding faces 122a, 122a to face each other, enabling the shaft S to be inserted between the facing guiding faces 122a.

Each regulator 123 is disposed at the tip of the elastic extension 121 in its extending direction and regulates the movement of the shaft S in its extending direction after insertion into the through-hole 8a1. Each regulator 123 is disposed at the tip of the elastic extension 121 in its extending direction and points the side face of the guide 122 in its protruding direction. The regulators 123 are disposed to face the shaft S after insertion into the through-holes 8a1, 8a2, and 8a3. In other words, the regulators 123 indicate the ends of the elastic extensions 121, including the guides 122 and the regulators 123, where the ends are adjacent to the through-hole 8a1.

A stopper 8b is provided on the side face (left), opposite to the side of insertion of the shaft S, of the outside link 7. The stopper 8b is disposed to cover the through-hole 8a2 in the central portion of the outside link 7 and functions as a stopper of the tip of the shaft S inserted into the through-holes 8a1, 8a2, and 8a3.

The shaft S is inserted into the through-holes 8a1, 8a2, and 8a3 as follows: The shaft S is inserted into the through-hole 8a1 through the gap between the pair of the guides 122, 122 until the end of the shaft S in the opposite direction of the direction of insertion passes beyond the regulators 123, 123. Since the elastic extensions 121, 121 are elastic, the guiding faces 122a, adjacent to the through-hole 8a1, are elastically deformed in a direction that causes the guiding faces 122a to face each other at the time of insertion of the shaft S and resiliently restored at the time of passage of the opposite end of the shaft beyond the regulators 123, 123.

The inside link 6 and the outside link 7 are pivotally connected about the shaft S.

The inside link 6 according to this embodiment is generally in the form of a Y-shape such that the portion from the lower edge of the inside link 6 to the central portion at which the shaft is inserted into the insertion hole 51 of the outside link 7 is laterally narrower than the upper edge of the inside link 6.

The inside link 6 includes a plurality of connecting portions 42 disposed on the upper and lower edges. The connecting portions 42 are connected to and supported by the support 25 and the support 36. The through-hole 6b is formed in the connecting portions 42.

The cutouts 6a, 6a are disposed on the upper and lower edges of the inside link 6.

The inside link 6 has several ribs 43 formed on the surface thereof. The ribs 43 are disposed so as to form a truss structure on the surface of the inside link 6. Such ribs 43 can enhance the rigidity and reduce the weight of the inside link 6.

The outside link 7 according to this embodiment is generally wider in the horizontal direction than the inside link 6. The outside link 7 is provided with the insertion hole 51 into which the central and lower portions of the inside link 6 are inserted at its center.

The outside link 7 includes a plurality of connecting portions 52 on the upper and lower edges. The connecting portions 52 are connected to and supported by the support 26 and the support 35. The through-hole 7b is formed in the connecting portions 52.

The cutouts 7a, 7a are disposed on the upper and lower edges of the outside link 7.

The outside link 7 has several ribs 53 formed on the surface thereof. The ribs 53 are disposed so as to form a truss structure on the surface of the outside link 7. Such ribs 53 can enhance the rigidity and reduce the weight of the outside link 7.

The above configuration allows the movable frame 5 to move forward away from and backward to the fixed frame 4 with the X-link mechanism, a movable mechanism.

The front-back locking mechanism and the vertical locking mechanism will now be described in detail.

(Front-Back Locking Mechanism)

The front-back locking mechanism includes a plurality of engaged members 10, the locking member 11, the urging members, and the pivoting member 13. The locking member 11 is engaged with the engaged members 10. The urging members each urge the locking member 11 to the corresponding engaged member 10. The pivoting member 13 is pivotally held by the movable frame 5 and operates the locking member 11.

With reference to FIGS. 17 and 30 to 32, the engaged members 10 are composed of metal, disposed in the front-back direction, and carried by the front cover 30 and the rear cover 31, as described above.

The engaged members 10 are disposed outside the right and left headrest pillars 2, 2 along their width.

The engaged member 10 each have a ratchet structure having teeth 60a disposed in the front-back direction. The teeth 60a protrude upward.

Each engaged member 10 includes the first projection 60, the second projection 61, a gap 62, and a base end 63.

The base end 63 is received by the base end receiver 30d of the front cover 30. The first projection 60 protrudes toward the rear cover 31 from the end of the lower half of the base end 63. The second projection 61 protrudes toward the rear cover 31 from end of the upper half of the base end 63.

The first projection 60 has the teeth 60a, which are core elements of the engaged member 10, a ratchet structure. The teeth 60a protrude diagonally upward from the upper edge of the first projection 60.

The second projection 61 is disposed in parallel with the first projection 60 with a gap from the tops of the teeth 60a. The gap between the second projection 61 and the teeth 60a of the first projection 60 corresponds to the gap 62.

The tips of the first projection 60 and the second projection 61 are each received by the tip receiver of the rear cover 31.

Each engaged member 10 has the first projection 60 extending through a through-hole 23a of the mount 23 and the second projection 61 extending through a through-hole 23b of the mount 23. Thus, the engaged members 10, 10 are disposed outside the right and left headrest pillars 2 along their width. The first projection 60 and the second projection 61 move through the through-holes 23a and 23b in the front-back direction, respectively, in accordance with the front-back movement of the movable frame 5.

The locking member 11, which is engaged with the engaged members 10, constitutes a core structure of the front-back locking mechanism together with the engaged members 10. With reference to FIGS. 17 and 32, the locking member 11 includes the held portion 70, the engaging portions 71, 71, and the coupling portions 72, 72.

The held portion 70 is a long metal shaft extending along the width of the fixed frame 4 and held by the fixed frame 4. The held portion 70, which is disposed in the rear of the fixed frame 4, is mounted through a gap between the tips of the holders 21, 21 and the central holder 21a, disposed on the rear face of the fixed frame 4, and the tips of the stoppers.

The held portion 70 is disposed in the gap 62 between the first projection 60 and the second projection 61. The held portion 70 is disposed above the engaging portions 71, 71.

The engaging portions 71, 71 are metal shafts engaged with the engaged members 10, 10 to lock the movement of the movable frame 5.

More specifically, the engaging portions 71, 71 are disposed in parallel with the held portion 70, pivot about the held portion 70, and are urged toward the teeth 60a for engagement. The engaging portions 71, 71 are disposed in front of the fixed frame 4.

The engaging portions 71, 71 are disposed in positions that allow them to be engaged with the teeth 60a when urged by the urging members and return to the position of the gap 62 when operated in the opposite direction of the urging direction. When the engaging portions 71, 71 move to the position of the gap 62, the lock is released.

As shown in FIG. 17, the ends or tips, adjacent to the teeth 60a, of the engaging portions 71, 71 extend inside the engaged members 10, 10 but do not reach the X-link mechanism.

The coupling portions 72 are metal shafts disposed on the right and left sides of the fixed frame 4 to couple the ends of the held portion 70 to the ends of the engaging portions 71, 71.

The locking member 11 is disposed in the vicinity of the fixed frame 4 and in the form of a substantially C shape surrounding the fixed frame 4. The held portion 70, the engaging portions 71, 71, and the coupling portions 72, 72 are integrated. The corners between the held portion 70 and the coupling portions 72, 72 and those between the held portion 70 and the engaging portions 71, 71 are round.

With reference to FIG. 17, a bumper 73 composed of resin is provided between the locking member 11 and the fixed frame 4. The coupling portion 72 adjacent to the pivoting member 13 is provided with the bumper 73 such that the bumper 73 covers the coupling portion 72, the ends of the held portion 70 and the engaging portion 71 adjacent to the corresponding coupling portion 72. The coupling portion 72 includes the bumper 73.

The bumper 73 is configured to increase the area of contact between the locking member 11 and the pivoting member 13. The bumper 73, which entirely covers the coupling portion 72 of the locking member 11, has a thickness greater than the diameter of the coupling portion 72. The bumper 73 can restrict the moving range of the locking member 11, while preventing a direct contact of the locking member 11 with the fixed frame 4 to reduce the occurrence of abnormal sound.

The urging members each urge the corresponding engaging portion 71 of the locking member 11 toward the corresponding engaged member 10 (the side of the teeth 60a). In this embodiment, the urging members are coil springs, which are accommodated in the receivers 24, as described above.

The hook of each urging member is hooked around the engaging portion 71 from above.

The pivoting member 13 is composed of metal, pivotally held by the movable frame 5, and operates the engaging portions 71 of the locking member 11. With reference to FIGS. 17, 18, and 29 to 32, the pivoting member 13 is held by the front cover 30 and the rear cover 31 through the holders 33.

The pivoting member 13 operates the engaging portions 71 of the locking member 11 in the opposite direction of the urging direction of the urging members to cause the engaging portions 71 to pivot in a direction to disengage the engaging portions 71 from the teeth 60a of the engaged members 10. The pivoting member 13 is oriented such that the engaging portions 71 of the locking member 11 are urged by the urging members. The pivoting member 13 gradually inclines downward from the rear toward the front. In other words, the holders 33 are disposed inclined so that the pivoting member 13 can be inclined.

The pivoting member 13 includes a first operating board 80, a second operating board 81, a pivoting shaft 82, and an urging member 83. The first operating board 80 and the second operating board 81 are integrated.

The first operating board 80 operates the front-back locking mechanism, is disposed below the coupling portion 72 of the locking member 11, and comes into contact with the bumper 73 from below. The protruding tip of the first operating board 80 is disposed below the pivoting shaft 82. Pivoting the first operating board 80 upward about the pivoting shaft 82 can move the bumper 73 upward.

The second operating board 81 operates the vertical locking mechanism. The second operating board 81 is integrated with the first operating board 80 and extends diagonally downward from the end, adjacent to the fixed frame 4, of the first operating board 80 toward the operating unit 9. The protruding tip of the second operating board 81 is disposed below the vertical locking member (lock holder 27). The middle, in the protruding direction, of the second operating board 81 is substantially the same level as that of the vertical locking member (lock holder 27).

The side face, adjacent to the fixed frame 4, of the second operating board 81 is away from the vertical locking member during the locking of the vertical movement and comes into contact with the vertical locking member during the unlocking.

Pivoting the second operating board 81 upward about the pivoting shaft 82 presses the vertical locking member toward the fixed frame 4.

The pivoting shaft 82 is disposed at the end, adjacent to the operating unit 9, of the first operating board 80 and functions as a pivoting shaft for pivoting the pivoting member 13.

The pivoting shaft 82 is a metal shaft, held by the pivoting member 13, and inserted into the holes formed in the holders 33.

The urging member 83 is a coil spring. One end of the urging member 83 is in contact with the upper surface of the first operating board 80, while the other end is in contact with the inner face of the front cover 30 or the rear cover 31. In other words, operating the pivoting member 13 so as to pivot the first operating board 80 upward causes one end of the urging member 83 to approach the other end of the urging member 83. At the time of stopping the operation of the pivoting member 13, the first operating board 80 is restored to its original position by the resilient restoring force of the urging member 83.

This configuration allows the front-back movement of the movable frame 5 relative to the fixed frame 4 to be locked or unlocked at a position at which the engaging portions 71 are each engaged with any of the teeth 60a.

The engagement of the metal engaging portions 71 with the metal teeth 60a in the front-back locking mechanism, may generate abnormal sound (contact sound of metals). A means to prevent such abnormal sound should be preferably installed on the teeth 60a.

More specifically, the engaging portions 71 and/or the teeth 60a are coated (molded) with a resin material (not shown) to prevent occurrence of abnormal sound. The engaging portions 71 or the teeth 60a (first projections 60) may be coated with the resin material over the entire regions or only the contacts between the engaging portions 71 and the teeth 60a.

Alternatively, a lubricant (not shown), such as grease, may be applied to, for example, the engaging portions 71 and/or the teeth 60a to prevent occurrence of abnormal sound.

Alternatively, the first projections 60 may be covered with a resin cover to prevent occurrence of abnormal sound, as shown in FIG. 32.

More specifically, the cover materials 64 each cover from the lower edge of the corresponding first projection 60 to the half-height of the corresponding teeth 60a. This configuration causes the engaging portions 71 to come into contact with the upper edges of the cover materials 64 at the time of engagement of the engaging portions 71 with the teeth 60a.

Alternatively, the cover material 64 each may cover the outer face and/or the inner face of the corresponding first projection 60.

The first projection 60 is covered with the cover material 64 such that the first projection 60 can be inserted into and moved through the through-hole 23a of the corresponding mount 23 together with the cover material 64.

Any of the above configuration can prevent occurrence of abnormal sound at the time of engagement of the metal engaging portions 71 with the metal teeth 60a.

(Vertical Locking Mechanism)

The right and left headrest pillars 2, 2 are provided with the vertical locking mechanism. More specifically, the vertical locking mechanism locks or unlocks the fixed frame 4 at any vertical position of the right and left headrest pillars 2.

The vertical locking mechanism includes several notches 15 disposed on at least one of the right and left headrest pillars 2, 2, the right and left pillar holders 4a and 4b, the vertical locking member, and the pivoting member 13.

The notches 15 may be disposed on at least one of the right and left headrest pillars 2 having the vertical locking member. In this embodiment, the both right and left headrest pillars 2 have the notches 15 because the notches 15 are used together with the locks 3d, 3d of the right and left holders 3, 3 to prevent the detachment of the headrest pillars 2.

With reference to FIG. 17, the notches 15 are provided along the length of the right and left headrest pillars 2. The notches 15 are formed on the inward faces of the right and left headrest pillars 2, 2.

The right and left pillar holders 4a and 4b hold the right and left headrest pillars 2, 2, respectively. This configuration allows the fixed frame 4 to move vertically along the right and left headrest pillars 2, 2.

The fixed frame 4 can be vertically moved within a slidable range of the pillar retainers 2a, 2a disposed on the right and left headrest pillars 2, 2 along the slits 20a, 20a.

The vertical locking member includes an engaging section (not shown) and an urging member (not shown). The engaging section is engaged with any of the notches 15 within the lock holder 27. The urging member (not shown) urges the engaging section in a direction to engage the engaging section with any of the notches 15.

The vertical locking member is pressed toward the back (inward) of the lock holder 27 to disengage the engaging section (not shown) from the notches 15. The engaging section (not shown) remains engaged with the notches 15 until the vertical locking member is operated.

As described above, the pivoting member 13 includes the second operating board 81 that operates the vertical locking member.

The first operating board 80 pivots in conjunction with the second operating board 81. The second operating board 81 can unlock the vertical locking mechanism when the first operating board 80 unlocks the front-back locking mechanism.

The pivoting member 13 has a front-back length in accordance with the moving distance of the movable frame 5. In other words, any portion of the first operating board 80 along its length comes into contact with part of the bumper 73. Any portion of the second operating board 81 along its length comes into contact with part of the button 9. Any portion of the second operating board 81 comes into contact with the vertical locking member. The pivoting shaft 82 is held by the holders 33 along its length.

Since any portion of the second operating board 81 along its length comes into contact with the button 9, the positional relation between the pivoting member 13 and the button 9 depends on the front-back movement of the movable frame 5, but the positional relation between the movable frame 5, consisting of the front cover 30 and the rear cover 31, and the button 9 remains the same.

This configuration allows the fixed frame 4 to be locked or unlocked at any vertical positions of the right and left headrest pillars 2,2, i.e., at the position of any notch 15.

The operating button 9 serving as the operating unit 9 is mounted on the button mount 34 provided on the front cover 30 and the rear cover 31, as described above, and in contact with the pivoting member 13. When pressed into the internal cavity of the case, the operating button 9 can operate the pivoting member 13.

The button 9 includes a button body 90 and a cylinder 91.

The button body 90, which is inserted into the cylinder 91, freely moves back and forth along the cylinder 91. The cylinder 91 is mounted on the button mount 34. The button body 90 is in contact with the lower end (protruding tip) of the second operating board 81 of the pivoting member 13. The button body 90 freely moves back and forth along the cylinder 91 without interference with the holders 33.

This configuration allows the pivoting member 13 to pivot upward about the pivoting shaft 82 and thus allows the first operating board 80 to operate the locking member 11 and the second operating board 81 to operate the vertical locking member.

(Operation of Headrest)

The operation of the headrest 1, which has the above configuration, will now be described.

The operation of the headrest 1 includes a movement of the front cover 30 of the movable frame 5 away from the fixed frame 4 toward the front and a movement back toward the rear. The operation further includes a vertical movement of the fixed frame 4, which includes the right and left pillar holders 4a and 4b, along the right and left headrest pillars 2, 2.

The operation of the movable frame 5 will now be described.

In FIG. 30, the movable frame 5 (front cover 30) is close to the fixed frame 4, i.e., the movable frame 5 is restored to its rear position. When the button 9 is left unoperated, the engaging portion 71 remains engaged with any teeth 60a of the engaged members 10 to lock the front-back movement of the movable frame 5.

The movable frame 5 is moved forward away from the fixed frame 4 as follows: the button 9 is pressed to pivot the pivoting member 13 toward the X-link mechanism. This operation causes the first operating board 80 to pivot upward to push up the engaging portion 71 provided with the bumper 73.

This causes each engaging portion 71 to move away from the teeth 60a of the corresponding engaged member 10, thus allowing the locking member 11 to unlock the front-back movement of the movable frame 5.

The movable frame 5 is moved forward away from the fixed frame 4, while keeping the engaging portions 71 pushed up.

The engaged members 10 move forward in accordance with the pivoting of the inside link 6 and the outside link 7. The lower shaft S in the inside link 6 and the lower shaft S in the outside link 7 move upward along the receiving portions 36c of the lower supports 26 and 36.

Figure 31:
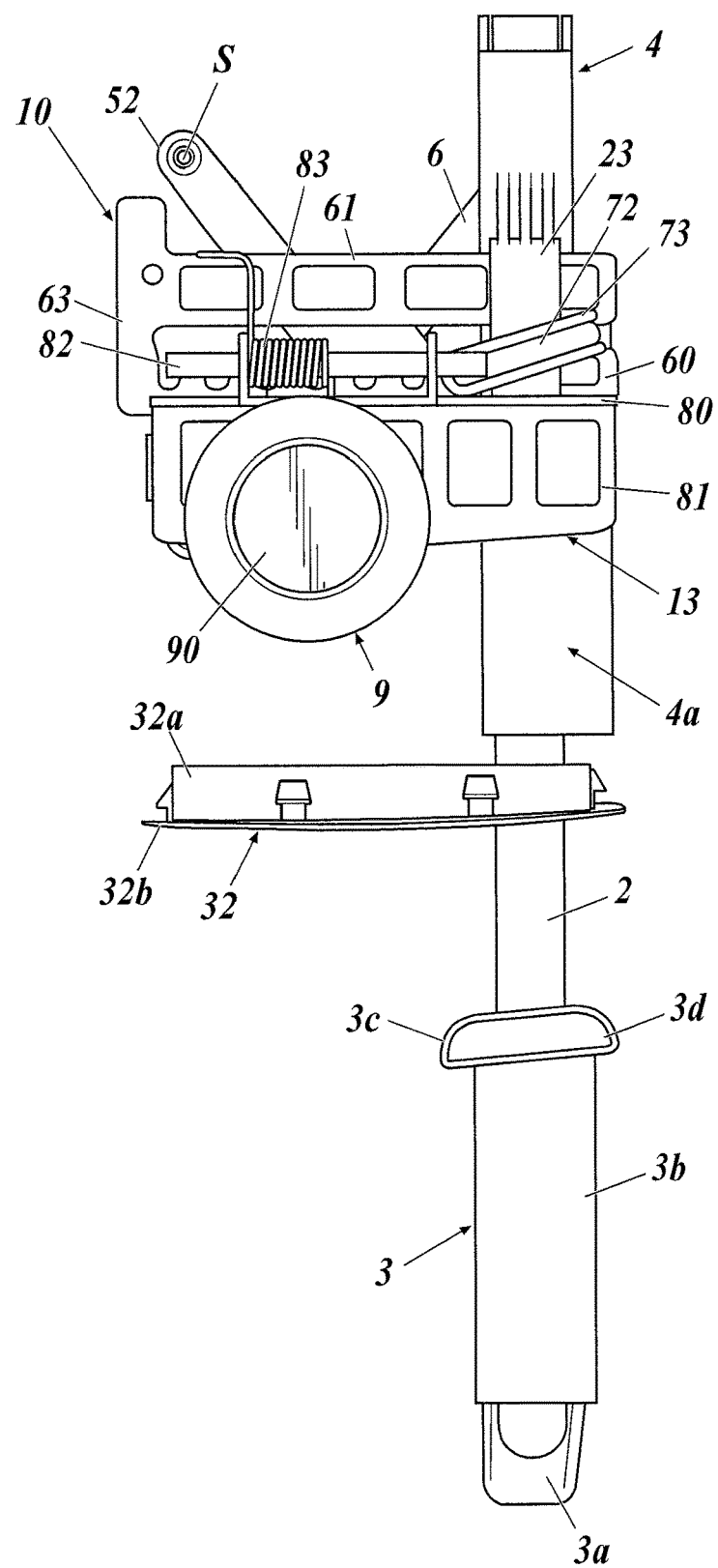
FIG. 31 is a side view of the internal structure of the headrest according to the second embodiment of the present invention after operation.

At the time of stopping the operation of the button 9 at a desired position, each engaging portion 71 is urged toward the side of the teeth 60a by the urging force of the corresponding urging member to get engaged with any of the teeth 60a. This allows the movable frame 5 to move forward away from the fixed frame 4 and be locked at a desired position, as shown in FIG. 31.

At the time of locking, the engaging portion 71 may come into contact with the tip of any of the teeth 60a, without falling into the valley between teeth 60a. In this case, the movable frame 5 should be moved back or forth without pressing the button 9. This operation causes the engaging portion 71 to fall into any adjacent valley, thereby successfully locking the movable frame 5.

A similar procedure is applied to moving back of the movable frame 5 to the rear: the button 9 is pressed to operate the bumper 73 and unlock the engaging portion 71.

The movable frame 5 is then moved back to the rear and the button 9 is released at a desired position of the movable frame 5. The movement of the X-link mechanism during the backward movement of the movable frame 5 is reverse to that of the X-link mechanism during the forward movement of the movable frame 5.

As described above, the above configuration enables the front-back movement of the movable frame 5 and a stepwise adjustment of the position in accordance with the arrangement of the teeth 60*a* of the engaged members 10. In other words, the anteroposterior position of the headrest 1 can be adjusted stepwise.

The vertical operation of the fixed frame 4, including the right and left pillar holders 4*a* and 4*b*, will now be described.

As shown in FIG. 30, the right and left pillar holders 4*a* and 4*b* are disposed at lower sides of the right and left headrest pillars 2. When the button 9 is not operated, the engaging section of the vertical locking member remains engaged with any of the notches 15 at lower sides of the headrest pillars 2, 2, thereby locking the vertical movement of right and left pillar holders 4*a* and 4*b*.

The right and left pillar holders 4*a* and 4*b* may be moved upward along the right and left headrest pillars 2, 2 as follows: the button 9 is pressed to pivot the pivoting member 13 toward the X-link mechanism. This operation causes the second operating board 81 to pivot toward the X-link mechanism to push the vertical locking member toward the back (inward) of the lock holder 27. This operation causes the engaging section (not shown) to move into the back of the lock holder 27.

This operation causes the engaging section of the vertical locking member to move away from the notch 15 of the headrest pillar 2, thus allowing the engaging section of the vertical locking member to unlock the vertical movement of the right and left pillar holders 4*a* and 4*b*.

The fixed frame 4 is moved upward along the right and left headrest pillars 2, 2, while the engaging section of the vertical locking member remains in the back of the lock holder 27.

This operation causes the movable frame 5 and the X-link mechanism to move upward in accordance with the movement of the fixed frame 4.

At the time of stopping the operation of the button 9 at a desired position, the engaging section of the vertical locking member is restored to its original position by the urging force of the urging member (not shown) to get engaged with any of the notches 15 on upper side of the headrest pillars 2. This operation allows the right and left pillar holders 4*a* and 4*b* to move along the right and left headrest pillars 2, 2 to be locked at a desired position, as shown in FIG. 31.

At the time of locking, the engaging section of the vertical locking member may come into contact with the outer perimeter, between vertically adjacent notches 15, 15, of the headrest pillars 2. In this case, the right and left pillar holders 4*a* and 4*b* should be moved up or down without pressing the button 9. This operation causes the engaging section to be engaged with the nearest notch 15, thereby successfully locking the right and left pillar holders 4*a* and 4*b*.

A similar procedure is applied to the downward movement of the right and left pillar holders 4*a* and 4*b*: the button 9 is pressed to operate the second operating board 81 and unlock the engaging section of the vertical locking member.

Subsequently, the right and left pillar holders 4*a* and 4*b* and the fixed frame 4 are moved downward and the button 9 is released at a desired position. The movable frame 5 and the X-link mechanism also move downward in accordance with the downward movement of the right and left pillar holders 4*a* and 4*b*.

As described above, the above configuration enables the vertical movement of the right and left pillar holders 4*a* and 4*b* and a stepwise adjustment of the position in accordance with the arrangement of the notches 15 in the headrest pillars 2. In other words, the vertical position of the headrest 1 can be adjusted stepwise.

The first movement regulator 100 and the second movement regulator 110 allows the fixed frame 4 and the movable frame 5 according to this embodiment to effectively suppress the movement of the shafts S in their extending direction, mainly in the opposite direction of the direction of insertion. As a result, the supports 25 and 35 can stably support the inside link 6 and the outside link 7.

The guides 101 can guide the shaft S into the through-hole 35*b*. The configuration can enhance the ease of assembly of the shaft S into the supports 35. The restrictors 104, which are integrated with the guides 101, adjacent to the support 35, can regulate the movement of the shaft S in its extending direction immediately after the insertion of the shaft S into the through-hole 35*b*.

Accordingly, this configuration can highly satisfy the demand for enhancing the ease of assembly of the shaft S into the supports 35 and regulating the movement of the shaft S in its extending direction.

The positions at which the restrictor 104 faces the shaft S are away from the support 35. This configuration facilitates the deformation of the elastic guides 101, which are integrated with the restrictor 104, at the time of guiding the shaft S. This, in turn, allows the guides 101 to readily guide the shaft S and the restrictors 104 to regulate the movement of the shaft S in its extending direction immediately after the passage of the shaft S beyond the guides 101.

Accordingly, this configuration can highly satisfy the demand for the guides 101 to facilitate the guidance of the shaft S and for the restrictors 104 to regulate the movement of the shaft S in its extending direction.

The shaft S can be readily guided into the through-hole 35*b* merely by guiding it along the first guiding wall 102 and the second guiding wall 103. The guides 101, which are integrated with the movable frame 5 at positions where the shaft S is disposed therebetween, eliminate the need for preparing other member to provide the guides 101 and thus can reduce the number of components.

Accordingly, this configuration can highly satisfy the demand for facilitating the guidance of the shaft S into the through-hole 35*b* and reducing the number of components.

The projections 102*a* and 103*a* are disposed at the ends, adjacent to the support 35, of the first guiding wall 102 and the second guiding wall 103, respectively. The projections 102*a* and 103*a* protrude toward the shaft S. This configuration further facilitates the deformation of the first guiding wall 102 and the second guiding wall 103 at the time of passage of the shaft S beyond the projections 102*a* and 103*a* during the guidance of the shaft S.

Accordingly, this configuration can highly satisfy the demand for readily deforming the first guiding wall 102 and the second guiding wall 103.

The recesses 102*b* and 103*b* are provided at portions other than the ends, adjacent to the support 35, of the first guiding wall 102 and the second guiding wall 103 to avoid the interference of the first guiding wall 102 and the second guiding wall 103 with the fixed frame 4. This configuration can prevent the interference of the first guiding wall 102 and the second guiding wall 103 with the fixed frame 4, while reducing the size of the headrest 1. The portions, other than the recesses 102b and 103b, of the first guiding wall 102 and the second guiding wall 103 protrude. This configuration further facilitates the deformation of the first guiding wall 102 and the second guiding wall 103 at the time of passage of the shaft S between the protruding portions.

Accordingly, this configuration highly satisfy the demand for preventing the interference of the first guiding wall 102 and the second guiding wall 103 with the fixed frame 4, while reducing the size of the headrest 1, and facilitating the deformation of the first guiding wall 102 and the second guiding wall 103.

The regulating projection 111 can regulate the movement of the shaft S in its extending direction after the insertion into the through-hole 25c in the support 25 and prevent the reduction in rigidity around the insertion hole 25b in the fixed frame 4.

Accordingly, this configuration can highly satisfy the demand for regulating the movement of the shaft S in its extending direction after the insertion into the through-hole 25c in the support 25 and suppressing the reduction in rigidity around the insertion hole 25b in the fixed frame 4.

The elastic regulating projection 111 is deformed to facilitate the insertion of the shaft S at the time of insertion. After the insertion of the shaft S into the through-hole 25c in the support 25, the elastic regulating projection 111 is resiliently restored to regulate the movement of the shaft S in its extending direction.

Accordingly, this configuration can highly satisfy the demand for facilitating the insertion of the shaft S into the through-hole 25c in the support 25 and regulating the movement of the shaft S in its extending direction.

An opening 112 is disposed on the fixed frame 4 at a position facing the regulating projection 111 in the fixed frame 4. This configuration enables the assembly state of the shaft S to be checked through the opening 112.

Accordingly, this configuration can highly satisfy the demand for checking of the assembly state of the shaft S.

{Additional Statements on Second Embodiment}

As is evident from the description on the second embodiment, the description of the second embodiment contains various technical ideas disclosed in addition to the following notes on the invention:

Note 1

A headrest including:

a fixed frame disposed on headrest pillars;

a movable frame adjustable in the front-back direction relative to the fixed frame; and a link mechanism having a plurality of links coupling the fixed frame with the movable frame; wherein the fixed frame and the movable frame have a plurality of supports pivotally supporting the plurality of links with shafts, each shaft is inserted into through-holes formed in the link and the support laterally adjacent to the link among the links and the supports, and a movement regulator is disposed on at least one of the fixed frame and the movable frame, the movement regulator regulating the movement of the shaft in its axial direction.

Note 2

The headrest according to Note 1, wherein the movement regulator disposed on the movable frame is disposed on a side of insertion of the shaft, the movement regulator includes:

guides guiding the shaft into the through-hole at the time of insertion of the shaft into the through-hole; and restrictors integrated with portions of the guides, the portions being adjacent to the support, the restrictors regulating the movement of the shaft in its axial direction after the insertion into the through-hole.

Note 3

The headrest according to Note 2, wherein the guides are elastic, deformed at the time of guiding the shaft, and resiliently restored after passage of the shaft, and positions of the restrictors are away from the support, the positions facing the shaft.

Note 4

The headrest according to Note 2 or 3, wherein the guides are integrated with the movable frame at positions where the shaft is disposed therebetween and include first and second guiding walls with the distance between the first guiding wall and the second guiding wall decreasing toward the direction of insertion.

Note 5

The headrest according to Note 4, wherein each of the first guiding wall and the second guiding wall is provided with a projection at one end thereof, the end being adjacent to the support, the projection protruding to the shaft, and each projection functions as a movement regulator of the shaft in its extending direction.

Note 6

The headrest according to Note 4 or 5, wherein each of the first guiding wall and the second guiding wall is provided with a recess at a position, the position being away from the support, to avoid interference of the first guiding wall and the second guiding wall with the fixed frame.

Note 7

The headrest according to any one of Notes 1 to 6, wherein the fixed frame has an insertion hole into which the shaft is inserted, the insertion hole being at a position facing the support, the movement regulator on the fixed frame is disposed on a side of insertion of the shaft insertion, and the movement regulator protrudes from a portion near the insertion hole toward the through-hole and includes a regulating projection that regulates the movement of the shaft in its axial direction after insertion into the through-hole.

Note 8

The headrest according to Note 7, wherein the regulating projection is elastic and disposed to face the center of the shaft after insertion into the through-hole.

Note 9

The headrest according to Note 7 or 8, wherein an opening is formed at a position of the fixed frame facing the regulating projection.

Note 10

A headrest including:

a fixed frame disposed on headrest pillars;

a movable frame adjustable in the front-back direction relative to the fixed frame; and a link mechanism having a first link and a second link, the first link and the second link pivotally connected with a shaft, the link mechanism thereby connecting the fixed frame and the movable frame, wherein the shaft is inserted into through-holes formed in central portions of the first link and the second link, and a movement regulator is disposed on a side face of one of the first link and the second link, the side face being adjacent to a side of insertion of the shaft, the movement regulator regulating a movement of the shaft in its axial direction.

Note 11

The headrest according to Note 10, wherein the side face of one of the first link and the second link recesses toward the position of the through-hole, the shaft being inserted from the side face, and the movement regulator is disposed in the vicinity of the through-hole on the side face.

Note 12

The headrest according to Note 10 or 11, wherein the movement regulator includes:

elastic extensions disposed on the side face, extending toward the through-hole, and being elastically deformed at least in a direction of insertion of the shaft at the time of insertion into the through-hole;

guides disposed at the tips of the elastic extensions in their extending direction and guiding the shaft into the through-hole at the time of insertion of the shaft into the through-hole; and restrictors disposed at the tips of the elastic extensions in their extending direction and regulating the movement of the shaft in its axial direction after the insertion into the through-hole.

Note 13

The headrest according to Note 12, wherein the elastic extensions are integrated with portions on the side face, the portions being in the vicinity of the through-hole, and the elastic extensions have curvatures curving in the opposite direction of the guides and the regulators.

Note 14

The headrest according to Note 12 or 13, wherein each guide includes a guiding face that causes the elastic extension to be elastically deformed into a direction perpendicular to the extending direction of the shaft at the time of insertion of the shaft into the through-hole.

Note 15

The headrest according to any one of Notes 12 to 14, wherein the guide protrudes from the tip of the elastic extension in its extending direction toward the through-hole, and the regulator is disposed on the side face of the guide in its protruding direction and faces the shaft after insertion into the through-hole.

Note 16

The headrest according to one of Notes 12 to 15, wherein the elastic extensions are disposed within the width of the side face.

Note 17 a vehicle seat, including the headrest according to any one of Notes 10 to 16, further includes:

a backrest having the headrest on the top of the backrest, wherein the link mechanism is an X-link mechanism having the first link and the second link, the first link and the second link having central portions, the central portions intersecting with each other and being pivotally connected.

Note 18

A headrest including:

a fixed frame disposed on headrest pillars;

a movable frame adjustable in the front-back direction relative to the fixed frame; and a link mechanism connecting the fixed frame and the movable frame and including a first link and a second link having central portions, the central portions intersecting with each other and being pivotally connected, wherein the fixed frame and the movable frame have a plurality of supports that pivotally support the first link and the second link with shafts, the supports includes supports for vertically sliding the ends of the first link and the ends of the second link, among the supports for slide, a support for slide disposed adjacent to a tip of the inserted shaft and receiving the tip extends vertically and includes a receiving portion having an angular U shape in cross sectional view, the receiving portion being open toward a side from which the shaft is inserted, and the receiving portion of at least one of the supports includes a locator therein, the locator determining the position of the shaft in a direction of insertion such that a tip of the shaft inserted into the receiving portion collides with the locator.

Note 19

The headrest according to Note 18, wherein the locator protrudes at the upper or lower end of the receiving portion, the shaft being inserted toward the protrusion.

Note 20

The headrest according to Note 18 or 19, wherein the movable frame includes a front cover having a front wall, the front wall receiving a head;

the front wall is provided with steps, the steps being disposed to sandwich an edge of the first link or the second link and protruding backward to regulate the horizontal position of the first link or the second link, the supports for slide having the receiving portion are integrated with the steps.

Note 21

The headrest according to Note 20, wherein the front cover has a peripheral wall disposed on the perimeter of the front wall, the front wall includes coupling walls, the coupling walls being disposed between the supports for slide having the receiving portion and the peripheral wall and coupling the supports and the peripheral wall.

Note 22

The headrest according to Note 20 or 21, wherein the front wall includes coupling walls, the coupling walls being disposed between the supports for slide having the receiving portion and other supports and coupling these supports.

Note 23

The headrest according to Note 21 or 22, further including an operating unit for operating the link mechanism, wherein the operating unit is disposed on the movable frame, and the coupling walls are disposed away from the operating unit.

Note 24

A method for fabricating the headrest according to any one of Notes 18 to 23, the method including a process of assembling the ends of the first link and the second link to the supports of the fixed frame or the movable frame, the process including:

inserting and accommodating a tip of the shaft, the tip being in the direction of insertion, into the receiving portion, while the tip collides with the locator, at the time of assembling one end of the first link or the second link to at least one support with the shaft, and subsequently assembling the other end of the first link or the second link to other support of the supports with the shaft.

According to the aspect, described in Note 1, of the present invention, the movement regulator can effectively suppress the movement of the shaft in its axial direction in the fixed frame and in the movable frame. As a result, the supports can stably support the first link and the second link.

According to the aspect, described in Note 2, of the present invention, the guides can successfully guide the shaft into the through-hole, thereby enhancing the ease of assembly of the shaft into the support. The regulators are integrated with the sides, adjacent to the support, of the guides, thereby successfully regulating the movement of the shaft in its axial direction immediately after insertion of the shaft into the through-hole.

Accordingly, this configuration can highly satisfy the demand for enhancing the ease of assembly of the shaft into the support and regulating the movement of the shaft in its axial direction.

According to the aspect, described in Note 3, of the present invention, the positions at which the regulators face the shaft are away from the support. This configuration facilitates the deformation of the elastic guides, integrated with the regulators, at the time of guiding the shaft. This, in turn, allows the guides to readily guide the shaft and the regulators to regulate the movement of the shaft in its axial direction immediately after the passage of the shaft beyond the guides.

Accordingly, this configuration can highly satisfy the demand for the guides to facilitate the guidance of the shaft and the regulators to regulate the movement of the shaft in its axial direction.

According to the aspect, described in Note 4, of the present invention, the shaft can be readily guided into the through-hole merely by guiding it along the first guiding wall and the second guiding wall. The guides, which are integrated with the movable frame at positions where the shaft is disposed therebetween, eliminate the need for preparing other member to provide the guides and thus can reduce the number of components.

Accordingly, this configuration can highly satisfy the demand for facilitating the guidance of the shaft into the through-hole and reducing the number of components.

According to the aspect, described in Note 5, of the present invention, the projections are disposed at the ends, adjacent to the support, of the first guiding wall and the second guiding wall. The projections protrude toward the shaft. This configuration further facilitates the deformation of the first guiding wall and the second guiding wall at the time of passage of the shaft beyond the projections during the guidance of the shaft. The projections, which function as movement regulators regulating the movement of the shaft in its axial direction, can further restrict the movement of the shaft in its axial direction.

Accordingly, this configuration can highly satisfy the demand for readily deforming the first guiding wall and the second guiding wall.

According to the aspect, described in Note 6, of the present invention, the recesses are provided at portions other than the ends, adjacent to the support, of the first guiding wall and the second guiding wall to avoid the interference of the first guiding wall and the second guiding wall with the fixed frame. This configuration can prevent the interference of the first guiding wall and the second guiding wall with the fixed frame, while reducing the size of the headrest. The portions, other than the recesses, of the first guiding wall and the second guiding wall protrude. This configuration further facilitates the deformation of the first guiding wall and the second guiding wall at the time of passage of the shaft between the protruding portions.

Accordingly, this configuration highly satisfy the demand for preventing the interference of the first guiding wall and the second guiding wall with the fixed frame, while reducing the size of the headrest, and facilitating the deformation of the first guiding wall and the second guiding wall.

According to the aspect, described in Note 7, of the present invention, the regulating projection can regulate the movement of the shaft in its axial direction after the insertion into the through-hole in the support and suppress the reduction in rigidity around the insertion hole in the fixed frame.

Accordingly, this configuration can highly satisfy the demand for regulating the movement of the shaft in its axial direction after the insertion into the through-hole in the support and suppressing the reduction in rigidity around the insertion hole in the fixed frame.

According to the aspect, described in Note 8, of the present invention, the elastic regulating projection is deformed to facilitate the insertion of the shaft at the time of insertion. After the insertion of the shaft into the through-hole, the elastic regulating projection is resiliently restored to regulate the movement of the shaft in its axial direction.

Accordingly, this configuration can highly satisfy the demand for facilitating the insertion of the shaft into the through-hole in the support and regulating the movement of the shaft in its axial direction.

According to the aspect, described in Note 9, of the present invention, an opening is disposed on the fixed frame at a position facing the regulating projection in the fixed frame. This configuration enables the assembly state of the shaft to be checked through the opening.

Accordingly, this configuration can highly satisfy the demand for checking of the assembly state of the shaft.

According to the aspect, described in Note 10, of the present invention, the movement regulator disposed on a side face of the first link or the second link from which the shaft is inserted can effectively regulate the movement of the shaft inserted into the through-holes formed in the central portions of the first link and the second link in its extending direction. As a result, the first link and the second link, which intersect with each other, can be connected stably.

According to the aspect, described in Note 11, of the present invention, the movement regulator is disposed at the bottom of the recess on the side face of the link. This configuration can reduce the size of the headrest, as compared with a headrest without a recessed side face.

Accordingly, this configuration can highly satisfy the demand for reducing the size of the headrest.

According to the aspect, described in Note 12, of the present invention, the guides are disposed at the tips of the elastic extensions in their extending direction and cause the elastic extensions to be elastically deformed in accordance with the insertion of the shaft. This configuration facilitates the guidance of the shaft into the through-hole, thereby enhancing the ease of assembly of the shaft into each link. The regulators are disposed at the tips of the elastic extensions in their extending direction and cause elastic extensions to be resiliently restored after the insertion of the shaft into the through-hole. This configuration can regulate the movement of the shaft in its axial direction.

Accordingly, this configuration can highly satisfy the demand for enhancing the ease of assembly of the shaft into each link and regulating the movement of the shaft in its axial direction.

According to the aspect, described in Note 13, of the present invention, the curvatures can impart the elastic extensions to sufficient length, which facilitates the deformation of the elastic extensions. This configuration allows the guides to readily guide the shaft, thereby enhancing the ease of assembly of the shaft.

Accordingly, this configuration can highly satisfy the demand for enhancing the ease of assembly of the shaft into each link.

According to the aspect, described in Note 14, of the present invention, the elastic extensions are deformed in the direction of insertion of the shaft and the guiding faces on the guides causes the elastic extensions to be elastically deformed in the direction perpendicular to the extending direction of the shaft, thus further enhancing the ease of assembly of the shaft.

Accordingly, this configuration can highly satisfy the demand for enhancing the ease of assembly of the shaft.

According to the aspect, described in Note 15, of the present invention, the guides protrude from the tips of the elastic extensions in their extending direction. This configuration can further reduce the size of the headrest, as compared with a headrest having guides protruding in the opposite direction of the through-hole. The regulators are provided on the side faces of the guides in their protruding direction. Unlike a headrest having guides protruding in the opposite direction of the through-hole, this configuration can provide spaces for the regulators.

The regulators are disposed to face the shaft after insertion into the through-hole, thus facilitating the regulation of the movement of the shaft in its axial direction.

Accordingly, this configuration can highly satisfy the demand for reducing the size of the headrest, securing the space for the regulators, and regulating the movement of the shaft in its axial direction.

According to the aspect, described in Note 16, of the present invention, the elastic extensions are disposed within the width of the side face of the link. This configuration can reduce the size of the headrest more effectively than a configuration having elastic extensions not within the width of the side face.

Accordingly, this configuration can highly satisfy the demand for reducing the size of the headrest.

According to the aspect, described in Note 17, of the present invention, the link mechanism of the headrest mounted on the top of the backrest is an X-link mechanism having the first link and the second link the central intersections of which are pivotally connected. This configuration enables a stable connection of the first link and the second link, which intersect with each other.

According to the aspect, described in Note 18, of the present invention, the shaft collides with the locator disposed inside the receiving portion at the time of insertion of the shaft into the receiving portion. This configuration can enhance the positioning accuracy of the shaft at the time of assembly. The shaft, once has collided with the locator, cannot move further. This configuration can prevent the contact of the tip of an inserted shaft with the internal portion of the receiving portion to enable a smooth slide of the shaft according to the rotation of the links.

According to the aspect, described in Note 19, of the present invention, the locator, which is integrated with the upper or lower end of the inside of the receiving portion, can enhance the positioning accuracy in the direction of insertion of the shaft and the rigidity of the receiving portion.

Accordingly, this configuration can highly satisfy the demand for enhancing the positioning accuracy of the direction of insertion of the shaft and the rigidity of the receiving portion.

According to the aspect, described in Note 20, of the present invention, the steps, disposed on the front wall so as to sandwich the ends of the first link or the second link, can regulate the horizontal positions of the first link or the second link. The steps can enhance the rigidity of the front wall.

The supports for slide, each having with the receiving portion, are integrated with the steps. This configuration can enhance the rigidity of the supports, compared with a configuration having supports being directly integrated with the front wall.

Accordingly, this configuration can highly satisfy the demand for regulating the horizontal positions of the links and enhancing the rigidity of the front wall and the supports.

According to the aspect, described in Note 21, of the present invention, the front wall is disposed between the supports for slide, each having with the receiving portion, and the peripheral wall. The front wall includes coupling walls coupling the supports and the peripheral wall. The coupling wall can enhance the rigidity of the movable frame.

Accordingly, this configuration can highly satisfy the demand for enhancing the rigidity of the movable frame.

According to the aspect, described in Note 22, of the present invention, the front wall is disposed between the supports for slide, each support having with the receiving portion, and other supports. The front wall includes coupling walls coupling these supports. The coupling walls can enhance the rigidity of the movable frame.

Accordingly, this configuration can highly satisfy the demand for enhancing the rigidity of the movable frame.

According to the aspect, described in Note 23, of the present invention, the coupling walls are disposed away from the operating unit for manipulating the link mechanism. This configuration can secure the operability of the link mechanism with the operating unit and enhance the rigidity of the movable frame.

Accordingly, this configuration can highly satisfy the demand for securing the operability of the X-link mechanism (link mechanism) with the operating unit and enhancing the rigidity of the movable frame.

According to the aspect, described in Note 24, of the present invention, the shaft collides with the locator disposed inside the receiving portion at the time of insertion of the shaft into the receiving portion. This configuration can enhance the positioning accuracy of the shaft at the time of assembly.

After assembling at least one of the supports having the receiving portion, other support is assembled. This allows other support to be assembled, while sliding the shaft received in the receiving portion. This facilitates the assembly of an end of the first link or the second link to other support with a shaft.

Accordingly, this configuration can highly satisfy the demand for enhancing the positioning accuracy in the direction of insertion at the time of assembly of the shaft and facilitating the assembly of an end of the first link or the second link to the other support with a shaft.

INDUSTRIAL APPLICABILITY

The present invention can be applied to a headrest.

DESCRIPTION OF REFERENCE NUMERALS 1, 1A headrest
2 headrest pillar
4 fixed frame
4a, 4b pillar holder
4c rear-face coupler
4d, 4e coupler 4f upper contact
5 movable frame
6 first link (inside link)
6b through-hole
7 second link (outside link)
7b through-hole
8 intersection
8a1, 8a2, 8a3 through-hole
9 operating unit (button)
10 engaged member
11 locking member
12 urging member (coil spring)
13 pivoting member
15 vertical locking member
15 notch
20 pillar inserting hole
21 holder
22 dent
23 mount
23a, 23b through-hole
24 receiver
24a retainer
25 support
25a, 25b insertion hole
25c through-hole
25d insertion holes
26 support
26a hole
26b through-hole
27 lock holder
28 protruding rib
30 front cover
30a front (front wall)
30b peripheral side face (peripheral wall)
30d base end receiver
30f through-hole (insertion hole)
30g through-hole (insertion hole)
31 rear cover
31b peripheral side face
31d tip receiver
33 holder
35 support
35a insertion hole
36 support
36a hole
36b through-hole
36c receiving portion
36d locator
37a front guiding contact (lower contact)
37c upper rail
42 connecting portion
51 insertion hole
52 connecting portion
60 first projection
60a teeth
61 second projection
62 gap
63 base end
70 held portion
71 engaging portion
72 coupling portion
73 bumper
80 first operating board
81 second operating board
82 pivoting shaft
83 urging member
100 first movement regulator
101 guide
102 first guiding wall
102a projection
102b recess
103 second guiding wall
103a projection
103b recess
104 restrictor
110 second movement regulator
111 regulating projection
112 opening
120 third movement regulator
121 elastic extension
121a curvature
122 guide
122a guiding face
123 regulator
160 skin sheet
162 trim plate
S connecting rod (shaft)

The invention claimed is:

1. A headrest comprising:
   a right headrest pillar and a left headrest pillar apart from the right headrest pillar;
   a fixed frame disposed on the headrest pillars;
   a movable frame coupled to the fixed frame with a movable mechanism, the movable frame being movable in a front-back direction relative to the fixed frame; and
   a front-back locking mechanism locking and unlocking a front-back movement of the movable frame relative to the fixed frame,
   wherein the front-back locking mechanism comprises:
      a plurality of engaged members disposed outside the right and left headrest pillars in a width direction thereof; and
      a locking member having a plurality of engaging portions to be respectively engaged with the engaged members to lock the movement of the movable frame,
   the fixed frame comprises a holder holding the locking member, the holder being disposed on a rear face of the fixed frame, and
   the holder is disposed in the rear of at least the right and left headrest pillars.

2. The headrest according to claim 1, wherein
   the movable frame comprises a front cover and a rear cover constituting a case having an internal cavity when assembled,
   at least tops of the right and left headrest pillars, the fixed frame, the movable mechanism, and the front-back locking mechanism are disposed in the internal cavity defined by the front cover and the rear cover, and
   the engaged members are disposed in the front-back direction and carried by the front cover and the rear cover.

3. The headrest according to claim 1, wherein
   the locking member is composed of metal and disposed in the vicinity of the fixed frame,
   a bumper is disposed between the locking member and the fixed frame, and
   the bumper comes into contact with the fixed frame in cooperation with movement of the locking member toward the fixed frame.

4. The headrest according to claim 3, wherein
the locking member comprises:
    an elongate held portion held by the fixed frame and extending along a width of the fixed frame;
    the plurality of engaging portions extending in parallel with the held portion and engaged with the engaged members; and
    a plurality of coupling portions, each coupling portion disposed between one end of the held portion and one end of the corresponding engaging portion,
the locking member is disposed on the fixed frame so as to surround the fixed frame, and
the bumper is mounted on the locking member from a side of the fixed frame toward outside.

5. The headrest according to claim 3, wherein
the front-back locking mechanism is pivotally held by the movable frame and comprises a pivoting operating member for operating the locking member, and
the bumper is configured to increase a area of contact between the locking member and the pivoting operating member.

6. The headrest according to claim 1, wherein
the fixed frame comprises:
    pillar inserting holes formed at horizontal ends of the fixed frame and receiving the right and left headrest pillars vertically extending therethrough; and
    slits formed vertically in at least one of front and rear faces of the fixed frame and in communication with the pillar inserting holes, and
the right and left headrest pillars are each provided with a pillar retainer slidably disposed through the slit when the headrest pillar is inserted into the corresponding pillar inserting hole.

7. The headrest according to claim 1, wherein
the front-back locking mechanism comprises an urging member that urges the engaging portions toward the engaged members, and
the fixed frame comprises:
    a receiver being open toward a front face of the fixed frame and accommodating the corresponding urging member; and
    a retainer regulating a frontward movement of the corresponding urging member accommodated in the receiver.

8. A vehicle seat comprising:
the headrest according to claim 1.

9. The headrest according to claim 1, wherein the fixed frame comprises a stopper disposed on the rear face of the fixed frame and being in contact with the locking member along a mounting direction of the locking member on the holder to regulate movement of the locking member in the opposite direction of the mounting direction.

10. The headrest according to claim 1, comprising a link mechanism having a first link and a second link pivotally connected with a shaft, the first link and the second link each connecting the fixed frame and the movable frame, wherein
    the shaft is inserted through a through-hole formed in at least one of the first link and the second link, and
    a movement regulator is disposed on a side face of one of the first link and the second link, the shaft being inserted from the side face and the movement regulator regulating a movement of the shaft in an axial direction thereof.

11. A headrest comprising:
a right headrest pillar and a left headrest pillar apart from the right headrest pillar;
a fixed frame disposed on the headrest pillars;
a movable frame coupled to the fixed frame with a movable mechanism, the movable frame being movable in a front-back direction relative to the fixed frame; and
a front-back locking mechanism locking and unlocking a front-back movement of the movable frame relative to the fixed frame,
wherein the front-back locking mechanism comprises:
    a plurality of engaged members disposed outside the right and left headrest pillars in a width direction thereof; and
    a locking member having a plurality of engaging portions to be respectively engaged with the engaged members to lock the movement of the movable frame,
the locking member is composed of metal and disposed in the vicinity of the fixed frame,
a bumper is disposed between the locking member and the fixed frame, and
the bumper comes into contact with the fixed frame in cooperation with the movement of the locking member toward the fixed frame.

12. The headrest according to claim 11, wherein
the movable frame comprises a front cover and a rear cover constituting a case having an internal cavity when assembled,
at least tops of the right and left headrest pillars, the fixed frame, the movable mechanism, and the front-back locking mechanism are disposed in the internal cavity defined by the front cover and the rear cover, and
the engaged members are disposed in the front-back direction and carried by the front cover and the rear cover.

13. The headrest according to claim 11, wherein
the locking member comprises:
    an elongate held portion held by the fixed frame and extending along a width of the fixed frame;
    the plurality of engaging portions extending in parallel with the held portion and engaged with the engaged members; and
    a plurality of coupling portions, each coupling portion disposed between one end of the held portion and one end of the corresponding engaging portion,
the locking member is disposed on the fixed frame so as to surround the fixed frame, and
the bumper is mounted on the locking member from a side of the fixed frame toward outside.

14. The headrest according to claim 11, wherein
the front-back locking mechanism is pivotally held by the movable frame and comprises a pivoting operating member for operating the locking member, and
the bumper is configured to increase an area of contact between the locking member and the pivoting operating member.

15. The headrest according to claim 11, wherein
the fixed frame comprises:
    pillar inserting holes formed at horizontal ends of the fixed frame and receiving the right and left headrest pillars vertically extending therethrough; and
    slits formed vertically in at least one of front and rear faces of the fixed frame and in communication with the pillar inserting holes, and
the right and left headrest pillars are each provided with a pillar retainer slidably disposed through the slit when the headrest pillar is inserted into the corresponding pillar inserting hole.

16. The headrest according to claim 11, wherein
the front-back locking mechanism comprises an urging member that urges the engaging portions toward the engaged members, and
the fixed frame comprises:
   a receiver being open toward a front face of the fixed frame and accommodating the corresponding urging member; and
   a retainer regulating a frontward movement of the corresponding urging member accommodated in the receiver.

17. The headrest according to claim 11, wherein the fixed frame comprises a stopper disposed on a rear face of the fixed frame and being in contact with the locking member along a mounting direction of the locking member on a holder to regulate the movement of the locking member in the opposite direction of the mounting direction.

18. A vehicle seat comprising:
the headrest according to claim 11.

* * * * *